United States Patent
Waldrop et al.

(10) Patent No.: US 11,575,298 B2
(45) Date of Patent: Feb. 7, 2023

(54) HARD START KIT FOR MULTIPLE REPLACEMENT APPLICATIONS

(71) Applicant: AmRad Manufacturing, LLC, Universal City, TX (US)

(72) Inventors: Jerry Lee Waldrop, Bunnell, FL (US); Jonathan Coburn Charles, Ormond Beach, FL (US)

(73) Assignee: AmRad Manufacturing, LLC, Universal City, TX (US)

(*) Notice: Subject to any disclaimer, the term of this patent is extended or adjusted under 35 U.S.C. 154(b) by 0 days.

(21) Appl. No.: 17/731,419

(22) Filed: Apr. 28, 2022

(65) Prior Publication Data
US 2022/0352789 A1 Nov. 3, 2022

Related U.S. Application Data

(60) Provisional application No. 63/282,965, filed on Nov. 24, 2021, provisional application No. 63/182,540, filed on Apr. 30, 2021.

(51) Int. Cl.
*H02K 11/00* (2016.01)
*H01G 2/10* (2006.01)

(52) U.S. Cl.
CPC ........... *H02K 11/0094* (2013.01); *H01G 2/10* (2013.01)

(58) Field of Classification Search
CPC .. H01G 4/38; H01G 2/14; H01G 2/16; H01G 2/10
See application file for complete search history.

(56) References Cited

U.S. PATENT DOCUMENTS

| 1,665,499 A | 4/1928 | Hoch |
| 1,707,959 A | 4/1929 | Fried |

(Continued)

FOREIGN PATENT DOCUMENTS

| CA | 2285721 | 4/2000 |
| CN | 2033169 U | * 2/1989 |

(Continued)

OTHER PUBLICATIONS

US 10,504,654 B2, 12/2019, Stockman (withdrawn)
(Continued)

*Primary Examiner* — David M Sinclair
(74) *Attorney, Agent, or Firm* — Fish & Richardson P.C.

(57) ABSTRACT

A hard start capacitor replacement unit includes a capacitor container having a cover, a plurality of capacitors received within the container, each of said capacitors having a capacitance value, a common terminal mounted on the cover and electrically connected to a common terminal of each of said plurality of capacitors, a plurality of cover terminals mounted on the cover spaced apart from the common terminal and from each other, each cover terminal respectively electrically connected to one of the plurality of capacitors, a relay having contacts and being capable of opening and closing said contacts in response to a monitored condition of the motor, the relay having relay terminals, a fuse electrically connected to one of the relay terminals by a first wire wherein the fuse electrically disconnects the hard start capacitor replacement unit and the motor upon a failure, and a second wire electrically connecting one of the relay terminals and the motor, a third wire electrically connecting the common terminal and one of the relay terminals, a fourth wire electrically connecting one or more cover terminals to one of the relay terminals, wherein the contacts of the relay close to electrically connect one or more capacitors of the (Continued)

plurality of capacitors to the motor, and the contacts of the relay open to electrically disconnect the one or more capacitors of the plurality of capacitors from the motor.

14 Claims, 21 Drawing Sheets

(56) References Cited

U.S. PATENT DOCUMENTS

| | | |
|---|---|---|
| 1,789,949 A | 1/1931 | Georgiev |
| 1,943,714 A | 1/1934 | Bailey |
| 2,050,062 A | 8/1936 | Mershon |
| 2,202,166 A | 5/1940 | Peck |
| D122,825 S | 10/1940 | Peck |
| D124,726 S | 1/1941 | Shimer |
| D130,952 S | 12/1941 | Miller |
| 2,296,123 A | 9/1942 | Stimson |
| 2,569,925 A | 10/1951 | Deeley |
| 2,607,833 A | 8/1952 | Schomaker |
| 2,779,813 A | 1/1957 | Collins |
| 2,896,008 A | 7/1959 | Putz |
| 2,968,752 A | 1/1961 | Rubinstein |
| 3,010,056 A | 11/1961 | Kurland |
| 3,015,687 A | 1/1962 | Ruscito |
| 3,041,477 A | 6/1962 | Lucien et al. |
| 3,210,457 A | 10/1965 | Hancock |
| 3,246,205 A | 4/1966 | Miller |
| 3,302,081 A | 1/1967 | Grahame |
| 3,304,473 A | 2/1967 | Netherwood et al. |
| D209,054 S | 10/1967 | Braiman et al. |
| D210,210 S | 2/1968 | Braiman et al. |
| 3,377,510 A | 4/1968 | Rayno |
| 3,454,858 A | 7/1969 | Robinson |
| 3,473,088 A | 10/1969 | Ernst |
| 3,524,614 A | 8/1970 | Sorth |
| 3,553,542 A | 1/1971 | Stonemetz |
| 3,555,370 A | 1/1971 | Bowling |
| 3,593,066 A | 7/1971 | Norman |
| 3,771,321 A | 11/1973 | Maksy |
| 3,803,457 A | 4/1974 | Yamamoto |
| 3,921,041 A | 11/1975 | Stockman |
| 3,955,170 A * | 5/1976 | Geishecker ............ H01C 7/022 318/473 |
| 3,988,650 A | 10/1976 | Fritze |
| 4,009,425 A | 2/1977 | Muranaka |
| 4,028,595 A | 6/1977 | Stockman |
| 4,095,902 A | 6/1978 | Florer et al. |
| 4,106,068 A | 8/1978 | Flanagan |
| 4,107,758 A | 8/1978 | Shim et al. |
| 4,112,424 A | 9/1978 | Lapeyre |
| 4,209,815 A | 6/1980 | Rollins et al. |
| 4,240,126 A | 12/1980 | Sanvito |
| 4,263,638 A | 4/1981 | Stockman et al. |
| 4,312,027 A | 1/1982 | Stockman |
| 4,326,237 A | 4/1982 | Markarian et al. |
| 4,352,145 A | 9/1982 | Stockman |
| 4,363,078 A | 12/1982 | Dwyer |
| 4,398,782 A | 8/1983 | Markarian |
| 4,408,818 A | 10/1983 | Markarian |
| 4,420,791 A | 12/1983 | Shedigian |
| 4,447,854 A | 5/1984 | Markarian |
| 4,459,637 A | 7/1984 | Shedigian |
| 4,486,809 A | 12/1984 | Deak et al. |
| 4,546,300 A | 10/1985 | Shaikh |
| 4,558,394 A | 12/1985 | Stockman |
| 4,586,107 A | 4/1986 | Price |
| 4,609,967 A | 9/1986 | Shedigian |
| 4,621,301 A | 11/1986 | Shedigian |
| 4,631,631 A | 12/1986 | Hodges et al. |
| 4,633,365 A | 12/1986 | Stockman |
| 4,633,367 A | 12/1986 | Strange et al. |
| 4,633,369 A | 12/1986 | Lapp et al. |
| 4,639,828 A | 1/1987 | Strange et al. |
| 4,642,731 A | 2/1987 | Shedigian |
| 4,698,725 A | 10/1987 | MacDougall et al. |
| 4,737,785 A | 4/1988 | Zottnik |
| 4,754,361 A | 6/1988 | Venturini |
| 4,768,129 A | 8/1988 | Sasaki |
| 4,811,161 A | 3/1989 | Sasaki |
| 4,812,941 A | 3/1989 | Rice et al. |
| 4,813,116 A | 3/1989 | Thiel et al. |
| 4,897,760 A | 1/1990 | Bourbeau |
| D307,000 S | 4/1990 | Sasaki |
| 4,992,910 A | 2/1991 | Evans |
| 5,006,726 A | 4/1991 | Okumura |
| 5,019,934 A | 5/1991 | Bentley et al. |
| 5,032,948 A | 7/1991 | Sakai |
| 5,138,519 A | 8/1992 | Stockman |
| 5,148,347 A | 9/1992 | Cox et al. |
| 5,196,818 A | 3/1993 | Anderson |
| 5,247,236 A | 9/1993 | Schroeder |
| 5,280,219 A | 1/1994 | Ghanbari |
| 5,313,360 A | 5/1994 | Stockman |
| 5,381,301 A | 1/1995 | Hudis |
| 5,412,532 A | 5/1995 | Nishimori |
| 5,528,120 A | 6/1996 | Brodetsky |
| 5,561,357 A | 10/1996 | Schroeder |
| 5,673,168 A | 9/1997 | Efford et al. |
| 5,691,845 A | 11/1997 | Iwatsuka et al. |
| 5,817,975 A | 10/1998 | Heilmann et al. |
| 5,921,820 A | 7/1999 | Dijkstra |
| 5,940,263 A | 8/1999 | Jakoubovitch |
| 6,009,348 A | 12/1999 | Rorvick et al. |
| 6,014,308 A | 1/2000 | Stockman |
| 6,031,713 A | 2/2000 | Takeisha et al. |
| 6,084,764 A | 7/2000 | Anderson |
| 6,141,205 A | 10/2000 | Nutzman |
| 6,147,856 A | 11/2000 | Karidis |
| 6,157,531 A | 12/2000 | Breyen et al. |
| 6,160,465 A | 12/2000 | Yamaguchi et al. |
| 6,212,058 B1 | 4/2001 | Huber |
| 6,222,270 B1 | 4/2001 | Lee |
| 6,229,236 B1 | 5/2001 | Fisher |
| 6,233,133 B1 | 5/2001 | Weng |
| 6,282,078 B1 | 8/2001 | Tsai |
| 6,282,081 B1 | 8/2001 | Takabayashi et al. |
| 6,310,756 B1 | 10/2001 | Miura et al. |
| 6,313,978 B1 | 11/2001 | Stockman et al. |
| 6,373,720 B1 | 4/2002 | Fechtig et al. |
| 6,385,490 B1 | 5/2002 | O'Phelan |
| 6,404,618 B1 | 6/2002 | Beard et al. |
| 6,410,184 B1 | 6/2002 | Horiuchi |
| 6,466,429 B1 | 10/2002 | Volfkovich et al. |
| 6,490,158 B1 | 12/2002 | Ellyson et al. |
| 6,538,544 B1 | 3/2003 | Hardy |
| 6,552,893 B2 | 4/2003 | Tanaka |
| 6,697,249 B2 | 2/2004 | Maletin et al. |
| 6,706,079 B1 | 3/2004 | Shmatko et al. |
| 6,720,689 B2 | 4/2004 | Agnes et al. |
| 6,798,677 B2 | 9/2004 | Jakob et al. |
| 6,807,048 B1 | 10/2004 | Nielsen |
| 6,816,541 B1 | 11/2004 | Hong |
| 6,819,545 B1 | 11/2004 | Lobo et al. |
| 6,842,328 B2 | 1/2005 | Schott |
| 6,847,517 B2 | 1/2005 | Iwaida et al. |
| 6,888,266 B2 | 5/2005 | Burke et al. |
| 6,922,330 B2 | 7/2005 | Nielson et al. |
| 6,930,874 B2 | 8/2005 | Lobot et al. |
| 6,982,539 B1 | 1/2006 | Ward |
| 6,995,971 B2 | 2/2006 | Norton |
| 7,031,139 B1 | 4/2006 | Fayram |
| 7,046,498 B1 | 5/2006 | Huang |
| D522,456 S | 6/2006 | Matsumoto |
| 7,110,240 B2 | 9/2006 | Breyen |
| 7,184,256 B1 | 2/2007 | Sato |
| 7,203,053 B2 | 4/2007 | Stockman |
| 7,206,186 B1 | 4/2007 | Knight |
| 7,251,123 B2 | 7/2007 | O'Phelan |
| D551,943 S | 10/2007 | Hodjat |
| D562,237 S | 2/2008 | Tu |
| 7,365,959 B1 | 4/2008 | Ward |
| 7,423,861 B2 | 9/2008 | Stockman |
| 7,474,519 B2 | 1/2009 | Stockman |

(56) References Cited

U.S. PATENT DOCUMENTS

| | | |
|---|---|---|
| 7,474,520 B2 | 1/2009 | Kashihara |
| 7,492,574 B2 | 2/2009 | Fresard et al. |
| 7,511,941 B1 | 3/2009 | Gallay |
| 7,547,233 B2 | 6/2009 | Inoue et al. |
| 7,619,420 B2 | 11/2009 | Stockman |
| 7,667,954 B2 | 2/2010 | Lessner |
| 7,710,713 B2 | 5/2010 | Restorff |
| D621,789 S | 8/2010 | Wang et al. |
| D623,500 S | 9/2010 | Langner |
| 7,835,133 B2 | 11/2010 | Stockman |
| 7,848,079 B1 | 12/2010 | Gordin et al. |
| 7,867,290 B2 | 1/2011 | Nielsen |
| 7,881,043 B2 | 2/2011 | Hirose et al. |
| 7,911,762 B2 | 3/2011 | Stockman |
| 7,911,766 B2 | 3/2011 | Caumont et al. |
| 7,952,854 B2 | 5/2011 | Stockman |
| 7,987,593 B1 | 8/2011 | Gorst |
| 8,029,290 B2 | 10/2011 | Johnson |
| 8,170,662 B2 | 5/2012 | Bocek |
| 8,174,817 B2 | 5/2012 | Georgopoulos et al. |
| 8,270,143 B2 | 9/2012 | Stockman |
| 8,274,778 B2 | 9/2012 | Yoshinaga et al. |
| 8,310,802 B2 | 11/2012 | Fujii et al. |
| 8,331,076 B2 | 12/2012 | Tuncer |
| 8,456,795 B2 | 6/2013 | Stockman |
| 8,465,555 B2 | 6/2013 | Sherwood |
| 8,472,164 B2 | 6/2013 | Kim |
| 8,514,547 B2 | 8/2013 | Galvagni |
| 8,514,548 B2 | 8/2013 | Miller et al. |
| 8,531,815 B2 | 9/2013 | Stockman |
| 8,537,522 B2 | 9/2013 | Stockman |
| 8,559,161 B2 | 10/2013 | Takeoka et al. |
| 8,619,409 B2 | 12/2013 | Yawata et al. |
| 8,761,875 B2 | 6/2014 | Sherwood |
| 8,842,411 B2 | 9/2014 | Zhang |
| 8,853,318 B2 | 10/2014 | Tielemans |
| 8,861,178 B2 | 10/2014 | Terashima et al. |
| 8,861,184 B2 | 10/2014 | Schmidt |
| 8,871,850 B2 | 10/2014 | Koh et al. |
| 8,885,318 B2 | 11/2014 | Stockman |
| 8,891,224 B2 | 11/2014 | Stockman |
| D729,164 S | 5/2015 | Chen |
| 9,105,401 B2 | 8/2015 | Dreissig |
| 9,318,261 B2 | 4/2016 | Stockman |
| 9,324,501 B2 | 4/2016 | Stockman |
| 9,343,238 B2 | 5/2016 | Stockman |
| 9,378,893 B2 | 6/2016 | Stockman |
| 9,412,521 B2 | 8/2016 | Stockman |
| 9,424,995 B2 | 8/2016 | Stockman |
| 9,466,429 B1 | 10/2016 | Casanova |
| D771,567 S | 11/2016 | Flohe et al. |
| 9,496,086 B2 | 11/2016 | Stockman |
| 9,536,670 B2 | 1/2017 | Stockman |
| 9,859,060 B1 | 1/2018 | Stockman et al. |
| 9,916,934 B1 | 3/2018 | Casanova et al. |
| D818,437 S | 5/2018 | Stockman |
| D818,959 S | 5/2018 | Stockman |
| 10,056,194 B2 | 8/2018 | Stockman |
| 10,056,195 B2 | 8/2018 | Stockman |
| D829,173 S | 9/2018 | Stockman |
| 10,134,528 B2 | 11/2018 | Stockman |
| 10,147,549 B2 | 12/2018 | Stockman |
| 10,147,550 B1 | 12/2018 | Stockman |
| 10,163,571 B2 | 12/2018 | Stockman |
| 10,209,751 B2 | 2/2019 | Zikes |
| 10,249,439 B2 | 4/2019 | Stockman |
| 10,256,195 B2 | 4/2019 | Yamamoto |
| 10,366,840 B1 | 7/2019 | Stockman |
| 10,475,588 B2 | 11/2019 | Stockman |
| 10,497,518 B1 | 12/2019 | Stockman |
| 10,497,520 B1 | 12/2019 | Stockman |
| 10,586,655 B1 | 3/2020 | Stockman |
| D892,741 S | 8/2020 | Biere |
| D893,441 S | 8/2020 | Rao |
| D906,247 S | 12/2020 | Stockman |
| 11,177,074 B1 | 11/2021 | Stockman |
| 11,183,330 B2 | 11/2021 | Stockman |
| 11,183,335 B2 | 11/2021 | Stockman et al. |
| 11,183,336 B2 | 11/2021 | Stockman et al. |
| 11,183,337 B1 | 11/2021 | Stockman et al. |
| 11,183,338 B2 | 11/2021 | Stockman |
| 11,183,341 B1 | 11/2021 | Stockman |
| 11,189,425 B1 | 11/2021 | Stockman et al. |
| 11,189,426 B1 | 11/2021 | Stockman |
| D938,912 S | 12/2021 | Stockman |
| 11,195,663 B2 | 12/2021 | Stockman |
| 11,424,077 B1 | 8/2022 | Stockman et al. |
| 2001/0025618 A1 | 10/2001 | Kelling |
| 2002/0030548 A1 | 3/2002 | Dejima |
| 2005/0272012 A1 | 12/2005 | Logan et al. |
| 2006/0007387 A1 | 1/2006 | Xiao |
| 2006/0067031 A1 | 3/2006 | Crane |
| 2006/0201971 A1 | 9/2006 | Wegman |
| 2006/0227495 A1 | 10/2006 | Stockman |
| 2007/0025051 A1 | 2/2007 | Stockman |
| 2007/0221278 A1 | 9/2007 | Sartorius |
| 2007/0236860 A1 | 10/2007 | Stockman |
| 2007/0279015 A1 | 12/2007 | Livingston et al. |
| 2007/0283707 A1 | 12/2007 | Hatano |
| 2007/0295877 A1 | 12/2007 | Gaydos |
| 2008/0158780 A1 | 7/2008 | Stockman |
| 2008/0217053 A1 | 9/2008 | Vojtila et al. |
| 2009/0001921 A1 | 1/2009 | Mills |
| 2009/0052109 A1 | 2/2009 | Stockman et al. |
| 2009/0059463 A1 | 3/2009 | Ward |
| 2009/0115557 A1 | 5/2009 | Minowa |
| 2009/0219665 A1 | 9/2009 | Stockman |
| 2009/0261762 A1 | 10/2009 | Tsuchiya |
| 2011/0063775 A1 | 3/2011 | Stockman |
| 2011/0075342 A1 | 3/2011 | Gotham et al. |
| 2011/0134584 A1 | 6/2011 | Stockman |
| 2011/0157764 A1 | 6/2011 | Stockman |
| 2011/0228444 A1 | 9/2011 | Lai et al. |
| 2011/0228446 A1 | 9/2011 | Stockman |
| 2011/0317333 A1 | 12/2011 | Chun |
| 2012/0026046 A1 | 2/2012 | Bit-Babik |
| 2013/0003252 A1 | 1/2013 | Stockman |
| 2013/0214720 A1 | 8/2013 | Stockman |
| 2013/0329342 A1 | 12/2013 | Stockman |
| 2013/0343029 A1 | 12/2013 | Stockman |
| 2014/0049205 A1 | 2/2014 | Curiel |
| 2014/0126107 A1 | 5/2014 | Yoda et al. |
| 2014/0138009 A1 | 5/2014 | Lim |
| 2014/0201018 A1 | 7/2014 | Chassin |
| 2014/0232485 A1 | 8/2014 | Bultitude |
| 2014/0285949 A1 | 9/2014 | Stockman |
| 2014/0347784 A1 | 11/2014 | Stockman et al. |
| 2015/0016012 A1 | 1/2015 | Stockman |
| 2015/0022991 A1 | 1/2015 | Stockman et al. |
| 2015/0138690 A1 | 5/2015 | Stockman |
| 2015/0255218 A1 | 9/2015 | Stockman et al. |
| 2015/0287308 A1 | 10/2015 | Shuttleworth |
| 2016/0028230 A1 | 1/2016 | Elfman |
| 2016/0203916 A1 | 7/2016 | Stockman |
| 2016/0233030 A1 | 8/2016 | Stockman |
| 2017/0011855 A1 | 1/2017 | Stockman et al. |
| 2017/0032898 A1 | 2/2017 | Stockman |
| 2017/0110252 A1 | 4/2017 | Stockman |
| 2017/0186554 A1 | 6/2017 | Stockman |
| 2017/0229242 A1 | 8/2017 | Goodson et al. |
| 2017/0236646 A1 | 8/2017 | Stockman |
| 2017/0372838 A1 | 12/2017 | Casanova et al. |
| 2018/0061600 A1 | 3/2018 | Ito |
| 2018/0090278 A1 | 3/2018 | Stockman et al. |
| 2018/0254150 A1 | 9/2018 | Stockman et al. |
| 2018/0261391 A1 | 9/2018 | Stockman |
| 2019/0057815 A1 | 2/2019 | Stockman |
| 2019/0057817 A1 | 2/2019 | Stockman |
| 2020/0066470 A1 | 2/2020 | Mitchell |
| 2020/0143994 A1 | 5/2020 | Stockman |
| 2020/0155983 A1 | 5/2020 | Maeda |
| 2020/0161057 A1 | 5/2020 | Stockman et al. |
| 2020/0211780 A1 | 7/2020 | Stockman |
| 2020/0251285 A1 | 8/2020 | Stockman |

(56) References Cited

U.S. PATENT DOCUMENTS

| | | |
|---|---|---|
| 2022/0328247 A1 | 10/2022 | Stockman |
| 2022/0328254 A1 | 10/2022 | Stockman |
| 2022/0336156 A1 | 10/2022 | Stockman |
| 2022/0336157 A1 | 10/2022 | Stockman |
| 2022/0336161 A1 | 10/2022 | Stockman |
| 2022/0344101 A1 | 10/2022 | Stockman |

FOREIGN PATENT DOCUMENTS

| | | | |
|---|---|---|---|
| CN | 3607691 | | 2/2007 |
| CN | 101991323 | | 3/2011 |
| CN | 104201077 A | * | 12/2014 |
| CN | 204351550 | | 5/2015 |
| CN | 304806073 | | 9/2018 |
| CN | 305610350 | | 2/2020 |
| CN | 305625370 | | 2/2020 |
| CN | 305780976 | | 5/2020 |
| EP | 129714 | | 1/1985 |
| EP | 1115128 | | 7/2001 |
| EP | 2587503 | | 3/2014 |
| FR | 2343221 | | 9/1977 |
| GB | 517718 | | 2/1940 |
| GB | 2169747 | | 7/1986 |
| GB | 2070861 | | 12/1997 |
| JP | S498747 A | | 1/1974 |
| JP | S498748 | | 2/1974 |
| JP | 07211596 A | | 8/1995 |
| JP | 2007059477 A | | 3/2007 |
| JP | 2015130259 | | 7/2015 |
| KR | 20160061825 A | * | 6/2016 |
| MX | 62279 | | 8/2021 |
| WO | WO 2010031594 | | 3/2010 |
| WO | WO 2010037186 | | 4/2010 |
| WO | WO 2014190072 | | 11/2014 |
| WO | WO 2020123834 | | 6/2020 |

OTHER PUBLICATIONS

[No Author Listed], "AC Capacitors," brochure by AmRad Engineering, Inc., May 19, 2014, 4 pages.
[No AuthorListed] "Industrial Power Factor Correction Capacitors," Cornell Dubilier, Undated (1 page).
[No AuthorListed] "The Patented Ultramet™ Capacitor," poster by American Radionic Co., Inc., (undated) (three pages).
[No AuthorListed] "The Patented Ultramet™ Capacitor. A product of years of American Radionic research & development," poster by American Radionic Co., Inc. (undated) (one page).
"American Radionic Co., Inc. Introduces A New Circuit Component The Patented Ultramet™ Capacitor," poster by American Radionic Co., Inc., (poster undated, 1980 year date appears below one image), (one page).
"American Radionic Co., Inc. Introduces A New Circuit Component, The Patented Ultramet™ Capacitor," poster by American Radionic Co., Inc., which is reprint from Electronic News dated Feb. 11, 1980, (one page).
"American Radionic Co., Inc. Introduces . . . The World's First Multiple Metallized Film Dielectric Capacitor Produced from a Single Winding! The Patented Ultramet™ Capacitor," poster by American Radionic Co., Inc, (undated) (one page).
"American Radionic Introduces Capacitors Without Compromise", color brochure, 1989, (1 page).
"Product of the Year Awards," Electronic Products Magazine, Jan. 1981, pp. 39-45.
"Super-Sized Show," ASHRae Journal Show Daily, 2005 International Air-Conditioning, Heating, Refrigerating Exposition, Tuesday, Feb. 8, 2005 (24 pages).
Amazon.com [online] "TEMCo Dual Run Capacitor RC0120-50/5 nnfd 370 V 440 V VAC volt 50+5 uf AC Electric Motor HVAC," Aug. 29, 2014, retrieved on Oct. 22, 2018, retrieved from UR:<<https://www.amazon.com/TEMCo-Capacitor-RC0120-50-ElectricMotor/dp/B01H0S87X6/ref+pd_sim_328_5>, 6 pages.
Amazon.com [online], "2"×3" Dry Erase Labels w/ clear Protective Flap, 50/Roll Backed w/ Clean-Remove Adhesive (Blue)," Apr. 1, 2015, retrieved on Apr. 5, 2018, retrieved from <URL: https://www.amazon.com/Labels-Protective-Backed-Clean-Remove-Adhesive/dp/B00VIDW1C1/ref=sr_1_18?ie=UTF8&clid=1522957818&sr=8-18&keycY0E2')/080')/0A6.>, 7 pages.
Amazon.com [online], "40+5 uf/ Mfd round Dual Universal Capacitor Trane Replacement USA2235-used for 370 or 440 VAC," Jun. 20, 2014, retrieved on Dec. 10, 2018, retrieved from URCL<: https://www.amazon.com/Round-Universal-Capacitor-Replacement-USA2235/dpBOOGSU4401/ref=cnn_cr_arp_d-product_top?ie=UTF8, 6 pages.
Amazon.com [online], "7.5 uf/Mfd Oval Universal Capacitor Trane Replacement USA 2031-used for 370 or 440 VAC," Nov. 26, 2014, retrieved on Apr. 11, 2018, retrieved from <URL: https://www.amazon.com/Universal-Capacitor-Trane-Replacement-USA2031/dp/BOOGSU4OKW/ref=pd_sim_328_3?_encoding=UTF8&pd_rd_i=BOOGSU4OKW&pd_rd_r=YX6P84XR7NY113X4DWJG&pd_rd_w=gejaD&pd_rd_wg=NLVIY&psc=1&refRID=YX6P84XR7NY113X4DWJG.> 6 pages.
Amazon.com [online], "Amrad Engineering USA2215 Round Motor Run Capacitor, 40 MFD, 370/440 VAC," Dec. 4, 2013, retrieved on Oct. 10, 2018, retrieved from <URL:https://www.amazon.com/dp/B00FL70COU/ref=cm_sw_r_cp_ep_dp_qIIZBbFD278ZE>, 6 pages.
Amazon.com [online], "AmRad Turbo 200 Mini Oval Capacitor: with label and color trim," May 5, 2015, retrieved on Apr. 10, 2018, retrieved from <URL: https://www.amazon.com/AmRad-Turbo-200-Mini-Oval/dp/BOOKQSKDOY/ref=pd_sbs_60_4?_encoding=UTF8&pd_rd_i=BOOKQSKDOY&pd_rd_r=A6')/0E2')/080')/0A6.>, 5 pages.
Amazon.com [online], "Amrad Turbo 200X Universal Motor Run Capacitor," Jan. 27, 2013, retrieved on Apr. 10, 2018, retrieved from <URL: https://www.amazon.com/Amrad-Turbo-Universal-Motor-Capacitor/dp/B00B610TOM/ref=pd_rhf_dp_s_cp_0_7?_encoding=UTF8&pd_rd_i=BOOB610TOM&pd_rd_r=N5WYCAD5Y36C86DFWDEG&pd_rd_w=6tW71&pd_rd_wg=DWEJcApsc=1&refRID=N5WYCAD5Y36C86DFWDEG.>, 6 pages.
Amazon.com [online], "AmRad USA2227 35+5 uf MFB 370 Volt VAC-Amrad Round Dual Run Capacitor Upgrade," Jun. 29, 2014, retrieved on Apr. 11, 2018, retrieved from <URL: https://www.amazon.com/AmRad-USA2227-MFD-370-Volt/dp/BOOGSU3YV8/ref=pd_day0_328_6?_encoding=UTF8&pd_rd_i=BOOGSU3YV8&pd_rd_r%E2')/080')/0A6.>, 6 pages.
Amazon.com [online], "MARS-Motors & Armatures 12788 45/5 MFD 440V Round Motor Dual Run Capacitor," Jan. 25, 2012, retrieved on Apr. 11, 2018, retrieved from <URL: https://www.amazon.com/MARS-Motors-Armatures-12788-Capacitor/dp/BOOCOYS2CM/ref=pd_sim_328_6?_encoding=UTF8&pd_rd_i=BOOCOYS2CM&pd_rd_r=KEFTlDXGOAWQIKCZDJFJ&pd_rd_w=LNF6S&pd_rd_wg=5eFTh&psc=1&refRID=KEFT1DXGOAWQ1KCZDJFJ.>, 7 pages.
Amazon.com [online], "Packard TRCFB405 40+5MFD/440/370VAC/RND Capacitor," May 1, 2015, retrieved on Apr. 26, 2018, retrieved from<URL: https://www.amazon.com/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=yljQe&pd_rd_wg=mH0n1&psc=1&refRID=SX1DRWZQZ8SH12JWHYH2&dp1D=31IxzeyCr/0252B7L&preST=_QL70_&dpSrc=detail.>, 5 pages.
Amazon.com [online], "PowerWell 35+5 uf MFD 370 or 440 Volt Dual Rub Round Capacitor Kit TP-CAP-35/5/440R Condenser Straight Cool/Heat Pump Air Conditioner and Zip Tie," Aug. 1, 2016, retired on Apr. 6, 2018, retrieved from <URL:https://www.amazon.com/dp/B0 1F7P8GJO/ref=sspa_dk_detail_4?psc=1.>, 6 pages.
Amazon.com [online], "Titan TRCFD405 Dual Rated Motor Run Capacitor Round MFD 40/5 volts 440/370," Aug. 21, 2016, retrieved on Apr. 11, 2016, retrieved from <URL: https://www.amazon.com/gp/product/B01HPK5ANO/ref=s9_dcacsd_dcoop_bw_c_x_6_w.>, 6 pages.
Amazon.com [online]. "CPT00656-45 +5uf MFD 440 Volt VAC-Trane Round Dual Run Capacitor Upgrade," May 11, 2016, retrieved on Apr. 11, 2018, retrieved from <URL: https://www.amazon.com/

(56) References Cited

OTHER PUBLICATIONS

CPT00656-Trane-Round-Capacitor-Upgrade/dp/BOOEVTIOMC/ref=cm_cr_arp_d_product_top?ie=UTF8.>, 6 pages.
Americamadionic.com, [online] "American Radionic Company's Chronology of Patents, New Products and Technology Transfer Programs—From the Present, to the Past, a Thirty-Five Year Review," online website having URL: http:/www.americanradionic.com/content/blogcategory/13/29/8/16 , accessed May 19, 2014 (undated) (3 pages).
Americamadionics.com, [online] "Home of the Turbo200 MultiUse Capacitor," online archive of website captured at http://web.archive.org/web/20050309191805fw_/http://www.americamadionic.com/home, Mar. 9, 2005, (16 pages), (accessed May 29, 2014).
Amradcapacitors.com [online], "Capacitors—Motor Run, Oil Filled Capacitors, AC Rated. AmRad." Printout of website having URL: http://amradcapacitors.com/index.htm, Jan. 3, 2003(20 pages).
Answer and affirmative defenses to Complaint by Cornell-Dubliner Electronics, Inc. (Allaman, Melissa) (Entered: Jan. 9, 2015), 10 pages.
Answer and affirmative defenses to Complaint by Packard Inc. (Allaman, Melissa) (Entered: Jan. 9, 2015), 10 pages.
Archrnews.com, [online] "AmRad Engineering: Universal Capacitor," The Air Conditioning|Heating|Refrigeration News, Jan. 29, 2005, Printout of website having URL: "http://www.archrnews.com/articles/print/amrad-engineering-universal-capacitor" (accessed Jun. 2, 2014) (1 page).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015. (VMF). (Entered: Feb. 10, 2015), 23 pages.
Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014), 47 pages.
Declaration of Noah C. Graubart in Support of Plaintiff's Claim Constmction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015), 250 pages.
Defendants' First Supplemental Disclosure of Non-Infringement and Invalidity Contentions *American Radionic, Inc.*, v. *Packard, Inc., and Cornell-Dubilier Electronics, Inc.*, No. 6:14-cv-01881-RBD-KRS, 26 pages.
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).
Ebay.com [online], "25+3 uF MFDx370 / 440 VAC Motor Run Capacitator AmRad USA2224BA—Made in USA," ebay.com, 2020 retrieved from URL: https://www.ebay.com/itm/25-3-uF-MFD-x-370-440-VAC-Motor-Run-Capacitor-AmRad-USA2224BA-Made-in-USA-/164162793031; retrieved on Oct. 28, 2020, 15 pages.
Edisontechcenter.org [online], "Batteries: types and History: Bright Star 1.5 V Columbia dry cell," 2014, retrieved on Jan. 4, 2019, retrieved from <http://edisontechcenter.org/batteries.html#drycell.>, 10 pages.
Eveready.com [online], "1950s Eveready Battery," 2018, retrieved on Nov. 30, 2018, retrieved from URL<http://www.eveready.com/about-us/battery-history>, 2 pages.

First Amended Answer and affirmative defenses to 1 Complaint by Cornell-Dubliner Electronics, Inc. (Allaman, Melissa) (Entered: Feb. 4, 2015), 17 pages.
First Amended Answer and affirmative defenses to 1 Complaint by Packard Inc. (Allaman, Melissa) (Entered: Jan. 9, 2015), 17 pages.
Grainger, "Round Motor Dual Run Capacitor, 40/5 Microfarad Rating, 370VAC Voltage," 2017, retrieved on Aug. 24, 2017, Retrieved from the Internet: URL<https://www.grainger.com/product/5CMW3&AL!2966!3!166587674359!!!g!82128730437!?cm_mmc=PPC:+Google+PLA?campaignid=719691765&s_kwcid=AL!2966!3!166587674359!!!!82128730437!&ef_id=WRSnxQAAAILWhRlb:20170824174108:s>, 5 pages.
Hudis, Martin et al., "Motor-Run Capacitors," Motors & Motor Control, undated (reprinted from Appliance Manufacturer, Oct. 1994) (3 pages).
Hudis, Martin, "Plastic Case Self-Protected Liquid Filled AC Capacitors for 70° Applications," Presented at CAPTECH '97, Mar. 1997, 7 pages.
Hudis, Martin, "Technology Evolution in Metallized Polymeric Film Capacitors over the Past 10 Years," Presented at CARTS Symposium in Nice, France, Oct. 1996, 9 pages.
International Search Report and Written Opinion, PCT/US2014/39003, dated Oct. 2, 2014, 12 pages.
Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015, 6 pages.
Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance,"PCIM Power Electronics 2001 Proceeding for the PowerSystems World Conference, Sep. 2001, 8 pages.
Mallory Distributor Products Co., 1967 Precision Electronic Components Catalog, 52 pages.
Minute Entry, Proceedings of Claim Construction Hearing held before Judge Roy B. Dalton, Jr. on Aug. 24, 2015. Court Report: Amie First (VMF) (FMV). (Entered: Aug. 24, 2015), 1 page.
NMR.mgh.harvard.edu [online], "Strategies to Repair or Replace Old Electrolytic Capacitors," available on or before Nov. 30, 2001, via Internet Archive: Wayback Machine URL <https://web.archive.org/web/20011130084328/https://www.nmr.mgh.harvard.edu/~reese/electrolytics/> retrieved on Apr. 22, 2021, URL <https://www.nmr.mgh.harvard.edu/-reese/electrolytics/, >, 6 pages.
NOTICE of Filing of Claim Constmction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).
Order granting 69 Motion for Consent Judgment and Injunction, Signed by Judge Roy B. Dalton, Jr. on Nov. 5, 2015. (CAC) (Entered Nov. 5, 2015).
Parente, Audrey, "Can-sized device the right fit," The Daytona Beach News-Journal, Jan. 3, 2005 (2 pages).
PCT International Preliminary Report on Patentability in International Appln. No. PCT/US2007/89034, dated Jul. 9, 2009, 6 pages.
PCT International Preliminary Report on Patentability in International Appln. No. PCT/US2014/039003, dated Dec. 3, 2015, 7 pages.
PCT International Preliminary Report on Patentability in International Appln. No. PCT/US2019/068738, dated Jul. 8, 2021, 11 pages.
PCT International Search Report and Written Opinion in International Appln. No. PCT/US2007/89034, dated Apr. 18, 2008, 9 pages.
PCT International Search Report and Written Opinion in International Appln. No. PCT/US2019/068738, dated Mar. 10, 2020 13 pages.
Photograph 1 from Defendants' First Supplemental Disclosure of Non-Infringement and Invalidity Contentions, undated (1 page).
Photograph 10, from Defendants' First Supplemental Disclosure of Non-Infringement and Invalidity Contentions, undated (1 page).

(56) References Cited

OTHER PUBLICATIONS

Photograph 11, from Defendants' First Supplemental Disclosure of Non-Infringement and Invalidity Contentions, undated (1 page).
Photograph 12, from Defendants' First Supplemental Disclosure of Non-Infringement and Invalidity Contentions, undated (1 page).
Photograph 13, from Defendants' First Supplemental Disclosure of Non-Infringement and Invalidity Contentions, undated (1 page).
Photograph 14, from Defendants' First Supplemental Disclosure of Non-Infringement and Invalidity Contentions, undated (1 page).
Photograph 15, from Defendants' First Supplemental Disclosure of Non-Infringement and Invalidity Contentions, undated (1 page).
Photograph 16, from Defendants' First Supplemental Disclosure of Non-Infringement and Invalidity Contentions, undated (1 page).
Photograph 17, from Defendants' First Supplemental Disclosure of Non-Infringement and Invalidity Contentions, undated (1 page).
Photograph 18, from Defendants' First Supplemental Disclosure of Non-Infringement and Invalidity Contentions, undated (1 page).
Photograph 19, from Defendants' First Supplemental Disclosure of Non-Infringement and Invalidity Contentions, undated (1 page).
Photograph 2 from Defendants' First Supplemental Disclosure of Non-Infringement and Invalidity Contentions, undated (1 page).
Photograph 20, from Defendants' First Supplemental Disclosure of Non-Infringement and Invalidity Contentions, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, from Defendants' First Supplemental Disclosure of Non-Infringement and Invalidity Contentions, undated (1 page).
Photograph 9, from Defendants' First Supplemental Disclosure of Non-Infringement and Invalidity Contentions, undated (1 page).
Plaintiff's Brief re 59 Declaration Plaintiff's Claim Construction Brief filed by American Radionic Company, Inc. (Graubart, Noah) (Entered Jun. 18, 2015), 38 pages.
Response to Plaintiff's Claim Construction Brief re 60 Brief— Plaintiff filed by Cornell-Dubliner Electronics, Inc., Packard Inc. (Killen, Craig) Modified on Jul. 17, 2015 (EJS). (Entered Jul. 16, 2015), 29 pages.
Ruby Lane.com [online], "SuzansTreasures.shop,1940s Mazon Cobalt Glass Jar Medicine Bottle," 2019, retrieved on Jul. 22, 2019, retrieved from URL<https://www.rubylane.com/item/34499-CCKx20-x20205/Mazon-Cobalt-Glass-Jar-Medicine-Bottle, 3 pages.
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015), 53 pages.
Transcript of Markman Hearing held on Aug. 24, 2015 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015. (ARF) (Entered: Oct. 1, 2015), 90 pages.
Webarchive.org [online] "Capacitors—Motor Run, Oil Filled Capacitors, AC Rated. AmRad." Online archive of website captured at http://webarchive.org/web/20041214091042/http://americanradionic.com, Dec. 14, 2004, (13 pages) (accessed May 29, 2014).
Webarchive.org [online], "Capacitors—Motor Run, Oil Filled Capacitors, AC Rated. AmRad." Online archive of website captured at http:/webarchive.org/web/20011126195819/http://www.americamadionic.com, Nov. 26, 2001, (13 pages) (accessed May 29, 2014).
Wikimedia.org [online], "Eveready PP4 battery," Oct. 22, 2016, retrieved on Nov. 30, 2018, retrieved from URL<https://connnnons.wikimedia.org/wiki/File:PP4-PP3-batteries.jpg>, 17 pages.
YouTube video [online] "AmRad's Turbo Installation" published on Apr. 22, 2012 by AmRad Engineering {link: https://www.youtube.com/watch?v=axo86NCbuNs&lc=UgguTwZgduBg5HgCoAEC}, 6 pages.
YouTube video [online] "HVAC 1 AC Repairs 1 Turbo 200 Capacitor Install 1 Crest Hill, IL 1 2" published on Jul. 15, 2011 by NLB Heating & Cooling hereafter referred to as NLB {link to video : https://www.youtube.com/watch?v=U7h7pg12t6M}, 3 pages.
YouTube.com "HVAC Run capacitor Made in the USA," Sep. 4, 2011, retrieved on Apr. 6, 2018, retrieved from <URL: https://www.youtube.com/watch?v=Xiw_xHXJHUg.>, 4 pages.
YouTube.com [online], "AC Fan/Compressor Not Working—How to Test/Repair Broken HVAC Run Start Capacitor Air, GE Dual Run Capacitor," Oct. 1, 2015, retrieved on Apr. 11, 2018, retrieved from <URL: https://www.youtube.com/watch?v=19A9IvQ611A&t=3s.>, 5 pages.
YouTube.com [online], "How to Install the Turbo 200 Capacitor Pt. 2," Jul. 15, 2011, retrieved on Apr. 11, 2018, retrieved from <URL: https://www.youtube.com/watch?v=U7h7pg12t6M.>, 3 pages.
YouTube.com [online], "VAC Service : Install New Turbo 200 Capacitor," Jul. 29, 2011, retrieved on Apr. 11, 2018, retrieved from <URL: https://www.youtube.com/watch?v=R5B189BWrz0.>, 3 pages.

* cited by examiner

HARD START KIT FOR MULTIPLE REPLACEMENT APPLICATIONS

CLAIM OF PRIORITY

This application claims the benefit of U.S. patent applications Ser. Nos. 63/182,540, filed Apr. 30, 2021, and 63/282,965, filed Nov. 24, 2021. The entire contents of the foregoing are hereby incorporated by reference.

TECHNICAL FIELD

The disclosure herein relates to a hard start capacitor replacement unit that is adaptable in the field for replacing any one of a plurality of multiple hard start modules.

BACKGROUND

Single phase induction motors of the type commonly used with air conditioner and cooling equipment compressors generally require some type of auxiliary start capacitor for starting the motor. A start capacitor, also sometimes referred to as a "hard start capacitor," is connected for a short period of time to start the motor, and the start capacitor is disconnected from the motor near or at the time the motor achieves its run speed. This time is generally on the order of 50-100 milliseconds. The start capacitor can be wired in series with contacts for disconnecting it. The contacts can be a part of a relay (e.g., a potential relay, a control relay, an electronic relay, etc.).

If the start capacitor or the relay controlling it fails, replacing the start capacitor and control relay is needed, and this generally is accomplished at the site of the motor. For air conditioners and other cooling equipment, this site could be a home, an office, a warehouse or factory, store, or any other building. This complicates the task of replacing the start capacitor and its connecting relay, in that a wide variety of brands and sizes of air conditioning and cooling units are in use, and these units use start capacitors having a variety of capacitances. Therefore, unless a repairman has a replacement hard start kit available with the correctly sized start capacitor, the repairman cannot complete repair without returning to a shop or parts distributor that has an inventory of hard start capacitor replacement parts.

Having to return to a shop or parts distributor in order to obtain the necessary materials to complete a repair is inefficient and time consuming and also delays the time that the customer's cooling system can be returned to operation.

Therefore, it would be advantageous if a repairman could carry one hard start replacement unit that is adaptable to many air conditioning units, cooling units, or other equipment utilizing single phase motors requiring a start capacitor, so that the repairman could adapt the hard start replacement unit to the requirements at hand and complete the repair in a timely manner.

SUMMARY

It is an advantage of the disclosure to provide a hard start capacitor replacement unit adaptable to more than one motor.

It is an additional advantage of the disclosure to provide a hard start capacitor replacement unit with selectable capacitance.

It is also an advantage of the disclosure to provide a hand start capacitor replacement unit with circuit interruption protection.

It is a further advantage of the disclosure to provide a hard start capacitor replacement unit that can be configured at a repair site to provide a desired selected capacitance.

It is also an advantage of the disclosure to provide a hard start capacitor replacement unit with at least four selectable capacitances.

It is another advantage of the disclosure to provide a hard start capacitor replacement unit with selectable capacitance that mounts in substantially the same space as an original start capacitor unit.

A hard start capacitor replacement unit is provided and has a capacitor container with a cover. A plurality of capacitors are contained within the container, each of said capacitors having a capacitance value. A common terminal is provided on the cover and is electrically connected to common terminals of each of the plurality of capacitors. A plurality of cover terminals is also provided on the cover spaced apart from the common terminal and from each other, with each cover terminal respectively electrically connected to one of the plurality of capacitors. A relay has contacts and is capable of opening and closing said contacts in response to a monitored condition of the motor. The relay also has external relay terminals. A fuse is electrically connected to the relay by a wire. The fuse electrically disconnects the hard start capacitor replacement unit and the motor upon a failure. A second wire electrically connects another relay terminal and the motor. A third wire electrically connects the common terminal and a relay terminal. A fourth wire electrically connects one or more cover terminals of the hard start capacitor replacement unit to one of the relay terminals. The contacts of the relay close to electrically connect one or more capacitors to the motor, and the contacts of the relay open to electrically disconnect the one or more capacitors from the motor.

In another aspect, the relay is positioned external to the capacitor container.

In another aspect, the fuse electrically disconnects the hard start capacitor replacement unit from the motor upon a current exceeding a threshold for a predetermined period of time.

In additional aspects, the threshold is at least 4 amperes.

In some aspects, the threshold is at least 10 amperes.

In additional aspects, the predetermined period of time is five seconds.

In some aspects, the fuse electrically disconnects the hard start capacitor replacement unit from the motor upon a failure of the relay.

In another aspect, the fuse electrically disconnects the hard start capacitor replacement unit from the motor upon a current exceeding 10 amperes for 5 seconds.

In another aspect, the fuse is electrically connected to a run capacitor of the motor.

In additional aspects, the run capacitor includes a booster terminal.

In some aspects, the fuse electrically disconnects the hard start capacitor and the booster terminal of the run capacitor upon a failure.

In another aspect, a hard start capacitor replacement unit is provided and has a capacitor container with a cover. A plurality of capacitors are contained within the container, each of said capacitors having a capacitance value. A common terminal is provided on the cover and is electrically connected to common terminals of each of the plurality of capacitors. A plurality of cover terminals is also provided on the cover spaced apart from the common terminal and from each other, with each cover terminal respectively electrically connected to one of the plurality of capacitors. A relay has contacts and is capable of opening and closing said contacts in response to a monitored condition of the motor. The relay also has external relay terminals. A fuse is mounted to the relay and electrically connected to the relay. The fuse electrically disconnects the hard start capacitor replacement unit and the motor upon a failure. A first wire electrically connects another relay terminal and the motor. A second wire electrically connects the common terminal and a relay terminal. A third wire electrically connects one or more cover terminals of the hard start capacitor replacement unit to one of the relay terminals. The contacts of the relay close to electrically connect one or more capacitors to the motor, and the contacts of the relay open to electrically disconnect the one or more capacitors from the motor.

In some aspects, the fuse electrically disconnects the hard start capacitor from the motor upon a current exceeding a threshold for a predetermined period of time.

In another aspect, the threshold is at least four amperes.

In additional aspects, the threshold is at least ten amperes.

In some aspects, the predetermined period of time is five seconds.

In yet another aspect, the fuse is mounted on an external surface of the relay.

In another aspect, the fuse is electrically connected to a relay terminal external to the relay.

The foregoing and other advantages and features herein will, in part, appear in the following detailed description and claims, taken together with the drawings.

DESCRIPTION OF DRAWINGS

The same reference numerals refer to the same elements throughout the various Figures.

DETAILED DESCRIPTION

Figure 1:
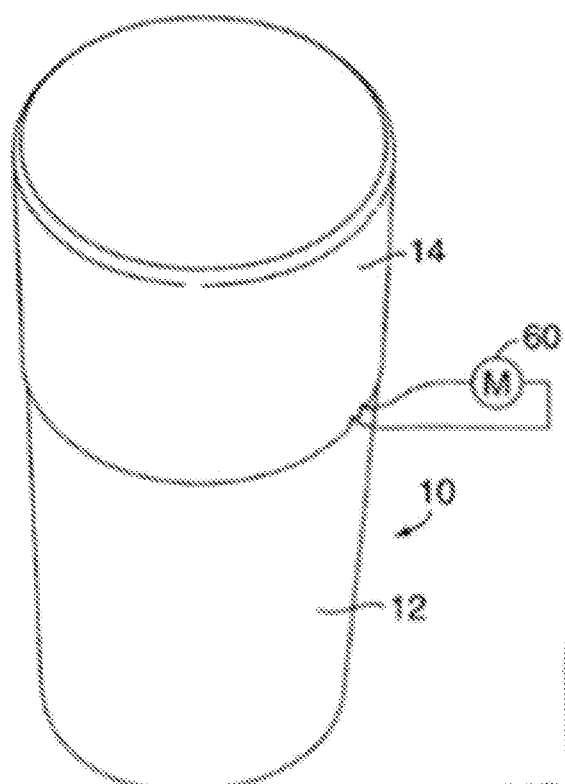
FIG. 1 is a perspective view of a hard start capacitor replacement unit shown connected to a schematic motor.
Figure 2:
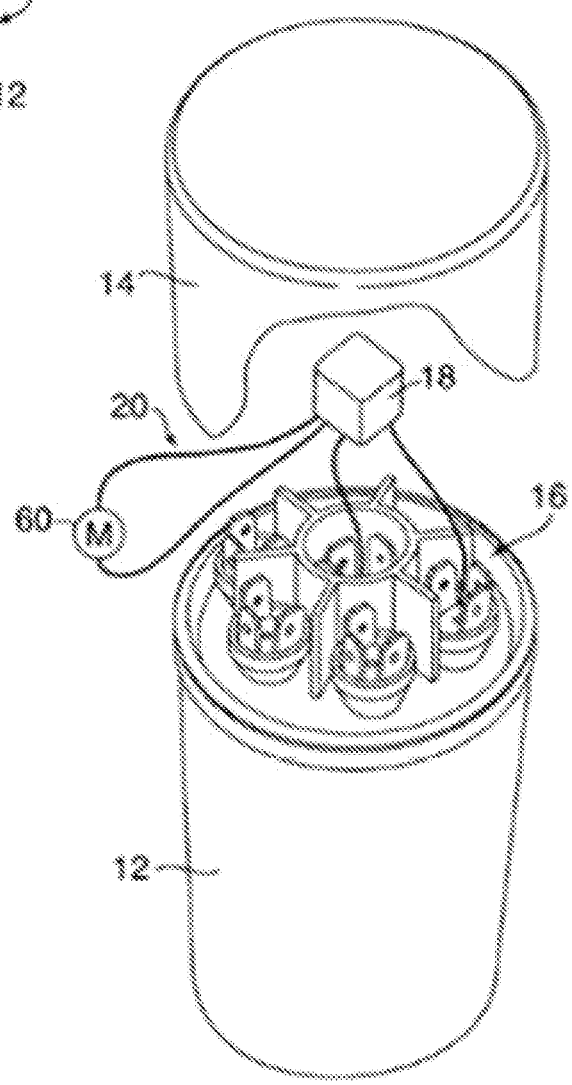
FIG. 2 is an exploded perspective view of the hard start capacitor replacement unit of FIG. 1.

With reference to FIG. 1, a hard start capacitor replacement unit 10 is shown, including a cylindrical capacitor container 12 and a cylindrical cap 14 fitted onto the container 12 and extending therefrom. With reference to FIG. 2, the cap 14 may be removed from the container 12, to expose the cover 16 of the container, an electronic relay 18, and wire means 20 providing desired electrical connections for the hard start capacitor replacement unit 10 to a motor 60.

The container 12 is preferably 2½ inches in diameter with a length of 5¾ inches and has a plurality of capacitors therein; however other dimensions can be employed. In the embodiment shown and with reference to FIG. 3, four capacitors 22, 24, 26 and 28 are provided within the container 12. Also in the embodiment shown, the capacitors 22, 24, 26 and 28 are wound in a cylindrical capacitive element 30 having a common element terminal 32 at the bottom thereof and four capacitor terminals 23, 25, 27 and 29 at the top thereof.

The capacitors of capacitive element 30 can be provided by metallized film capacitors concentrically wound together as the cylindrical capacitance element 30. The film is preferably polypropylene metallized with zinc and may be in a range of approximately 2-4 microns in thickness, for example. This is an advantageous film for several reasons. First, start capacitors generally require a higher capacitance value than run capacitors, i.e., run capacitors generally have typical capacitance values in the range of about 15 to about 65 microfarads, whereas start capacitors may have typical capacitance values up to about 300 microfarads. Such high start capacitance values have generally been achieved with electrolytic capacitors because 300-microfarad capacitors with typical film thicknesses would be bulky and require a large container that may not fit into the space provided in an air conditioning unit or the like. However, with recognition that a start capacitor is utilized for about one second or less as the motor starts, it does not have to be rated at high voltage over a long period of time. Therefore, a thin film may be used and the required capacitance is attained in a reasonably sized capacitive element. A further advantage is that the resultant metallized film capacitive element has stable capacitance values over a relatively wide ambient temperature range, and also has a long service life.

Figure 3:
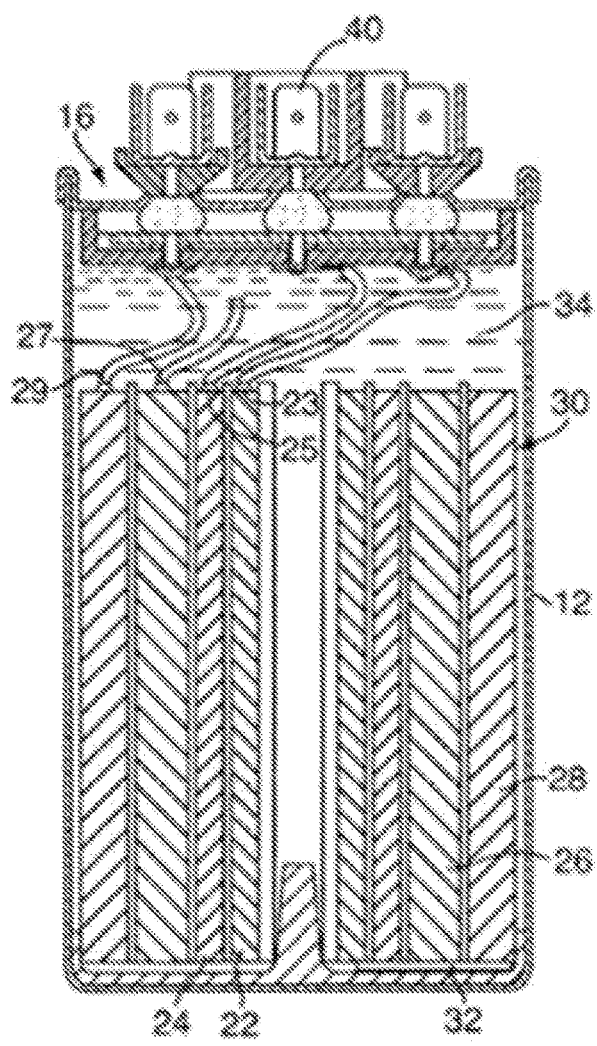
FIG. 3 is a sectional view of a capacitor, capacitor container and cover of the hard start capacitor replacement unit of FIG. 1.

The container can be filled with a dielectric fluid 34 and the cover 16 is provided with circuit interruption protection in the event the capacitive element fails, such as shown in FIG. 3 and described in U.S. Pat. No. 7,203,053, the entirety of which is incorporated herein by reference. These are also advantages in fabricating the capacitors 22, 24, 26 and 28 for the hard start capacitor replacement unit 10 from metallized film.

In some arrangements, circuit interruption protection is provided by the winding or windings, e.g., in the form of segmented film. For example, a circuit including segmented film can provide interruption protection to individual segments of the circuit (e.g., by opening an electrical connection) in the event of a capacitive failure. In some embodiments, a capacitive failure causes a reduction of capacitance as a dielectric film in the circuit segment fails. This occurs as very small links between the segmented circuit separate as high current, created by, e.g., a capacitor or motor failure, crosses through the dielectric film, breaking the segmented circuit (e.g., creating an open circuit), which can prevent the damage from spreading throughout the circuit. The film can be, e.g., between about 4.0 μm and 4.8 μm in thickness, between about 6.8 μm and 5.8 μm in thickness, or between about 1.0 μm and 25 μm in thickness.

In some implementations, the container is at least partially filled with, e.g., solidified epoxy or resin (e.g., urethane, polyurethane, acrylic, cyanoacrylate, etc.) or a combination of materials. For example, the container can be halfway filled with epoxy, resin, or a combination of materials. In another example, the container can be completely filled with epoxy, resin, or a combination of materials.

Although the capacitors may be provided in a cylindrical capacitive element 30 wound of metallized film, the capacitors 22, 24, 26, 28 may be individual wound capacitors having respective ends electrically connected to form a common terminal. In some arrangements, capacitors include multiple windings. In some arrangements, the capacitors may be provided by a single winding. In some arrangements, common ends of the capacitors are electrically connected. In some arrangements, capacitances are provided by connecting individual capacitors. In some arrangements, capacitances are provided by multiple windings which are vertically stacked on top of each other. Combinations of windings in series or in parallel can be arranged to provide a capacitance value. Arrangements of capacitors with single or multiple windings are described in U.S. Pat. No. 7,423,861, which is incorporated herein by reference in its entirety. For example, first and second dielectric films, each having a metalized layer on one side thereof, are wound in cylindrical form on the mandrel with the non-metalized side of one film being in contact with the metalized side of the other. Selected portions of one or both of the metalized layers are removed in order to provide a multiple section capacitive element.

Element insulation barriers are inserted into the winding to separate the capacitor sections, the element insulation barriers also assuming a cylindrical configuration. Five element insulation barriers 30-34 are provided to separate the six capacitor sections 20-25, with element insulation barrier 30 separating capacitor sections 20 and 21, element insulation barrier 31 separating capacitor sections 21 and 22, element insulation barrier 32 separating capacitor sections 22 and 23, element insulation barrier 33 separating capacitor sections 23 and 24, and element insulation barrier 34 separating capacitor sections 24 and 25.

The individual wound capacitors can be connected in a variety of ways to provide the desired capacitances. Some implementations include connections between multiple windings. For example, in several implementations, the individual wound capacitors can be connected in series to provide the desired capacitances. In some implementations, the individual wound capacitors can be connected in parallel to provide the desired capacitances. In some implementations, individual wound capacitors can be connected to each other in a mixture of series and parallel (e.g., some capacitors can be connected in series and some can be connected in parallel). The capacitive element 30 may be provided with more or less than five capacitors. The capacitors may also be provided as two or more capacitive elements each having one or more capacitors.

In the hard start capacitor replacement unit 10 shown and described herein, the capacitors can have a range of values. For example, capacitor 22 connects to capacitor terminal 23 and can have a range of values (e.g., a capacitance of 48 microfarads, 44 microfarads, 42 microfarads, etc.). Capacitor 24 includes capacitor terminal 25 and can also have a range of values (e.g., a capacitance of 48 microfarads, 44 microfarads, 42 microfarads, etc.). Capacitor 26 includes capacitor terminal 27 and can have a range of value (e.g., a capacitance of 88 microfarads, 84 microfarads, 82 microfarads, etc.) and capacitor 28 includes capacitor terminal 29 and can have a range of values (e.g., a capacitance of 114 microfarads, 112 microfarads, 110 microfarads, etc.). In some instances, multiple capacitors have equivalent values. In some instances, multiple capacitors have different values.

As perhaps best seen in FIGS. 5-8, the cover 16 includes a common cover terminal 40 in the center thereof, and includes capacitance value terminals 42, 44, 46 and 48 spaced apart from the common cover terminal 40 and from each other. The common cover terminal 40 is connected to common element terminal 32 of the capacitive element 30 and thereby to each of the capacitors 22, 24, 26 and 28. The capacitance value cover terminal 42 is connected to the capacitor terminal 23 of capacitor 22 and the capacitance value cover terminal 44 is connected to the capacitor terminal 25 of capacitor 24. The capacitance value cover terminal 46 is connected to the capacitor terminal 27 of capacitor 26 and the capacitance value cover terminal 48 is connected to the capacitor terminal 29 of capacitor 28. Therefore, the capacitance values of the capacitors 22, 24, 26, 28 are respectively available for wire connections at the corresponding capacitance value cover terminals 42, 44, 46, 48 on the cover 16 of container 12.

A cover insulation barrier 50 is also mounted to the cover 16 to better isolate the cover terminals. The cover insulation barrier 50 has a cylindrical portion 52 surrounding the common cover terminal 40 and has radial extending fins 54-58 that separate the other capacitance value cover terminals. An extra fin is shown, which would insulate another one or two capacitance value cover terminals if an additional one or two capacitors were provided.

Figure 4:
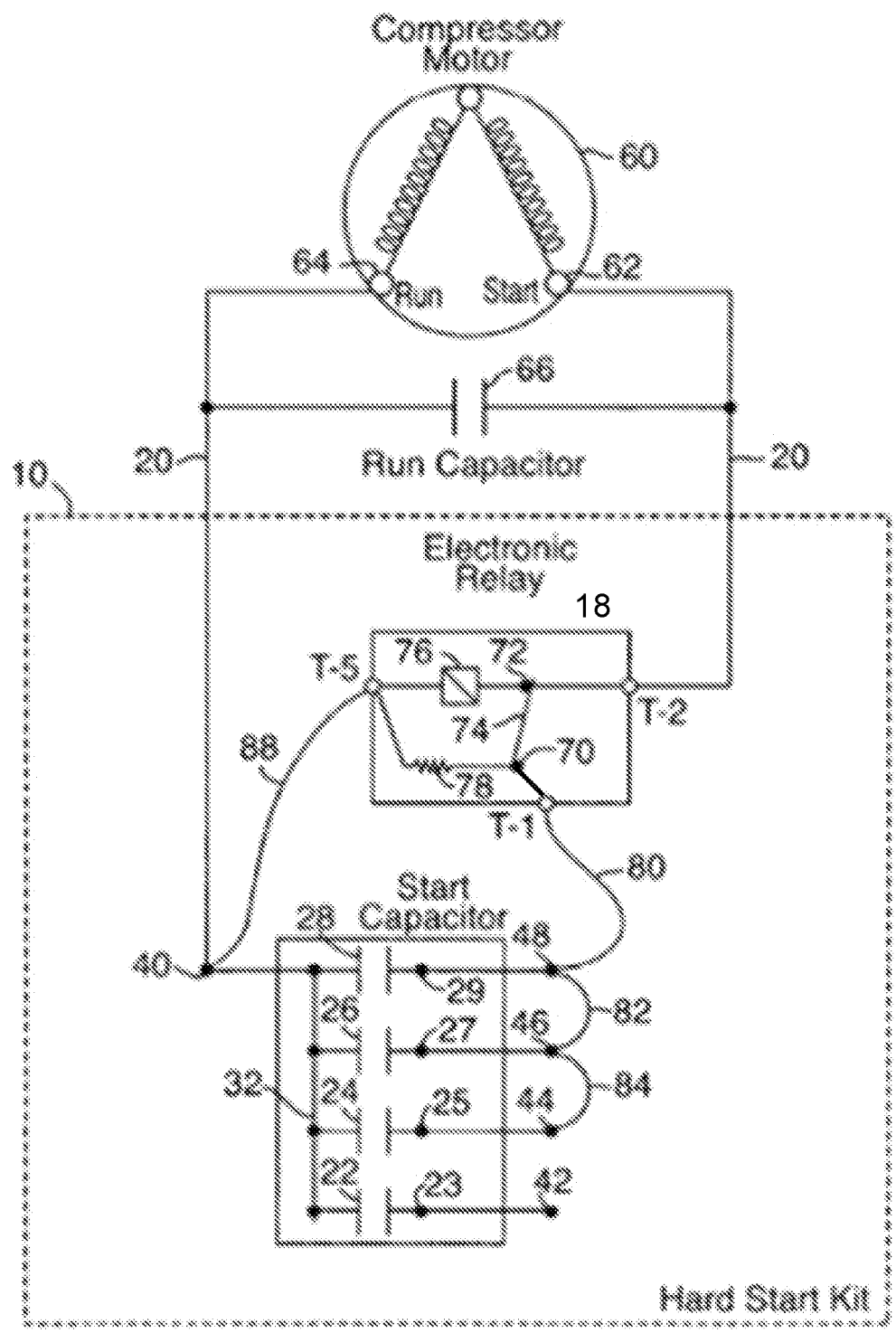
FIG. 4 is a schematic circuit diagram of the hard start capacitor replacement unit of FIG. 1, shown connected to a motor.

With reference to FIG. 4, a schematic diagram of the start capacitor replacement unit 10 is shown. The electronic relay 18 has external terminals that accept electrical connections (e.g., wire termination clips) so that the external terminals can be connected, for example, to the common cover terminal 40, and the capacitance value cover terminals 42, 44, 46 and 48, as well as with start and run terminals 62 and 64 of the motor 60. External terminals T-1 and T-2 of electronic relay 18 are internally connected with contacts 70 and 72, respectively, that may be connected by a contact bar 74, as schematically shown. The electronic relay 18 also includes an external terminal T-5. The electronic relay 18 includes circuitry indicated at 76 that monitors the voltage and the dv/dt between terminals T-2 and T-5 and controls the opening and closing of the contacts 70 and 72 in response thereto. Terminals T-2 and T-5 are connected to the start and run terminals 62 and 64 of compressor motor 60 by wires 20, so that the electronic relay monitors the voltage across the start and run windings. Terminal T-5 may also be connected between the start and run windings of motor 60. When the contacts 70 and 72 are closed, the electronic relay 18 connects the selected ones of the capacitors 22, 24, 26 and 28 across the terminals 62 and 64 in parallel with the run capacitor 66 to assist in starting the motor. A bleeder resistor 78 discharges the capacitor(s) when contacts 70, 72 are open. The bleeder resistor 78 can have a range of suitable resistances (e.g., about 8 kOhms to about 20 kOhms). A suitable electronic relay is available from Zhejiang Hongli Electric Co., Part No. HLR3800-6AM1D.

Figure 9:
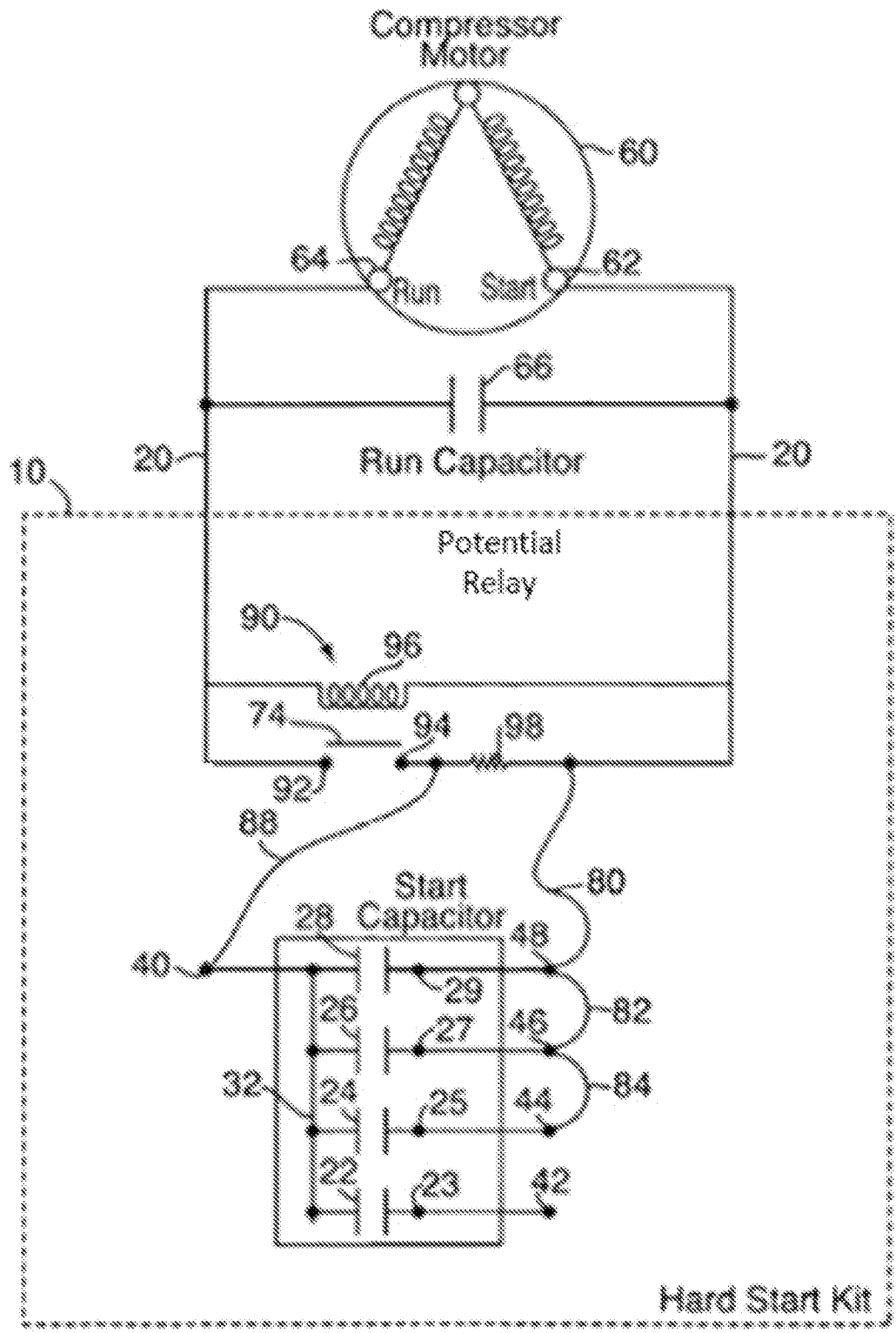
FIG. 9 is a schematic circuit diagram of another hard start capacitor replacement unit, shown connected to a motor.

With reference to FIG. 9, the hard start capacitor replacement unit 10 may also be used with a control or potential relay 90 as shown in the schematic. The relay contacts 92 and 94 are closed by contact bar 74 to connect selected ones of capacitors 22, 24, 26, 28 across run terminals 62, 64 of motor 60, and contacts 92, 94 are opened by coil 96 when the motor 60 starts. Bleeder resistor 98 is provided to bleed off the capacitor charge when the contacts 92, 94 are open.

It will also be appreciated that although the capacitors of the hard start unit 10 are shown connected across motor terminals 62, 64, the purpose of this connection is to connect the capacitors of the start capacitor in parallel with the motor run capacitor 66 of the motor 60, and any connection that accomplishes this is suitable.

Figure 8:
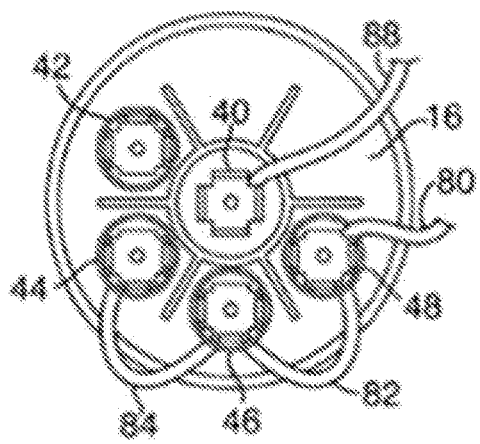
FIG. 8 is a top view of the cover and cover terminals of the hard start capacitor replacement unit of FIG. 1 showing the capacitors connected to provide a fourth capacitance value.

Referring again to FIG. 4, the capacitors 22, 24, 26 and 28 are connected as also shown in FIG. 8, in which a first wire 80 connects T-1 of the electronic relay with the capacitance value cover terminal 48, which can provide 112 microfarads of capacitance value. Jumper wire 82 between capacitance value cover terminals 48 and 46 can provide an additional 88 microfarads of capacitance value into the circuit. Wire 88 connects the common terminal 40 to terminal T-5 of the electronic relay 18. Jumper wire 84 connecting capacitance value cover terminal 46 and capacitance value cover terminal 44 can provide a further 48 microfarads into the circuit. Thus, in the configuration shown in FIGS. 4 and 6, a total capacitance of 248 microfarads is provided to start the motor 60 when the contacts of the electronic relay 18 are closed.

Figure 5:
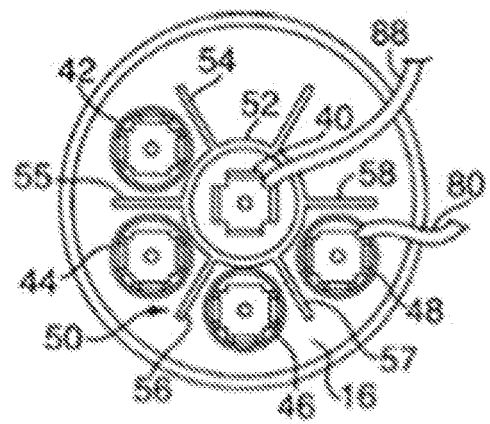
FIG. 5 is a top view of the cover and cover terminals of the hard start capacitor replacement unit of FIG. 1, showing the capacitors connected to provide a first capacitance value.
Figure 6:
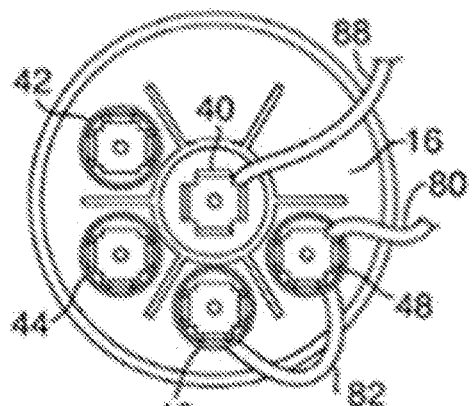
FIG. 6 is a top view of the cover and cover terminals of the hard start capacitor replacement unit of FIG. 1, showing the capacitors connected to provide a second capacitance value.
Figure 7:
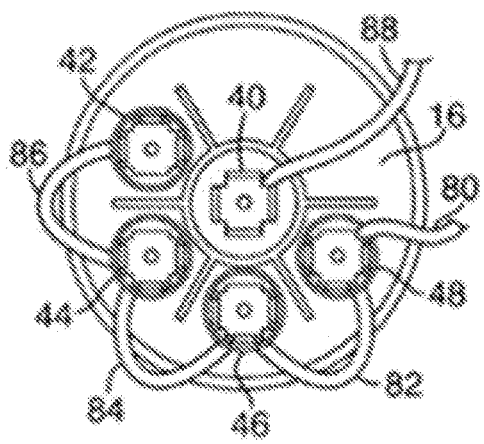
FIG. 7 is a top view of the cover and cover terminals of the hard start capacitor replacement unit of FIG. 1, showing the capacitors connected to provide a third capacitance value.

It will be appreciated that a variety of capacitance values may be selected by connecting various ones of the capacitance value cover terminals to each other. Some preferred connections are shown in FIGS. 5-8. FIG. 5 shows connection of capacitor 28 by wire 80 at capacitance value cover terminal 48 (e.g., providing 112 microfarads), which is suitable for use where capacitance values in the range 108-130 microfarads are desired for the motor start. FIG. 6 shows connection of capacitors 26 and 28 by jumper wire 82 at capacitor value cover terminals 46 and 48 providing, e.g., 200 microfarads of capacitance value, which is suitable for desired capacitance values in the range of 189-227 microfarads. FIG. 7 shows all of the capacitors 22, 24, 26, 28 connected into the circuit at capacitor value cover terminals 42, 44, 46 and 48 by jumper wires 82, 84 and 86 to provide, e.g., a total 296 microfarads, which is suitable for use in applications requiring capacitance values in the range of 270-324 microfarads. FIG. 8 shows connection of capacitors 28, 26 and 24 by jumper wires 82 and 84 providing 248 microfarads, for use with applications requiring capacitance values of 233-280 microfarads.

If desired, the total capacitance values connected into the circuit can be further refined with possible capacitance values of, for example, 48 microfarads, 88 microfarads, 96 microfarads, 136 microfarads, 160 microfarads, 184 microfarads and 208 microfarads, being available in addition to the 112 microfarads, 200 microfarads, 240 microfarads and 296 microfarads configurations shown above. Lower values and higher values are also possible.

Once the desired capacitance value is selected by placing appropriate jumper wires on the cover terminals, the cap 14 may be fitted over the container 12, to surround the capacitor value cover terminals and electronic relay 18. The hard start capacitor replacement unit 10 has a suitable size and shape to be accommodated in the space provided for the original start capacitor, so the hard start replacement unit 10 is readily accepted for mounting in existing equipment.

As a result of the foregoing, a repairman can carry the hard start capacitor replacement unit 10 to repair site with confidence that a failed start capacitor unit can be replaced without need to return to a shop or parts distributor in order to complete the repair.

Figure 10:
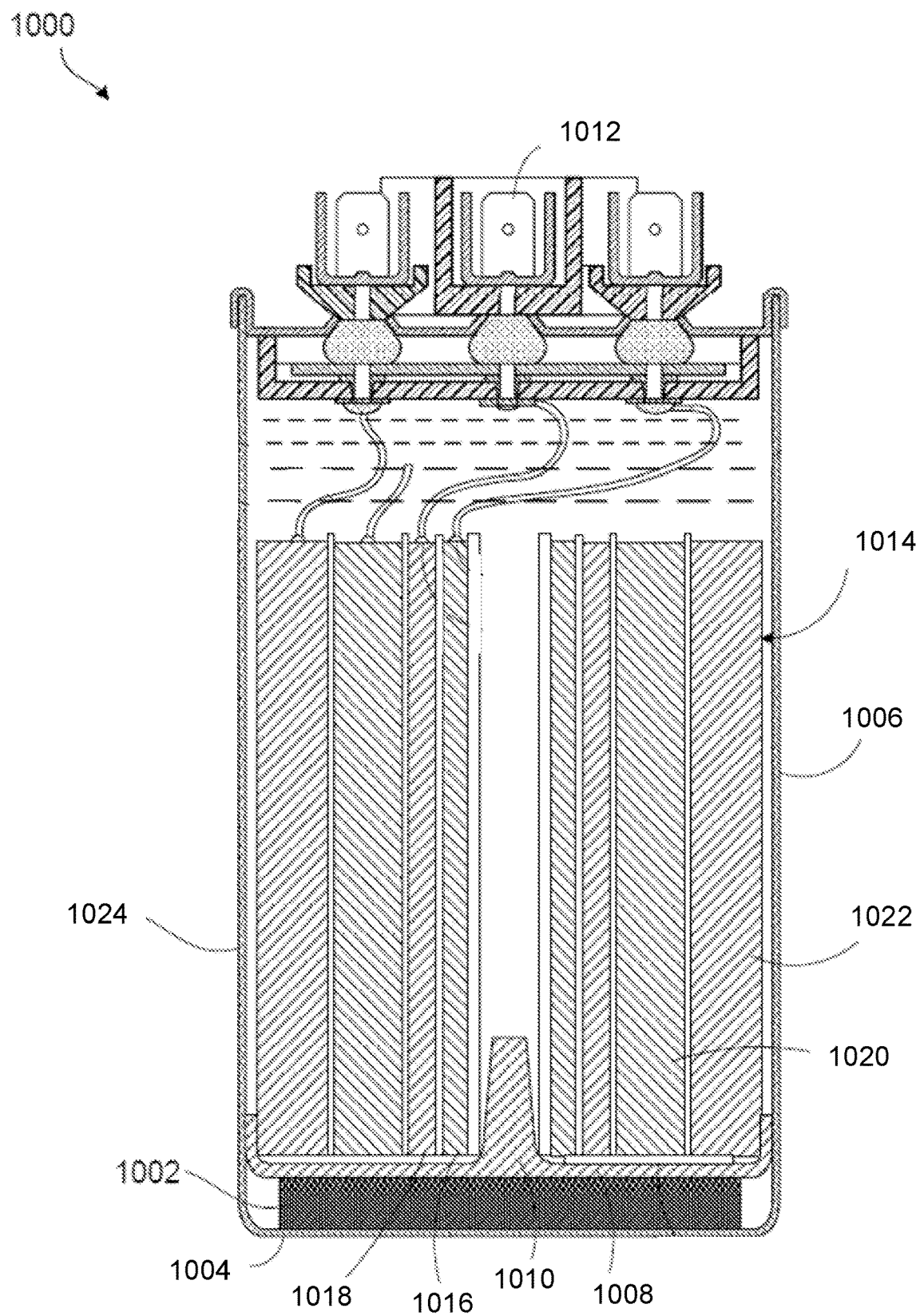
FIG. 10 is a sectional view of an example of a hard start capacitor replacement unit and a magnet.

Another hard start capacitor replacement unit 1000 is illustrated in FIG. 10. The relay of this hard start capacitor replacement unit 1000 is not shown. The hard start capacitor replacement unit 1000 may have the same or similar external appearance and functionality as hard start capacitor replacement unit 10, and may be adapted to replace any one of a large number of capacitors with the hard start capacitor replacement unit 1000 connected to provide the same capacitance value or values of a failed capacitor.

The hard start capacitor replacement unit 1000 may include one or more magnetic elements for assisting in mounting of the hard start capacitor replacement unit 1000 (e.g., to an air conditioning system). In the illustrated example, a magnet 1002 is positioned toward a bottom end of the hard start capacitor replacement unit 1000. In particular, the magnet 1002 is positioned between a bottom wall 1004 of a case 1006 (e.g., sometimes referred to as a container) of the hard start capacitor replacement unit 1000 and a bottom cup 1008 of the hard start capacitor replacement unit 1000 (e.g., beneath a center post 1010 of the bottom cup 1008). The magnet 1002 is configured to create magnetic attraction between the magnet 1002 and a magnetic attractable surface in proximity to the hard start capacitor replacement unit 1000. For example, the magnet 1002 may cause the bottom wall 1004 of the case 1006 to be attracted to a metallic surface of an air conditioning system, thereby improving the integrity of a mounting between the hard start capacitor replacement unit 1000 and the air conditioning system after installation. The magnet 1002 may be designed such that the strength of magnetic attraction between the magnet 1002 and the air conditioning system is such that the magnet 1002 may remain firmly in place in response to possible vibration and/or other movement of the air conditioning system during operational use. In some implementations, the strength of magnetic attraction between the magnet 1002 and the air condition system is such that a user (e.g., a technician installing or uninstalling the hard start capacitor replacement unit 1000) can remove the hard start capacitor replacement unit 1000 from the surface of the air conditioning system without requiring excessive effort.

While the magnet 1002 is illustrated as being positioned interior to the case 1006 of the hard start capacitor replacement unit 1000, in some implementations, the magnet 1002 may be positioned outside of the case 1006 on an exterior of the bottom wall 1004 of the case 1006. For example, the magnet 1002 may have a disk shape that is positioned outside of the case 1006 at an outer surface of a base of the case 1006.

In some examples, the magnet 1002 may have a rectangular shape. For example, the magnet 1002 may be a rectangular strip that runs along the bottom wall 1004 of the case 1006 of the hard start capacitor replacement unit 1000. In particular, the rectangular strip may have a particular thickness, a first dimension that runs from the left side of the hard start capacitor replacement unit 1000 to the right side of the hard start capacitor replacement unit 1000 as illustrated in FIG. 10, and a second dimension that is perpendicular to the first dimension and smaller than the first dimension. In some implementations, the magnet 1002 may have a square shape (e.g., such that the first dimension is equal to or substantially equal to the second dimension). In some implementations, the magnet 1002 may have a rod shape. In some implementations, the magnet 1002 may have a circular shape (e.g., a disk shape) or a hollow circular shape (e.g., a ring shape). For example, in some implementations, the magnet 1002 may have dimensions equal to or substantially equal to the dimensions of a disk-shaped battery (e.g., a watch battery such as a CR2032 battery). In some implementations, the magnet 1002 is a disk-shape with a thickness of approximately 4 mm and a diameter of approximately 160 mm. In some implementations, the magnet 1002 is a disk-shape with a thickness of approximately 4 mm and a diameter of approximately 40 mm. In some implementations, the magnet 1002 is a disk-shape with a thickness of approximately 4.5-5 mm and a diameter of about 60 mm. In some implementations, the magnet 1002 is a disk-shape with a thickness of approximately 5 mm and a diameter of about 60 mm.

The particular shape and/or dimensions of the magnet 1002 may be chosen to achieve the desired strength of magnetic attraction. For example, the magnet 1002 may be designed with a particular shape and/or larger dimensions and/or larger thicknesses to achieve a relatively higher strength of magnetic attraction with a magnetic surface. In some implementations, increased surface area of the magnet 1002 toward the bottom wall 1004 of the case 1006 of the hard start capacitor replacement unit 1000 may increase the strength of magnetic attraction.

In some implementations, the magnet 1002 has a strength of approximately 30-40 milliTeslas (mT) or a strength of approximately 65-75 mT. In some implementations, the strength of magnetic attraction can be increased by stacking multiple magnets 1002 (e.g., on top of each other). In some implementations, two stacked magnets 1002 can have a strength of approximately 70-80 mT, 60-80 mT, or 130-150 mT, although other ranges are also possible. In some implementations, the magnet 1002 may be a D40x4 ferrite ceramic magnet manufactured by Hangzhou Honesun Magnet Co., Ltd.

In some implementations, the magnet 1002 may be magnetized using one or more of a plurality of techniques. For example, in some implementations, the magnet 1002 may be magnetized such that a north and a south pole of the magnet 1002 is located at a particular position of the magnet 1002. For example, the techniques for magnetizing the magnet 1002 may cause the north and/or south pole to be located at various thicknesses of the magnet 1002, various axial positions of the magnet 1002, various diametric positions of the magnet 1002, and/or various radial positions of the magnet 1002. In some implementations, the magnet 1002 may be a multi-pole magnet.

In some implementations, the magnet 1002 is a permanent magnet that is made from a material that is magnetized and creates its own persistent magnetic field. For example, the magnet 1002 may be made from a ferromagnetic material that can be magnetized, such as iron, nickel, cobalt, and/or an alloy of rare-earth metals, among others. In some implementations, the magnet 1002 is a ferrite and/or ceramic magnet. In some implementations, the magnet 1002 may include one or more of ferric oxide, iron oxide, barium, barium carbonate, strontium, and/or strontium carbonate. The magnet 1002 may include one or more magnetically "hard" materials (e.g., materials that tend to stay magnetized). Alternatively or additionally, the magnet 1002 may include one or more magnetically "soft" materials.

In some implementations, the magnet 1002 may be a rare-earth magnet. A rare-earth magnet is typically a relatively strong permanent magnet that is made from one or more alloys of rare-earth elements. Example of rare-earth elements that can be used in a rare-earth magnet include elements in the lanthanide series, scandium, and yttrium, although other elements may also or alternatively be used. In some implementations, the rare-earth magnet may produce a magnetic field of greater than 1.0 T (teslas). In some implementations, the rare-earth magnet may include one or both of samarium-cobalt and neodymium.

In some implementations, the magnet 1002 may be made from one or more ceramic compounds (e.g., ferrite) that can be produced by combining iron oxide and one or more metallic elements. In some implementations, such ceramic compounds may be electrically nonconductive. The use of such ceramic compounds for the magnet 1002 may eliminate the inclusion of electrically conductive elements in the hard start capacitor replacement unit 1000 that may otherwise affect the operation of the hard start capacitor replacement unit 1000.

In some implementations, the magnet 1002 may have a grade that corresponds to a particular standard (e.g., a National and/or International standard). In some implementations, the grade of the magnet 1002 corresponds to the Chinese ferrite magnet nomenclature system. For example, in some implementations, the magnet 1002 is grade Y10T, Y25, Y30, Y33, Y35, Y30BH, or Y33BH, although other grades are also possible. In some implementations, the grade corresponds to a working temperature of 250° C. In some implementations, the grade of the magnet 1002 corresponds to a Feroba, an American (e.g., "C"), or a European (e.g., "HF") grading standard.

In some implementations, the magnet 1002 may be an electromagnet that produces a magnetic field by introducing an electric current. In some implementations, the electromagnet may include a magnetic core and a wire (e.g., an insulated wire) wound into a coil around the magnetic core. The magnetic core may be made from a ferromagnetic or a ferrimagnetic material such as iron or steel. The magnetic core may be made from a "soft" magnetic material (e.g., a magnetic material that can allow magnetic domains in the material to align upon introduction of the current through the coil).

By using an electromagnet as the magnet 1002, the strength of magnetic attraction can be turned on and off and/or customized according to the current passed through the coil. For example, current can be applied through the coil to cause the electromagnet to generate a magnetic field, and the current can be removed from the coil to cause the electromagnetic to cease generating the magnetic field. In some implementations, the strength of the magnetic field (and, e.g., the strength of magnetic attraction created by the electromagnet) can be adjusted based on the magnitude of electrical current passed through the coil. For example, relatively higher magnitudes of electrical current correspond to higher magnetic field strengths and therefore higher strengths of magnetic attraction (e.g., with a magnetic surface), and relatively lower magnitudes of electrical current correspond to lower magnetic field strengths and therefore lower strength of magnetic attraction.

In some implementations, the particular material used for the core of the electromagnet and/or the dimensions of the core may be chosen to achieve the desired strength of magnetic attraction. The core may be made from a material such as one or both of iron and steel. In some implementations, the dimensions of the coil and/or the number of turns of the coil may also be chosen to achieve the desired strength of magnetic attraction.

In some implementations, the current that is provided through the coil may be provided by a connection with one or more of the capacitance value terminals and the common cover terminal 1012 of the hard start capacitor replacement unit 1000. For example, a conductor (e.g., a wire) may be used to connect one or more of the capacitance value terminals to a first end of the coil and a conductor may be used to connect another one of the capacitance value terminals or the common cover terminal 1012 to a second end of the coil. In this way, the current that otherwise runs through the electrical components of the hard start capacitor replacement unit 1000 can also be used to power the electromagnetic, thereby causing the electromagnet to generate a magnetic field.

In some implementations, the hard start capacitor replacement unit 1000 may include one or more different and/or additional electrical components that can be used by the electromagnet to generate the magnetic field. For example, the hard start capacitor replacement unit 1000 may include a separate capacitor that is configured to store a charge to be used to subsequently apply current through the coil of the electromagnet. In this way, the electromagnet may have a separate power source that can be used when generation of a magnetic field is desired.

In some implementations, the hard start capacitor replacement unit 1000 may include a switch that can be toggled by a user (e.g., a technician or an operator of the hard start capacitor replacement unit 1000) to cause the electromagnet to generate or cease generating the magnetic field. The switch may cause an electrical connection in the coil to be temporarily broken and restored. In some implementations (e.g., implementations in which the coil is connected to one or more of the capacitance value terminals and/or the common cover terminal 1012), the switch may cause the conductor that connects the coil to one or more of the capacitance value terminals or the conductor that connects the coil to the common cover terminal 1012 to be temporarily broken and restored, such that the magnetic field generated by the electromagnet can be toggled on and off. In this way, the user can toggle the magnetic field on when mounting of the hard start capacitor replacement unit 1000 is desired (e.g., at the time of installation) and toggle the magnetic field off when mounting of the hard start capacitor replacement unit 1000 is not desired (e.g., when the hard start capacitor replacement unit 1000 is not in use and/or being stored) or when magnetic attraction is not desired (e.g., when mounting the hard start capacitor replacement unit 1000 at a location that does not include a magnetic surface).

In some implementations, the capacitive element of the hard start capacitor replacement unit 1000 and/or the capacitors of the hard start capacitor replacement unit 1000 may be used to store the charge that is provided to the coil to cause the magnetic field to be generated. For example, the capacitive element 1014 and/or one or more of the capacitors 1016, 1018, 1020, 1022 may be configured to store a charge that is subsequently provided to the coil of the electromagnetic. In this way, electrical charge that is otherwise stored by the hard start capacitor replacement unit 1000 during typical use can also be used to power the electromagnet.

While the hard start capacitor replacement unit 1000 shown in the illustrated example includes one magnet 1002, additional magnets may also be provided. For example, a plurality of magnets may be positioned between the bottom wall 1004 of the case 1006 of the hard start capacitor replacement unit 1000 and the bottom cup 1008 of the hard start capacitor replacement unit 1000. The plurality of magnets may have dimensions that are relatively smaller than dimensions that may be chosen for implementations in which only a single magnet 1002 is used. The plurality of magnets may have dimensions substantially similar to dimensions of a watch battery, such as a CR2032 battery. The plurality of magnets may be positioned at various locations at the bottom wall 1004 of the case 1006. For example, the plurality of magnets may be arranged in a ring around a perimeter of the bottom wall 1004 such that the plurality of magnets are spaced approximately equidistant from one another. In some implementations, the plurality of magnets may be arranged in groups of two, three, etc. magnets 1002. Any number of magnets 1002 may be provided to achieve the desired strength of magnetic attraction.

In some implementations, the hard start capacitor replacement unit 1000 includes two magnets (e.g., similar to magnet 1002) positioned between the bottom wall 1004 of the case 1006 and the bottom cup 1008. In some implementations, the two magnets are each circular shape (e.g., disk shaped). The two magnets may have a stacked configuration such that a first disk shaped magnet is stacked on top of a second disk shaped magnet. In some implementations, the two magnets may have a combined strength of approximately 70-80 mT, 60-80 mT, or 130-150 mT, although other ranges are also possible. The two magnets may have the same or different diameters. In some implementations, the two magnets may be positioned at a location that is misaligned with a center of the bottom wall 1004 of the case 1006. For example, the center of the magnets may be misaligned with the center of the bottom wall 1004 of the case 1006 such that the magnets are positioned proximate to a side wall 1024 of the case. In some implementations, the center of the magnets may be aligned with the center of the bottom wall 1004 of the case 1006. In some implementations, the centers of the two magnets may be misaligned relative to each other. In other words, a center of one of the magnets may be misaligned with a center of the other magnet.

Figure 11:
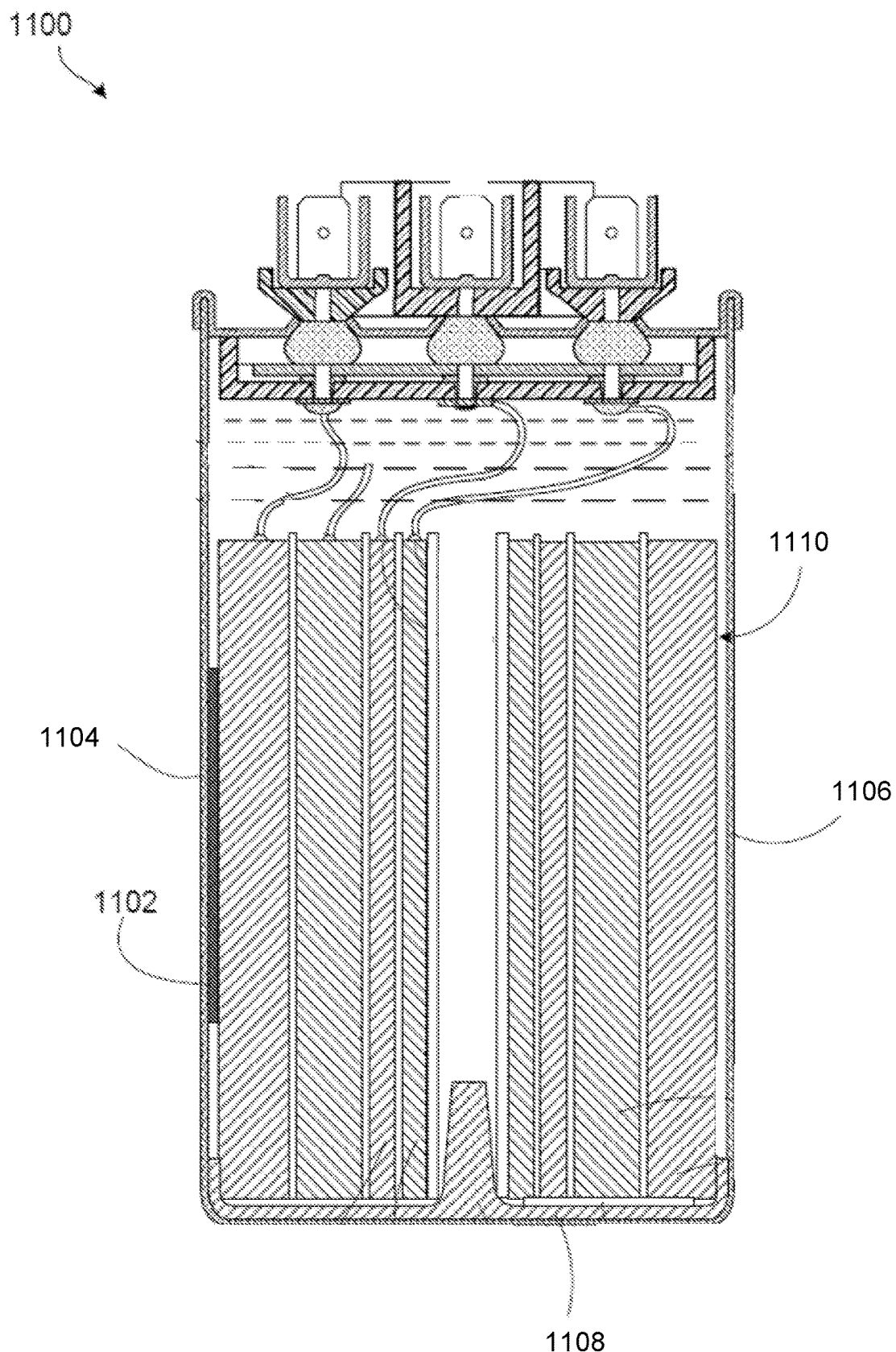
FIG. 11 is a sectional view of an example of a hard start capacitor replacement unit and a magnet.

Another hard start capacitor replacement unit 1100 is illustrated in FIG. 11. The hard start capacitor replacement unit 1100 may have the same or similar external appearance and functionality as hard start capacitor replacement unit 10 and 1000, and may be adapted to replace any one of a large number of capacitors with the hard start capacitor replacement unit 1100 connected to provide the same capacitance value or values of a failed capacitor.

The hard start capacitor replacement unit 1100 may include one or more magnets for assisting in mounting of the hard start capacitor replacement unit 1100 (e.g., to an air conditioning system). In the illustrated example, a magnet 1102 is positioned inside a side wall 1104 of a case 1106 (e.g., sometimes referred to as a container) of the hard start capacitor replacement unit 1100. The magnet 1102 is configured to create magnetic attraction between the magnet 1102 and a magnetic surface in proximity to the hard start capacitor replacement unit 1100. For example, the magnet 1102 may cause the side wall 1104 of the case 1106 to be attracted to a metallic surface of an air conditioning system, thereby improving the integrity of a mounting between the hard start capacitor replacement unit 1100 and the air conditioning system after installation. The magnet 1102 may be designed such that the strength of magnetic attraction between the magnet 1102 and the air conditioning system is such that the magnet 1102 may remain firmly in place in response to possible vibration and/or other movement of the air conditioning system during operational use. In some implementations, the strength of magnetic attraction between the magnet 1102 and the air condition system is such that a user (e.g., a technician installing or uninstalling the hard start capacitor replacement unit 1100) can remove the hard start capacitor replacement unit 1100 from the surface of the air conditioning system without requiring excessive effort.

In some examples, the magnet 1102 may have a rectangular shape. For example, the magnet 1102 may be a rectangular strip that runs from top to bottom along the side wall 1104 of the case 1106 of the hard start capacitor replacement unit 1100. In particular, the rectangular strip may have a particular thickness, a first dimension that runs from the top end of the hard start capacitor replacement unit 1100 to the bottom end of the hard start capacitor replacement unit 1100, and a second dimension that is perpendicular to the first dimension and smaller than the first dimension. In some implementations, the magnet 1102 may have a square shape (e.g., such that the first dimension is equal to or substantially equal to the second dimension). In some implementations, the magnet 1102 may have a rod shape. In some implementations, the magnet 1102 may have a circular shape (e.g., a disk shape) or a hollow circular shape (e.g., a ring shape). For example, in some implementations, the magnet 1102 may have dimensions equal to or substantially equal to the dimensions of a disk-shaped battery (e.g., a watch battery such as a CR2032 battery). In some implementations, other shapes, a combination of shapes, etc. may be employed; for example, various types of curves may be incorporated into one or more magnetic strips (e.g., elongated oval shaped strips). Patterns of magnetic material may used; for example two crossed magnetic strips, a pattern of crosses, circles, etc. may be attached, incorporated into the bottom wall, side wall 1104, etc. of the hard start capacitor replacement unit 1100.

In some implementations, the magnet 1102 may have a curved shape that matches or substantially matches a curve of the case 1106 of the hard start capacitor replacement unit 1100. For example, the magnet 1102 may have a curve that allows the magnet 1102 to make continuous contact with the side wall 1104 of the case 1106 of the hard start capacitor replacement unit 1100. In some implementations, the magnet 1102 may have dimensions of approximately 1 inch×1 inch and a thickness of about ⅒ of an inch. Such a magnet 1102 may be curved such that the magnet 1102 is configured to interface with an inner wall of the case 1106 of the hard start capacitor replacement unit 1100 (e.g., interior to the case 1106).

As described in more detail below, in some implementations, the magnet 1102 (e.g., the curved magnet) may be positioned exterior to the case 1106 of the hard start capacitor replacement unit 1100. In some implementations, a first surface of the magnet 1102 may be curved such that the first surface of the magnet 1102 interfaces with an exterior wall of the case 1106 of the hard start capacitor replacement unit 1100, and a second surface opposite of the first surface may have a substantially flat shape that is configured to interface with a flat surface of a separate object (e.g., a surface or wall of an air conditioning system). In some implementations, multiple curved magnets 1102 may be provided in one or more of the configurations described herein (e.g., including multiple curved magnets, a curved and a non-curved magnet, etc.).

In some implementations, the magnet 1102 may run along (e.g., make continuous contact) with the full perimeter of the side wall 1104 of the case 1106. That is, the magnet 1102 may have a sleeve shape with a diameter that is slightly less than a diameter of the hard start capacitor replacement unit 1100. In this way, substantially all of the side wall 1104 of the case 1106 of the hard start capacitor replacement unit 1100 may be magnetic such that the user can affix any portion of the side wall 1104 of the hard start capacitor replacement unit 1100 to a magnetic surface (e.g., without needing to rotate the hard start capacitor replacement unit 1100 to find a surface that is in line with the magnet 1102, as may be the case in implementations in which a magnet 1102 having a strip shape is used).

The particular shape and/or dimensions of the magnet 1102 may be chosen to achieve the desired strength of magnetic attraction. For example, the magnet 1102 may be designed with a particular shape and/or larger dimensions and/or larger thicknesses to achieve a relatively higher strength of magnetic attraction with a magnetic surface. In some implementations, increased surface area of the magnet 1102 toward the side wall 1104 of the case 1106 of the hard start capacitor replacement unit 1100 may increase the strength of magnetic attraction.

In some implementations, the magnet 1102 has a strength of approximately 30-40 milliTeslas (mT) or a strength of approximately 65-75 mT. In some implementations, the strength of magnetic attraction can be increased by stacking multiple magnets 1102 (e.g., one beside the other). In some implementations, two stacked magnets 1102 can have a strength of approximately 70-80 mT, 60-80 mT, or 130-150 mT, although other ranges are also possible. In some implementations, the magnet 1102 may be a D40x4 ferrite ceramic magnet manufactured by Hangzhou Honesun Magnet Co., Ltd.

In some implementations, the magnet 1102 may be magnetized using one or more of a plurality of techniques. For example, in some implementations, the magnet 1102 may be magnetized such that a north and a south pole of the magnet 1102 is located at a particular position of the magnet 1102. For example, the techniques for magnetizing the magnet 1102 may cause the north and/or south pole to be located at various thicknesses of the magnet 1102, etc. In some implementations, the magnet 1102 may be a multi-pole magnet.

In some implementations, the magnet 1102 is a permanent magnet that is made from a material that is magnetized and creates its own persistent magnetic field. For example, the magnet 1102 may be made from a ferromagnetic material that can be magnetized, such as iron, nickel, cobalt, and/or an alloy of rare-earth metals, among others. In some implementations, the magnet 1102 is a ferrite and/or ceramic magnet. In some implementations, the magnet 1102 may include one or more of ferric oxide, iron oxide, barium, barium carbonate, strontium, and/or strontium carbonate. The magnet 1102 may include one or more magnetically "hard" materials (e.g., materials that tend to stay magnetized). Alternatively or additionally, the magnet 1102 may include one or more magnetically "soft" materials.

In some implementations, the magnet 1102 may be a rare-earth magnet. A rare-earth magnet is typically a relatively strong permanent magnet that is made from one or more alloys of rare-earth elements. Example of rare-earth elements that can be used in a rare-earth magnet include elements in the lanthanide series, scandium, and yttrium, although other elements may also or alternatively be used. In some implementations, the rare-earth magnet may produce a magnetic field of greater than 1.0 T. In some implementations, the rare-earth magnet may include one or both of samarium-cobalt and neodymium.

In some implementations, the magnet 1102 may be made from one or more ceramic compounds (e.g., ferrite) that can be produced by combining iron oxide and one or more metallic elements. In some implementations, such ceramic compounds may be electrically nonconductive. The use of such ceramic compounds for the magnet 1102 may eliminate the inclusion of electrically conductive elements in the hard start capacitor replacement unit 1100 that may otherwise affect the operation of the hard start capacitor replacement unit 1100.

In some implementations, the magnet 1102 may have a grade that corresponds to a particular standard (e.g., a National and/or International standard). In some implementations, the grade of the magnet 1102 corresponds to the Chinese ferrite magnet nomenclature system. For example, in some implementations, the magnet 1102 is grade Y10T, Y25, Y30, Y33, Y35, Y30BH, or Y33BH, although other grades are also possible. In some implementations, the grade corresponds to a working temperature of 250° C. In some implementations, the grade of the magnet 1102 corresponds to a Feroba, an American (e.g., "C"), or a European (e.g., "HF") grading standard.

While the hard start capacitor replacement unit 1100 shown in the illustrated example includes one magnet 1102, additional magnets may also be provided. For example, a plurality of magnets may be positioned proximate to the side wall 1104 of the case 1106 of the hard start capacitor replacement unit 1100. The plurality of magnets may have dimensions that are relatively smaller than dimensions that may be chosen for implementations in which only a single magnet 1102 is used. The plurality of magnets may have dimensions substantially similar to dimensions of a watch battery, such as a CR2032 battery. The plurality of magnets may be positioned at various locations proximate to the side wall 1104 of the case 1106. For example, the plurality of magnets may be arranged in a ring around a perimeter of the side wall 1104 such that the plurality of magnets are spaced approximately equidistant from one another. In some implementations, the plurality of magnets may be arranged in groups of two, three, etc. magnets. Any number of magnets 1102 may be provided to achieve the desired strength of magnetic attraction.

Like the magnet 1002 described above with respect to FIG. 10, the magnet 1102 illustrated in FIG. 11 can also be an electromagnet that includes a core and a coil wrapped around the core, in which the materials, dimensions, configuration, and/or operating characteristics of the electromagnet can be chosen to achieve the desired strength of magnetic attraction.

In some implementations, the hard start capacitor replacement units 1000, 1100 may be configured to accept the magnet 1002, 1102 after manufacture of the hard start capacitor replacement unit 1000, 1100. For example, the hard start capacitor replacement unit 1000, 1100 may include one or more movable surfaces (e.g., doors or compartments) that can be opened by the user such that the user can place the magnet 1002, 1102 inside the hard start capacitor replacement unit 1000, 1100. In this way, the user can add and/or remove the magnet 1002, 1102 if magnetic attraction is desired or on longer desired. Further, the user can add additional magnets or remove magnets if a lesser strength of magnetic attraction is desired. For example, if a surface to which the hard start capacitor replacement unit 1000, 1100 is mounted is highly magnetic, the strength of magnetic attraction provided by the configuration of the magnets 1002, 1102 may be excessive. As such, the user can remove one or more of the magnets 1002, 1102 from the hard start capacitor replacement unit 1000, 1100 until the desired strength of magnetic attraction is achieved. On the other hand, if a surface to which the hard start capacitor replacement unit 1000, 1100 is mounted is relatively nonmagnetic, the strength of magnetic attraction provided by the configuration of the magnets 1002, 1102 may be too low. As such, the user can add one or more additional magnets to the hard start capacitor replacement unit 1000, 1100 until the desired strength of magnetic attraction is achieved.

In some implementations, a bottom end of the hard start capacitor replacement unit 1000 (e.g., an area proximate to and including the bottom wall 1004 of the case 1006) may be removable from the rest of the case 1006 of the hard start capacitor replacement unit 1000. In some implementations, the bottom end of the hard start capacitor replacement unit 1000 may be attached by threading such that the bottom end of the hard start capacitor replacement unit 1000 may be removed by twisting the bottom end of the hard start capacitor replacement unit 1000 away from the rest of the case 1006. Removing the bottom end of the hard start capacitor replacement unit 1000 may reveal a compartment within which the magnet 1002 (and, e.g., additional magnets) can be placed and/or removed. In some implementations, the side wall 1104 of the case 1106 of the hard start capacitor replacement unit 1100 may include a slidable and/or otherwise openable door that reveals a compartment of the hard start capacitor replacement unit 1100 within which the magnet 1102 (and, e.g., additional magnets) can be placed and/or removed.

In some implementations, the case 1006, 1106 of the hard start capacitor replacement unit 1000, 1100 may be made from a magnetic material (e.g., a metallic material). The magnet 1002, 1102 may be held in place at least in part by magnetic attraction between the magnet 1002, 1102 and the case 1006, 1106. For example, the magnet 1002 may be magnetically attracted to the bottom wall 1004 of the case 1006 of the hard start capacitor replacement unit 1000, and the magnet 1102 may be magnetically attracted to the side wall 1104 of the case 1106 of the hard start capacitor replacement unit 1100. In some implementations, the case 1006, 1106 may be made from a non-magnetic material such as a plastic material. In such implementations, one or more other mechanisms or techniques may be used to fix the magnet 1002, 1102 in place, as described below.

In some implementations, the magnet 1002, 1102 may be affixed to a surface of the hard start capacitor replacement unit 1000, 1100 by one or more mounting mechanisms. For example, one or more brackets may be used to affix the magnet 1002, 1102 to an interior and/or an exterior of the case 1006, 1106. In some implementations, one or more brackets may be used to affix the magnet 1002 to the bottom wall 1004 of the case 1006. In some implementations, a bracket may be positioned around a surface of the magnet 1002, and one or more fasteners may be used to affix the bracket against the bottom wall 1004 of the case 1006. Similarly, one or more brackets may be used to affix the magnet 1102 to the side wall 1104 of the case 1106. In some implementations, a bracket may be positioned around a surface of the magnet 1102, and one or more fasteners may be used to affix the bracket against the side wall 1104 of the case 1106. In some implementations, an adhesive may be used to affix the magnet 1002, 1102 to the bottom wall 1004 of the case 1006 and/or the bottom cup 1008 and the side wall 1104 of the case 1106. In some implementations, the magnet 1002, 1102 may be held sufficiently in place by being wedged between the bottom wall 1004 of the case 1006 and the bottom cup 1008, or by being wedged between the side wall 1104 of the case 1106 and other components of the hard start capacitor replacement unit 1100. In some implementations, magnetic attraction between the magnet 1002, 1102 and other components of the hard start capacitor replacement unit 1000, 1100 (e.g., the case 1006, 1106) may assist in holding the magnet 1002, 1102 in place.

In some implementations, the magnet 1002, 1102 may be held in place at least in part by an epoxy. For example, once the magnet 1002, 1102 is positioned at its desired position within the case 1006, 1106 of the hard start capacitor replacement unit 1000, 1100, an epoxy can be introduced in proximity to the magnet 1002, 1102. Upon curing, the epoxy can provide sufficient strength for holding the magnet 1002, 1102 in its desired mounting location.

In some implementations, a cutout (e.g., a recess) may be provided in which the magnet 1002, 1102 can be seated (e.g., to assist in holding the magnet 1002, 1102 in place at its desired mounting location). The cutout may be provided in the case 1006, 1106 of the hard start capacitor replacement unit 1000, 1100 and/or in the bottom cup 1008 of the hard start capacitor replacement unit 1000. The cutout may provide a ridge that surrounds a perimeter of the magnet 1002, 1102 to keep the magnet 1002, 1102 in place. In this way, the magnet 1002, 1102 is prevented from sliding to other locations within the case 1006, 1106 of the hard start capacitor replacement unit 1000, 1100.

While the magnets 1002, 1102 have been illustrated as being positioned within the case 1006, 1106 of the hard start capacitor replacement unit 1000, 1100, in some implementations, the magnet 1002, 1102 may be mounted to an exterior of the case 1006, 1106. For example, in some implementations, the magnet 1002 may be mounted to a bottom surface of the bottom wall 1004 of the case 1006 of the hard start capacitor replacement unit 1000. The magnet 1002 may have a shape that substantially matches the shape of the bottom surface of the bottom wall 1004. In this way, when the hard start capacitor replacement unit 1000 is mounted to a magnetic object (e.g., an air conditioning system), the hard start capacitor replacement unit 1000 can be positioned flush with the surface of the object. Similarly, in some implementations, the magnet 1102 may be mounted to an outside surface of the side wall 1104 of the case 1106 of the hard start capacitor replacement unit 1100. In some examples, the magnet 1102 may be wrapped around or substantially around the outside surface of the side wall 1104 of the case 1106 such that substantially all outside surfaces of the case 1106 are magnetic. The magnet 1002, 1102 may be mounted using one or more mounting mechanisms, an adhesive, an epoxy, one or more fasteners, etc. In some implementations, the magnet 1002, 1102 may be a magnetic film that is applied to a portion of the case 1006, 1106 of the hard start capacitor replacement unit 1000, 1100. For example, the magnet 1002, 1102 may be a magnetic film applied to the exterior of the case 1006, 1106.

In some implementations, the magnet 1002, 1102 may have a thickness of approximately 4 mm. For example, in implementations in which the magnet 1002 is mounted to the bottom surface of the bottom wall 1004 of the case 1006 of the hard start capacitor replacement unit 1000, a width of approximately 4 mm for the magnet 1002 may provide sufficient strength of magnetic attraction without making the hard start capacitor replacement unit 1000 unwieldy (e.g., by adding excessive height to the hard start capacitor replacement unit 1000). Therefore, the hard start capacitor replacement unit 1000 does not take up excessive volume at its mounting location (e.g., at or within an air conditioning system).

In some implementations, one or more portions of the case 1006, 1106 of the hard start capacitor replacement unit 1000, 1100 are themselves magnetic, and/or the bottom cup 1008 is magnetic. For example, the hard start capacitor replacement unit 1000, 1100 may be designed such that the case 1006, 1106 is made from a magnetic material. In this way, the hard start capacitor replacement unit 1000, 1100 can be mounted in a variety of configurations as required for the particular application. For example, the bottom wall 1004 of the case 1006 of the hard start capacitor replacement unit 1000 and/or the bottom cup 1008 of the hard start capacitor replacement unit 1000 may be made from a magnetic material such that the bottom wall 1004 of the hard start capacitor replacement unit 1000 can be magnetically attracted to a magnetic object, and/or the side wall 1104 of the case 1106 of the hard start capacitor replacement unit 1100 may be made from a magnetic material such that the side wall 1104 of the hard start capacitor replacement unit 1100 may be magnetically attracted to a magnetic object.

While the magnets 1002, 1102 have been illustrated and described as belonging to different hard start capacitor replacement unit 1000, 1100, in some implementations, the magnet 1002 of FIG. 10 and/or the magnet 1102 of FIG. 11 may be incorporated into other hard start capacitor replacement units described herein. For example, in some implementations, the magnet 1102 may also be incorporated into the hard start capacitor replacement unit 1000 (e.g., instead of or in addition to the magnet 1002), and vice versa. In some implementations, one or both of the magnet 1002 and the magnet 1102 may be incorporated into the hard start capacitor replacement unit 10, 1000, 1100.

While many implementations have been described above (e.g., such as the implementations described with respect to FIGS. 10 and 11), other implementations are also possible. In some implementations, the hard start capacitor replacement units described herein (e.g., the hard start capacitor replacement unit 10, 1000, and/or 1100) may include multiple stacked magnets toward the bottom of the hard start capacitor replacement unit (e.g., similar to the hard start capacitor replacement unit 1000 of FIG. 10, and as described above, between the bottom wall 1004 of the case 1006 and the bottom cup 1008). For example, two magnets having a circular shape (e.g. disk shape) may be stacked on top of each other such that the centers of the two magnets are in alignment. In some implementations, the two magnets may be made from one or more ceramic compounds (e.g., ferrite), for example, which can be produced by combining iron oxide and one or more metallic elements.

In some implementations (e.g., in addition to implementations that include the two stacked magnets described above), multiple magnets may be provided at the side wall of the hard start capacitor replacement unit (e.g., the side wall 1024, 1104 of the hard start capacitor replacement unit 1000, 1100). For example, two magnets may be provided inside the side wall 1024, 1104 of the hard start capacitor replacement unit 1000, 1100. The two magnets may have a curved shape (e.g., as described above). In some implementations, each of the curved magnets may be configured to interface with an inner wall of the case 1006, 1106. In some implementations, the curved magnets may have dimensions of approximately 1 inch×1 inch and a thickness of approximately ¹⁄₁₀ of an inch. In some implementations, the two curved magnets are stacked vertically. For example, a first curved magnet may be provided at a first height between the side wall 1024, 1104 of the hard start capacitor replacement unit 1000, 1100 and the capacitive element 1014, 1110, and a second curved magnet may be provided at a second height (e.g., above or below the first height) between the side wall 1024, 1104 of the hard start capacitor replacement unit 1000, 1100 and the capacitive element 1014, 1110. In some implementations, each of the curved magnets may run around a full circumference of the side wall 1024, 1104 of the hard start capacitor replacement unit 1000, 1100 (e.g., such that the magnets have a ring or sleeve shape). In some implementations, one of the magnets may run around a full circumference while the other magnet runs around less than an entirety (e.g., a portion) of the circumference. In yet additional implementations, both of the magnets may run around less than an entire circumference (e.g., a portion of the circumference of the side wall 1024, 1104). In some implementations, the two curved magnets are positioned at the same vertical height along the length of the side wall 1024, 1104. In such implementations, the two curved magnets may each run less than the entire circumference of the side wall 1024, 1104. In some implementations, one or both of the two curved magnets may be a rare-earth magnet that includes neodymium.

In some implementations, one or both of the magnets placed inside the side wall 1024, 1104 may be positioned between an inside surface of the side wall 1024, 1104 and a portion of the bottom cup 1008, 1108. For example, one or both of the curved magnets may be positioned between the side wall 1024, 1104 and an up-turned skirt that embraces the capacitive element 1014, 1110 and spaces the capacitive element 1014, 1110 from the side wall 1024, 1104 of the case 1006, 1106. In some implementations, the up-turned skirt may run further up the side wall 1024, 1104 an additional length than what is illustrated in the figures (e.g., in FIGS. 10 and 11). The multiple curved magnets may be stacked vertically or located at the same vertical height in a manner similar to that described above.

In some implementations, a liner may be positioned between the two curved magnets and the capacitive element 30. For example, in implementations in which the curved magnets are not positioned between the side wall 1024, 1104 and the up-turned skirt, a liner may be applied over one or both of the curved magnets to separate the curved magnets from the capacitive element 1014, 1110. The liner may include a non-conductive material or any other material suitable for separating the magnets from the capacitive element 1014, 1110 (e.g., for minimizing effects of the magnet on the performance of the capacitive element 1014, 1110 and/or other components). In some implementations, the liner is a plastic adhesive material that can be applied over a surface of one or both of the curved magnets to separate the curved magnets from other components of the hard start capacitor replacement unit 1000, 1100. In some implementations, the liner can assist in holding the one or both of the curved magnets in place at the side wall 1024, 1104 of the hard start capacitor replacement unit 1000, 1100.

In some implementations, one or both of the two curved magnets may be positioned between the bottom cup 1008, 1108 of the hard start capacitor replacement unit 1000, 1100 and the bottom wall 1004, 1164 of the hard start capacitor replacement unit 1000, 1100. For example, one or both of the curved magnets may be placed in a position between the bottom cup 1008 and the bottom wall 1004 of the hard start capacitor replacement unit 1000 shown in FIG. 10. The curved magnets may be placed instead of or in addition to the magnet 1002 of FIG. 10. The one or both of the curved magnets may be positioned in one or more of the configurations described in the preceding paragraphs. For example, the two curved magnets may be stacked vertically (e.g., one on top of the other, with the two curved magnets optionally making contact with one another) or the two curved magnets may be positioned at the same vertical height of the hard start capacitor replacement unit 1000, 1100 (e.g., such that each of the curved magnets runs along less than an entire circumference of the side wall 1024, 1104, or such that each of the curved magnets runs along half of the circumference of the side wall 1024, 1104 such that the sides of the two magnets make contact with each other). As mentioned above, one or more of the curved magnets may be a rare-earth magnet that include neodymium, while the disk shaped magnets may be made from one or more ceramic compounds (e.g., ferrite), although other materials are also possible. In some implementations, the neodymium curved magnets may have a relative higher (e.g., a substantially higher) degree of magnetic attraction as compared to that of the disk shaped ceramic magnets.

While the various disc shapes magnets and curved magnets have largely been described as being placed inside of the case 1006, 1106 of the hard start capacitor replacement unit 1000, 1100, in some implementations, one or more of the magnets described herein may be placed outside of the case 1006, 1106. For example, one or more of the disk shaped magnets may be positioned on a bottom (e.g., outside) surface of the bottom wall 1004, 1164 of the case 1006, 1106. The magnets may be affixed to the outside of the case 1006, 1106 by the strength of magnetic attraction. In some implementations, one or more mounting mechanisms (e.g., brackets), an adhesive, an epoxy, one or more fasteners, etc. may be used to assist in mounting the magnets to the outside of the case 1006, 1106. For example, one or more brackets may be used to mount the one or more magnets to the exterior of the case 1006, 1106. In some implementations, a liner (e.g., such as the liner described above) may be used to assist in mounting the one or more magnets to the case 1006, 1106.

Similarly, one or more of the curved magnets may be positioned on an outside surface of the side wall 1024, 1104 of the case 1006, 1106. The magnets may be affixed to the outside of the case 1006, 1106 by the strength of magnetic attraction. In some implementations, one or more mounting mechanisms (e.g., brackets), an adhesive, an epoxy, one or more fasteners, etc. may be used to assist in mounting the magnets to the outside of the case 1006, 1106. For example, one or more brackets may be used to mount the one or more magnets to the exterior of the case 1006, 1106. In some implementations, a liner (e.g., such as the liner described above) may be used to assist in mounting the one or more magnets to the case 1006, 1106.

While the curved magnets have been described as having a curved shape that substantially interfaces with the side wall 1024, 1104 of the case 1006, 1106, in some implementations, a first wall of one or more of the curved magnets may have a curved shape that interfaces with the side wall 1024, 1104 of the case 1006, 1106, and an opposite wall (e.g., a wall opposite of the curved wall of the one or more magnet) may have a substantially flat shape. The substantially flat shape may allow the case 1006, 1106 to interface with a flat surface of a separate object (e.g., an air conditioning system). For example, in some implementations, one or more of the curved magnets may be positioned on an exterior of the side wall 1024, 1104 of the case 1006, 1106 (e.g., as described above). The opposite surface of the curved magnet may have a flat shape that can substantially interface with a flat magnetically-attractive surface, such as a metal wall of an air conditioning unit or system. The flat shape of the opposite surface of the one or more magnets may allow the hard start capacitor replacement unit 1000, 1100 to create a sufficient magnetic bond with the air conditioning unit or system, such that the hard start capacitor replacement unit 1000, 1100 cannot become inadvertently dislodged or misaligned from its intended mounting position.

In some implementations, one or more of the curved magnets may be configured to interface with both an outside of the side wall 1024, 1104 of the hard start capacitor replacement unit 1000, 1100 and the bottom wall 1004, 1164 of the hard start capacitor replacement unit 1000, 1100. For example, one or more of the curved magnets may include at least five relevant surfaces: a first curved surface (e.g., inside surface) that is configured to interface with the outside surface of the side wall 1024, 1104, a second flat surface (e.g., inside surface) that is configured to interface with the bottom wall 1004, 1164, and three additional flat surfaces (e.g., outside surfaces) that are configured to interface with one or more mounting location (e.g., of one or more surfaces of an air conditioning unit or system). The inside surfaces can allow the magnet to make intimate contact with the case 1006, 1106 of the hard start capacitor replacement unit 1000, 1100, thereby allowing the one or more magnets to maintain contact with the hard start capacitor replacement unit 1000, 1100 using one or more of the techniques described above. The three outside surfaces may allow the one or more magnets to make intimate contact with a mounting location, such as a corner mounting location that allows a bottom outside surface of the magnet to interface with a bottom mounting location, a first side outside surface perpendicular to the bottom outside surface to interface with a side mounting location, and a second side outside surface perpendicular to the bottom outside surface and the first side surface to interface with another side mounting location, thereby allowing the hard start capacitor replacement unit 1000, 1100 to be mounted in a corner target area while being placed on a bottom surface of the target area.

In some implementations, the magnet may include two outside surfaces (e.g., without a bottom outside surface) that allows the hard start capacitor replacement unit 1000, 1100 to be mounted in a corner target area without the hard start capacitor replacement unit 1000, 1100 necessarily being placed on (e.g., magnetically attracted to) a bottom surface of the mounting area. In this way, the hard start capacitor replacement unit 1000, 1100 can be mounted to a corner target area of an air conditioning unit or system while being suspended (e.g., without being placed on a bottom surface of the mounting area).

As described above, in some implementations, one or more of the curved magnets may be a rare-earth magnet that include neodymium, while the disk shaped magnets may be made from one or more ceramic compounds (e.g., ferrite), although it should be understood that other materials can additional or alternatively be used for any of the magnets described herein. In some implementations, the neodymium curved magnets may have a relatively higher (e.g., a substantially higher) degree of magnetic attraction as compared to that of the disk shaped ceramic magnets. Such a configuration may, for example, provide additional magnetic mounting strength for implementations in which the hard start capacitor replacement unit 1000, 1100 is side mounted (e.g., mounted to a side surface of a target mounting location without the bottom wall 1004, 1164 of the case 1006, 1106 making contact with a bottom surface of the mounting location), sometimes referred to herein as a suspended mounting configuration. The relatively higher degree of magnetic attraction provided by one or more of the curved magnets may allow the hard start capacitor replacement unit 1000, 1100 to be mounted in such configurations without becoming dislodged or misplaced from the target location. For example, the relatively higher degree of magnetic attraction may prevent the hard start capacitor replacement unit 1000, 1100 from sliding down a wall of the mounting location due to the effects of gravity. In contrast, in implementations in which the bottom wall 1004, 1164 of the hard start capacitor replacement unit 1000, 1100 is mounted to a bottom surface of the target mounting location (e.g., on a bottom surface of an air conditioning unit or system), such additional strength of magnetic attraction may not be necessary to maintain the capacitor hard start capacitor replacement unit 1000, 1100 in proper mounting configuration. Nonetheless, additional curved magnets may also be included to provide additional and/or redundant magnetic attraction for mounting purposes.

Figure 12:
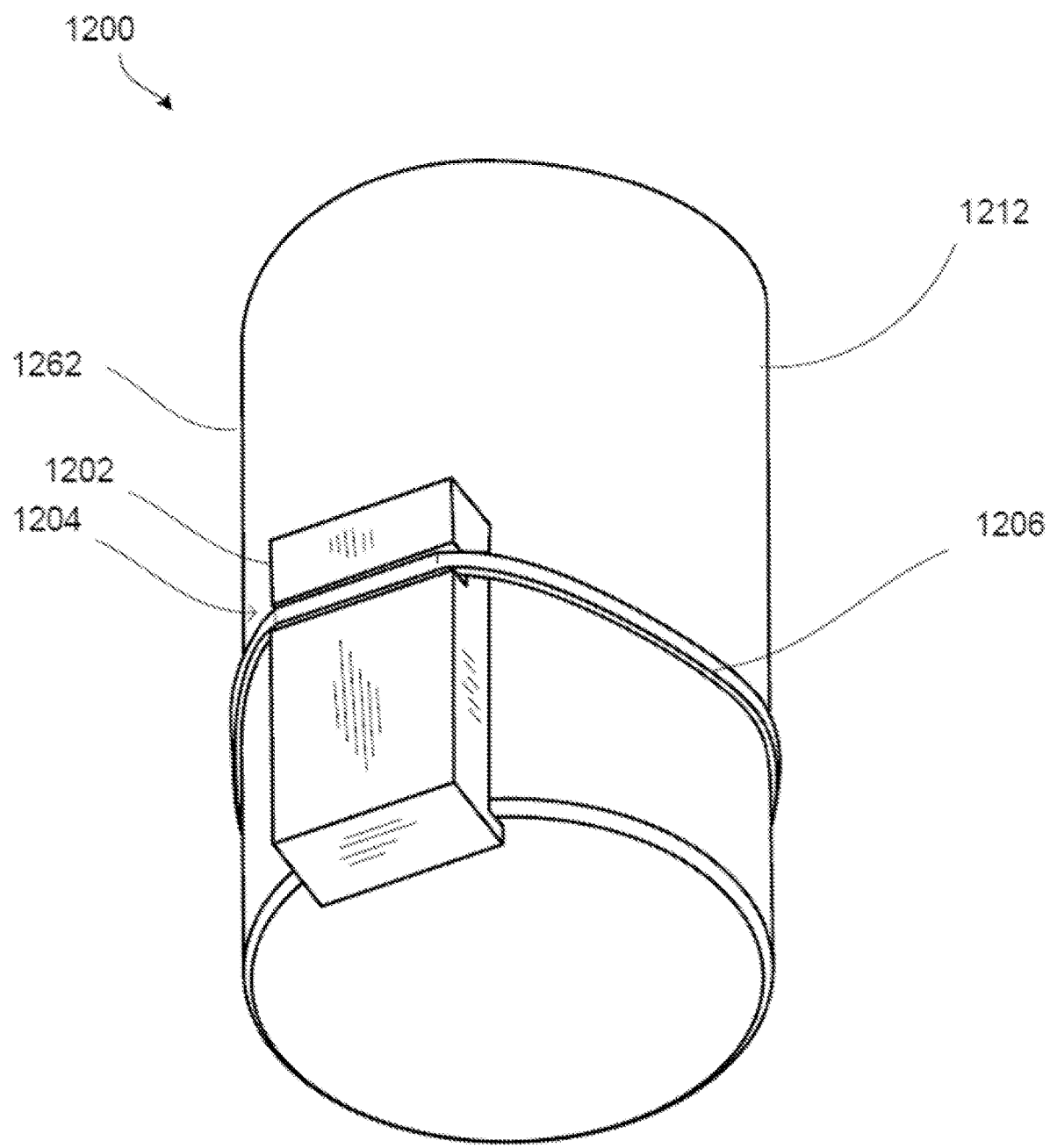
FIG. 12 shows an example of a hard start capacitor replacement unit and an externally mounted magnet.

FIG. 12 shows another example of a hard start capacitor replacement unit 1200 and a magnet 1202 that is externally mounted toward a bottom portion of the hard start capacitor replacement unit 1200. As described above, in some implementations, the hard start capacitor replacement units described herein may include one or more relays (e.g., potential relays, control relays, electronic relays, etc.), such as the electronic relay 18 of FIG. 1. A relay may be accommodated above a capacitor container of the hard start capacitor replacement unit 1200 within a projected cylindrical envelope thereof. In some implementations, the hard start capacitor replacement unit 1200 may be configured to accept a cylindrical cap that can surround and cover the relay. In some implementations, the relay can be externally connected to the hard start capacitor replacement unit 1200. In some implementations, the relay can be internally connected to the hard start capacitor replacement unit 1200.

In some implementations, operations of the relay may be affected by magnetic fields in the vicinity of the relay. In particular, the magnets described herein may alter the magnetic field around the relay and cause the relay to operate in a manner that is undesirable. In some implementations, the positioning of the magnet 1202 toward the bottom portion of the hard start capacitor replacement unit 1200 (e.g., as shown in FIG. 12) and away from the relay mounted toward the top portion of the hard start capacitor replacement unit 1200 may minimize the impact of the magnetic field created by the magnet 1202 on the operation of the relay, thereby allowing the relay to operate as intended.

The magnet 1202 is a curved magnet 1202 that is mounted to an outside surface of a side wall 1262 of a case 1212 of the hard start capacitor replacement unit 1200 by a cable tie 1206. When the magnet 1202 is in a mounted position (e.g., as shown in FIG. 12), a portion of the cable tie 1206 resides in an elongated recess 1204 of the magnet 1202. The recess 1204 is configured to accept the portion of the cable tie 1206 and assist in preventing the magnet 1202 from sliding upward or downward and out from underneath the cable tie 1206. A remainder of the cable tie 1206 wraps around an outer circumference of the case 1212 and applies an inward radial force to the magnet 1202, thereby holding the magnet 1202 in place on the outside surface of the side wall 1262 of the case 1212. In some implementations, the magnet 1202 may additionally be affixed to the case 1212 with the assistance of magnetic attraction. For example, the case 1212 may be made from a material that is magnetically attractive, and additional mounting strength can be provided by the strength of magnetic attraction between the magnet 1202 and the case 1212.

The magnet 1202 includes the elongated recess 1204 that provides a track in which a portion of the cable tie 1206 may reside. In the illustrated example, the recess 1204 includes a plurality of grooves that interface with the cable tie 1206 when the cable tie 1206 is positioned therein.

In some implementations, providing magnetic mounting capability for the hard start capacitor replacement unit can provide a number of advantages. For example, in some implementations, a component to which or within which the hard start capacitor replacement unit is to be mounted (e.g., an air conditioning system) may or may not include an area (e.g., a designated area) that is typically used for mounting the hard start capacitor replacement unit. However, the user may desire to mount the hard start capacitor replacement unit elsewhere. By providing magnetic mounting capability, the number of options for mounting can be greatly increased.

In some implementations, the hard start capacitor replacement unit is mounted at locations that include metallic and/or magnetic objects. Such objects may impact the performance of the hard start capacitor replacement unit. In some implementations, the user may desire to mount the hard start capacitor replacement unit at a particular location such that particular operating conditions are achieved. Magnetic mountability of the hard start capacitor replacement unit can allow the user to mount the hard start capacitor replacement unit at such locations. In some examples, the hard start capacitor replacement unit can be mounted at locations that allow for shorter conductive connections (e.g., wires) between the capacitance value terminals and common cover terminal and the device to which the hard start capacitor replacement unit is connected. Without such flexibility in possible mounting locations, the wires may be excessively long and may be susceptible to being cut or broken along with being susceptible to noise and/or distortions.

Figure 13:
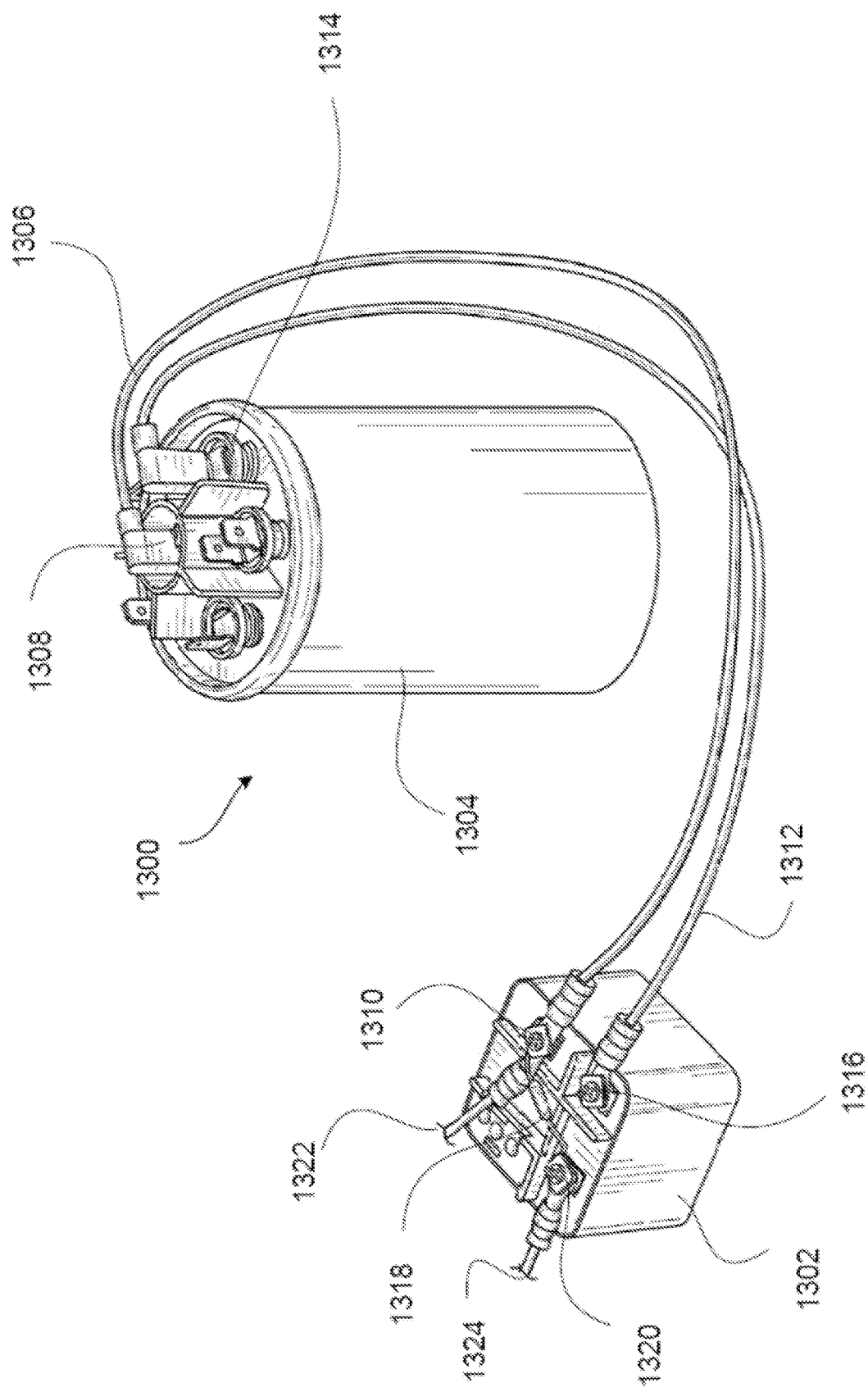
FIG. 13 is a perspective view of a hard start capacitor replacement unit that includes an externally connected relay.

Regarding FIG. 13, a perspective view of a hard start capacitor replacement unit 1300 is shown connected to a relay 1302 (e.g., similar to the relay 18 of FIG. 1, an electronic relay, etc.), which is external to the container 1304. In some implementations, external relays may be preferable to internal relays because the container 1304 can have a smaller size and geometry if it does not need space for the relay 18. Therefore, the hard start capacitor replacement unit 1300 may need less space for mounting and connecting to the compressor. Additionally, using a relay external to the container 1304 can allow for different methods of wiring the relay 18 to the hard start capacitor replacement unit 1300. For example, a repairman can have the option to wire, orient, position, etc. the relay 18 to the hard start capacitor replacement unit 1300 in different ways (e.g., to different external terminals) as needed for installation. In the illustrated example, the relay 1302 is externally connected from the container 1304.

A conductor 1306 electrically connects a common cover terminal 1308 of the hard start capacitor to an external terminal 1310 of the potential relay 1302. Another conductor 1312 electrically connects one capacitor cover terminal 1314 to the external terminal 1316 of the potential relay 1302. A third conductor 1322 electrically connects the external terminal 1310 to the compressor motor or the motor run capacitor and a fourth conductor 1324 electrically connects external terminal 1320 to a compressor motor or the motor run capacitor. A bleeder resistor 1318 connects the external terminal 1310 to the external terminal 1320 of the potential relay 1302.

Referring back briefly to FIG. 4 and FIG. 9, the bleeder resistor 1318 partially or fully discharges a connected capacitor, a capacitor of the hard start capacitor 1300, etc. in a similar manner as bleeder resistors 78 and 98. In FIG. 4 and FIG. 9, for example, the hard start capacitor is electrically connected to the start terminal 62 of the motor 60, the run terminal 64 of the motor 60, etc. The external terminals 1318, 1314, and 1308 of electronic relay 1302 can be internally connected, e.g., in a similar manner to which terminals T-1, T-2, and T-5 are internally connected in relay 18. For example, in FIG. 4, the external terminals T-1 and T-2 are internally connected with contacts 70 and 72. The electronic relay 18 also includes an external terminal T-5, and the dv/dt between terminals T-2 and T-5 and controls the opening and closing of the contacts of the relay 18.

Over the course of a relay's use, it can become damaged through normal wear and tear. For example, a relay can malfunction due to environmental factors (e.g., humidity, cold, etc.). For example, the connections on a relay can become worn, and the relay may start to malfunction (e.g., mechanically stick). Briefly referring to FIG. 4, the relay could be stuck if contacts 70 and 72 are closed by contact bar 74 and do not open again, are resistant to opening again, etc. If the relay is stuck, the hard start capacitor is not removed from the circuit and remains in parallel with the run capacitor during operation (when only the run capacitor should be connected). By the hard start capacitor not being removed from the circuit, the motor compressor, other system components, etc. could become damaged. For example, a compressor motor running with the hard start capacitor not being removed from the circuit may continue to properly function for a relatively short period of time (e.g., 1-16 seconds) before failing or being damaged. In another example, if a relay is stuck open (e.g., the contacts are open and do not close again, are resistant to closing again, etc.), then the hard start capacitor is not added in parallel with the run capacitor during start operations. A compressor motor using only the run capacitor for start operations may continue to properly function for a relatively short period of time before failing or being damaged.

One or more techniques may be employed to properly disconnect the hard start capacitor from being connected to the circuit (e.g., being connected to the compressor and the motor run capacitor). In one arrangement, one or more electrical and/or electronic components may be introduced to assist with properly removing the hard start capacitor from the circuit. One example of such an electrical component is a fuse. If a failure occurs (e.g., a capacitive failure, the relay malfunctions, the relay contacts mechanically stick, the relay contacts become welded together, etc.), the fuse can open an electrical connection as current increases and disconnect the hard start capacitor from the circuit, preventing damage to the compressor motor, the run capacitor, etc. For example, the fuse can burn out at a threshold current or threshold voltage. The increased current or voltage can cause the fuse to burn and open an electrical connection, or the increased current or voltage can cause the electrical connection to break.

Also, in some implementations, the run capacitor may become disconnected from the compressor motor or may fail (e.g., due to reaching its expected (e.g., rated) end of life, or for other reasons). In such situations, it may be beneficial for the start capacitor to be disconnected from the compressor motor. In other words, it may be beneficial for the circuit that includes the start capacitor and the compressor motor to be broken, for example, by severing at least an electrical ground connection. For example, the capacitance provided by the start capacitor may continue to cause compressor motor to operate the compressor motor. In such situations, the compressor motor would be running without a run capacitor, and the capacitance provided by the start capacitor may be unsuitable for continuous prolonged use by the compressor motor in its running state. In some implementations, the capacitance value provided by the start capacitor may cause the compressor motor to fail (e.g., "burn out") after prolonged use due to excessive current draw and overheating. In some implementations, the excessive current draw and overheating may cause the compressor motor to shut off due to a thermal overload switch. However, even with the protection of the thermal overload switch, the compressor motor may continue to be power cycled due to the start capacitance provided by the start capacitor. To avoid damage to and/or repeated power cycling of the compressor motor, the start capacitor may be connected to the compressor motor in such a way that the start capacitor is automatically disconnected from the compressor motor when the run capacitor is no longer connected to the compressor motor. As such, the start capacitor will not cause the compressor motor to restart and/or to continue to run by using the capacitance provided by the start capacitor in place of the now disconnected run capacitor until/unless the run capacitor is replaced and the electrical connection between the compressor motor and the start capacitor is reestablished.

Different types of fuses can be used which can open electrical connections for a plurality of reasons. For example, the fuse can open an electrical connection at, e.g., a voltage cutoff, a current cutoff, a thermal cutoff, a threshold current for a predetermined period of time (i.e., a slow blow fuse), etc. For example, the fuse can open an electrical connection upon a threshold voltage. In another example, the fuse can open an electrical connection upon a threshold current. In another example, the fuse can open an electrical connection upon a threshold current and threshold voltage. For example, the fuse may only open an electrical connection when both the current exceeds the threshold current and the voltage exceeds a threshold voltage. In another example, the fuse can open an electrical connection upon a threshold temperature. In another example, the fuse can open an electrical connection upon a threshold voltage and a threshold temperature. For example, the fuse may only open an electrical connection when both the voltage exceeds a threshold voltage and the temperature exceeds a threshold temperature. In another example, the fuse can open an electrical connection upon a threshold current and a threshold temperature. For example, the fuse may only open an electrical connection when both the current exceeds a threshold current and the temperature exceeds a threshold temperature. In another example the fuse can open an electrical connection upon a threshold current for a predetermined amount of time. For example, the fuse may only open an electrical connection when the current exceeds a threshold current for a predetermined amount of time. In another example the fuse can open an electrical connection upon a threshold voltage for a predetermined amount of time. For example, the fuse may only open an electrical connection when the voltage exceeds a threshold voltage for a predetermined amount of time. In another example the fuse can open an electrical connection upon a threshold temperature for a predetermined amount of time. For example, the fuse may only open an electrical connection when the voltage exceeds a threshold voltage for a predetermined amount of time. Different materials can be selected for the fuse to achieve the desired characteristics.

Various events can trigger a fuse to open an electrical connection (e.g., a compressor motor failure, a relay failure, a capacitor failure, etc.). For example, if the relay becomes stuck, a fuse (e.g., a slow blow fuse) may be used to disconnect the hard start capacitor from the circuit to prevent damage. A slow blow fuse is a fuse that opens an electrical connection when the current exceeds a threshold current for a predetermined period of time. The fuse can have a variety of electrical thresholds that determine when the fuse opens an electrical connection. For example, the fuse can have a variety of voltage thresholds (e.g., 200V (volts), 250V, 300V, etc.). The fuse can also have a variety of amperage thresholds (e.g., 3 A (amperes), 4 A, 5 A, 10 A, etc.). Further, the slow blow fuse can have a variety of construction parameters (e.g., PVC insulation, rubber insulation, etc.) to achieve the desired thresholds.

A number of suitable fuses can be used to properly disconnect the hard start capacitor from being connected to the circuit. In some implementations, a desirable fuse will open an electrical connection upon the current traveling through the hard start capacitor replacement unit for a predetermined time period of about 0.5-5 seconds (e.g., 3 seconds). This is a short enough time to reduce or prevent damage to the compressor motor, other system components, etc. This is also a long enough period of time that the fuse does not open an electrical connection during start operations of the motor. For example, a 250V-5 A fuse can be used, with, e.g., two layers of PVC heat-shrink insulation (e.g., as produced by LittleFuse, part number 0313005.HXP). Other fuses can also be used as well. For example, a 4 A slow blow fuse with two layers of PVC heat-shrink insulation can be used (e.g., as produced by Bel Fuse, part number GSA(P) 4-R). Another example of a suitable fuse is a 10 A slow blow fuse (e.g., as produced by Bel Fuse, part number GSA(P) 10-R). Other amperage thresholds can also be used, for example, a 5 A slow blow fuse can be used (e.g., as produced by Bel Fuse, part number GSA(P) 5-R).

Other construction parameters can also create slow blow fuses. For example, ceramic body fuses, which are fuses with an exterior ceramic body (with a size of, e.g., 0.25 inches by 1.25 inches) can create suitable slow blow fuses. Another example is a glass body fuse, which is a fuse with an exterior glass body (with a size of, e.g., 0.25 inches by 1.25 inches) that can create suitable slow blow fuses.

Other types of fuses can also be used as fuses. For example, a fuse that will open an electrical connection when the voltage exceeds a threshold voltage for a predetermined amount of time can be suitable for disconnect the hard start and the circuit. In another example, a fuse that will open an electrical connection when the temperature exceeds a threshold temperature for a predetermined amount of time can be suitable for disconnecting the hard start capacitor and the circuit.

One technique of connecting a fuse (e.g., a slow blow fuse) to the circuit is mounting a fuse to the external relay. Mounting the fuse to an external relay can be advantageous because the fuse is easy to replace. In other embodiments, the fuse can be added to other parts of the circuit. For example, the fuse can be external to the capacitor container. In another example, the fuse can be internal to the capacitor container. In another example, the fuse can be internal to the relay.

Figure 14A:
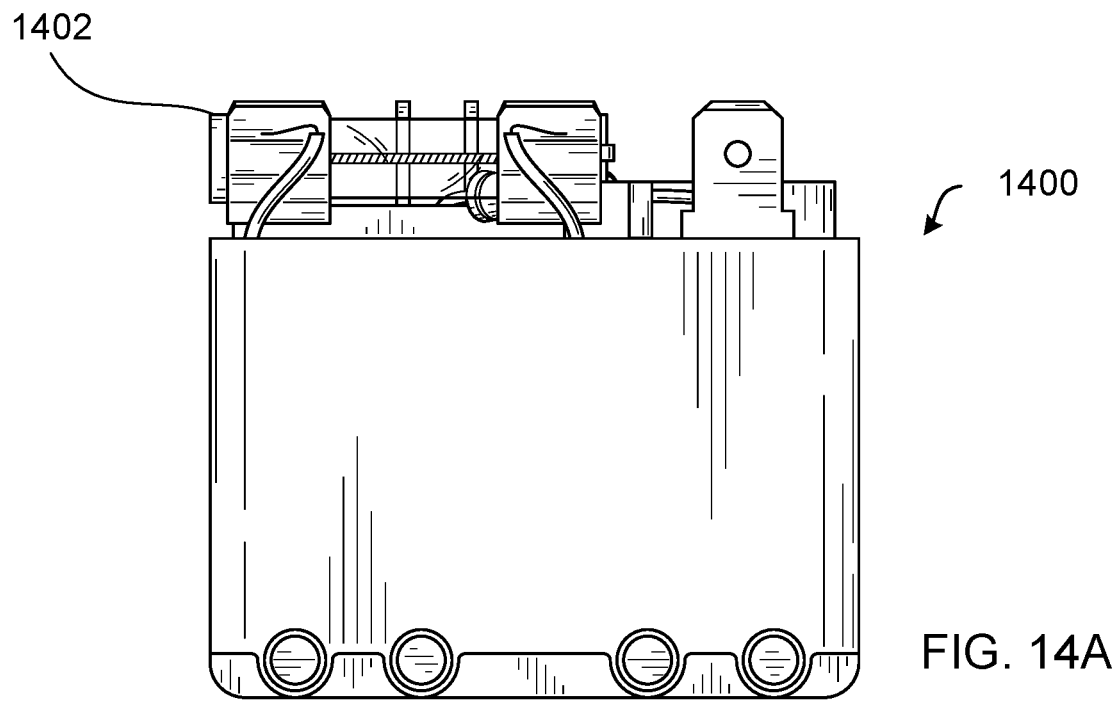
FIG. 14A is a front view of an external relay with a fuse.
Figure 14B:
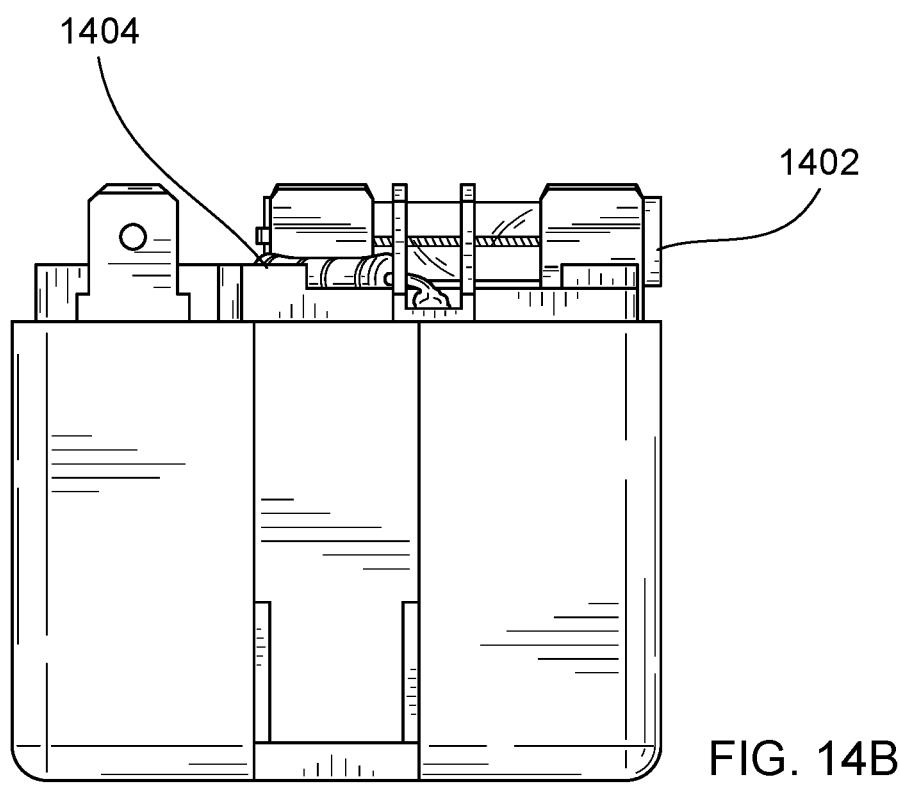
FIG. 14B is a back view of the external relay with the fuse.
Figure 14C:
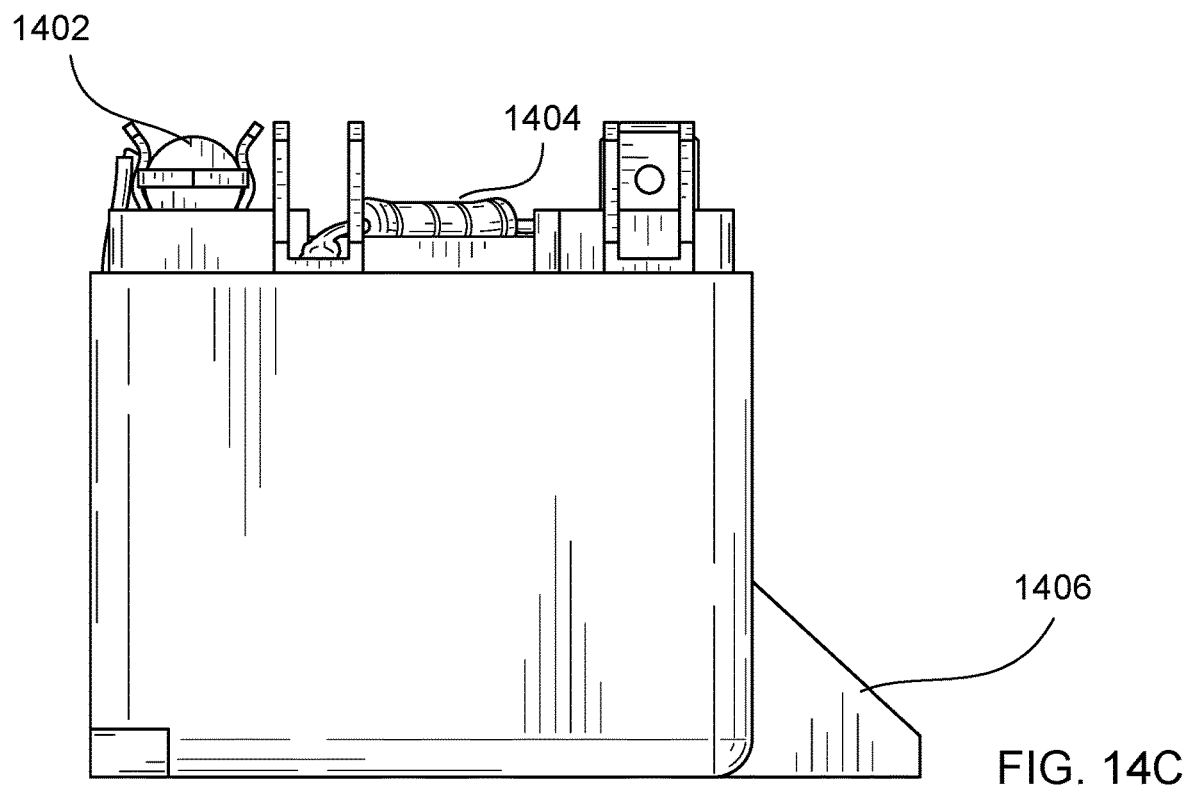
FIG. 14C is a side view of the external relay with the fuse.
Figure 14D:
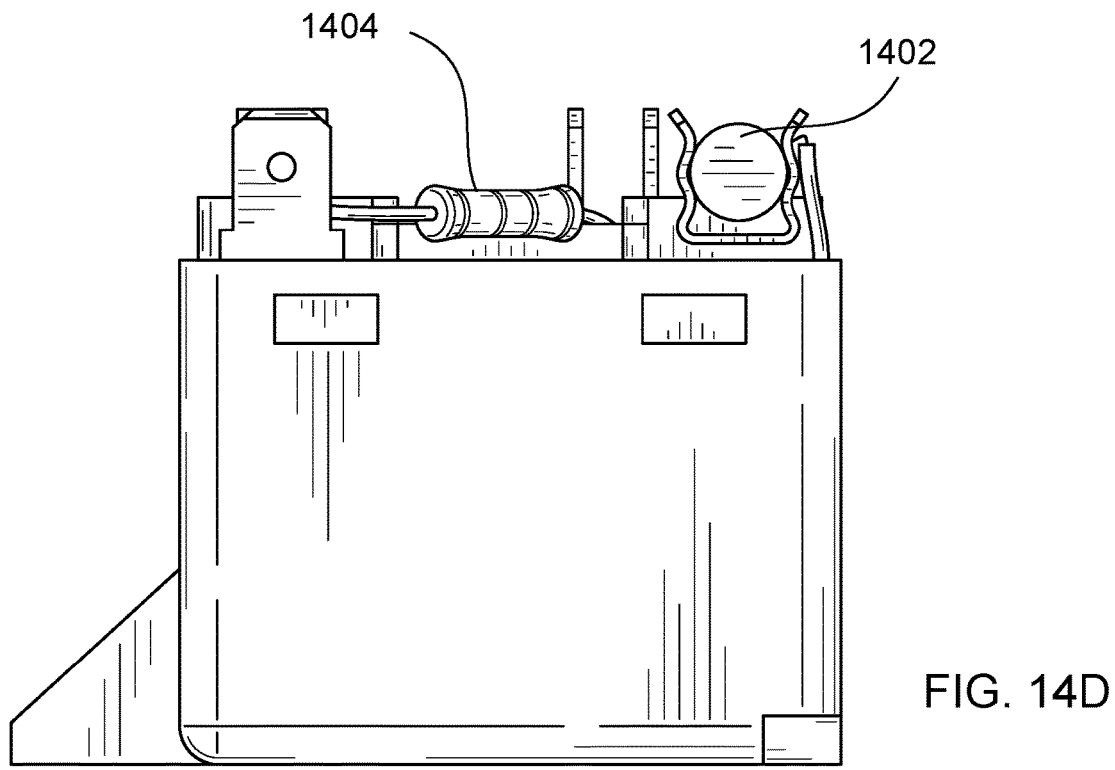
FIG. 14D is a side view of the external relay with the fuse.
Figure 14E:
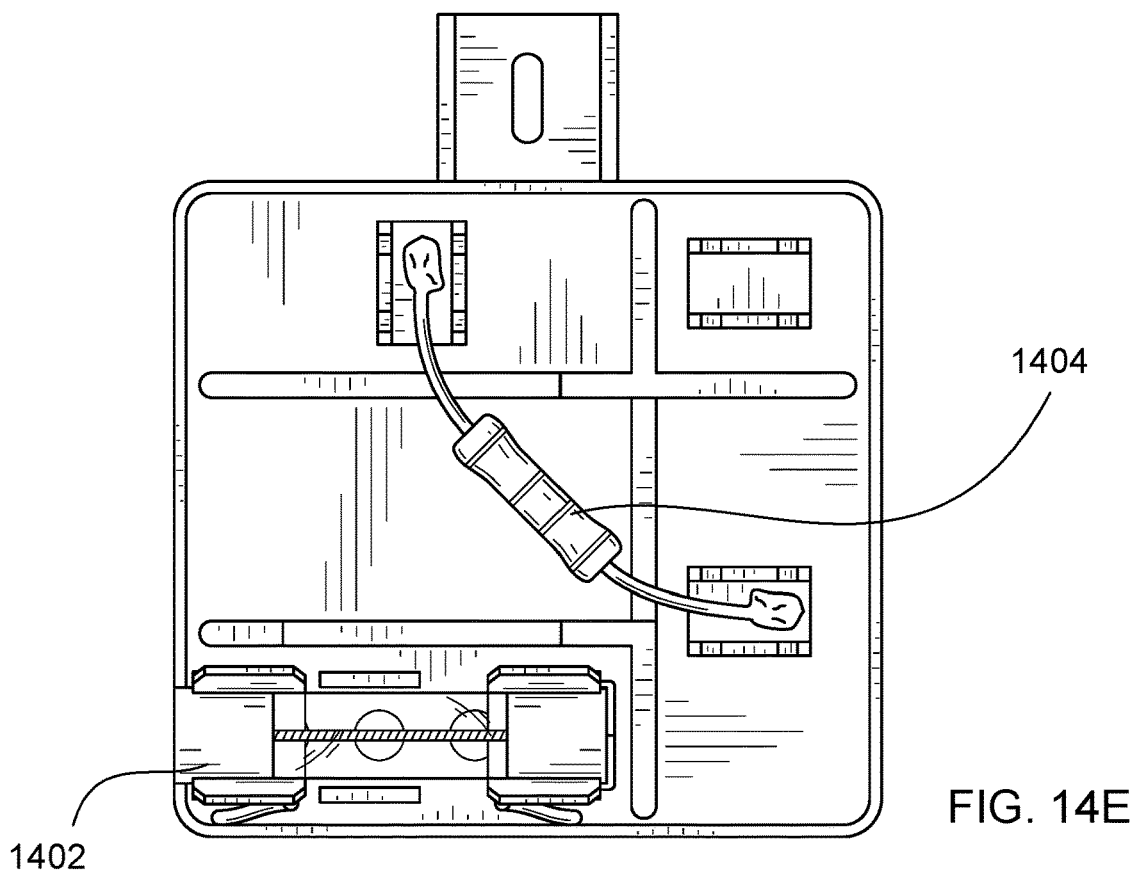
FIG. 14E is a top view of the external relay with the fuse.
Figure 14F:
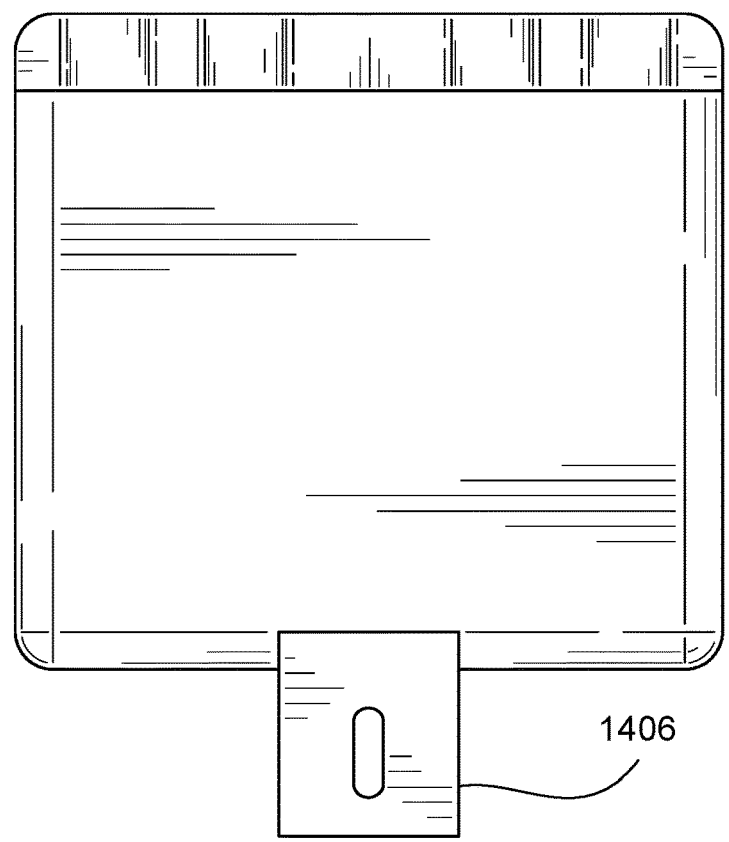
FIG. 14F is a bottom view of the external relay with the fuse.

FIG. 14A illustrates a front view of a relay 1400 with a fuse 1402 mounted to the relay. FIG. 14B illustrates a back view of the relay 1400 with the fuse 1402 mounted to the relay 1400 and a bleeder resistor 1404, which is similar to bleeder resistors 78 and 98 of FIGS. 4 and 9, respectively, and the bleeder resistor 1318 of FIG. 13. The fuse 1402 can be, for example, a slow blow fuse. The fuse 1402 is connected to the circuitry of the relay 1400 so that if a failure occurs (e.g., a capacitive failure, the relay malfunctions, mechanically sticks, welds closed, arcs, etc.), the fuse can open an electrical connection, preventing damage to other components of the system. For example, the fuse 1402 can be electrically connected to an external terminal (e.g., T-1 or T-2) of the relay and the contacts of the relay. When the fuse opens an electrical connection, the contacts of the relay are no longer electrically connected to the external terminals of the relay. FIG. 14C illustrates a side view of the external relay 1400 and illustrates a bracket 1406 which can be used to mount the external relay to other objects. FIG. 14D illustrates a side view of the external relay 1400 and shows the bleeder resistor 1404. FIG. 14E illustrates a top view of the external relay 1400, fuse 1402, and bleeder resistor 1404. FIG. 14F illustrates a bottom view of the external relay 1400 and illustrates a bottom view of the bracket 1406.

Figure 15:
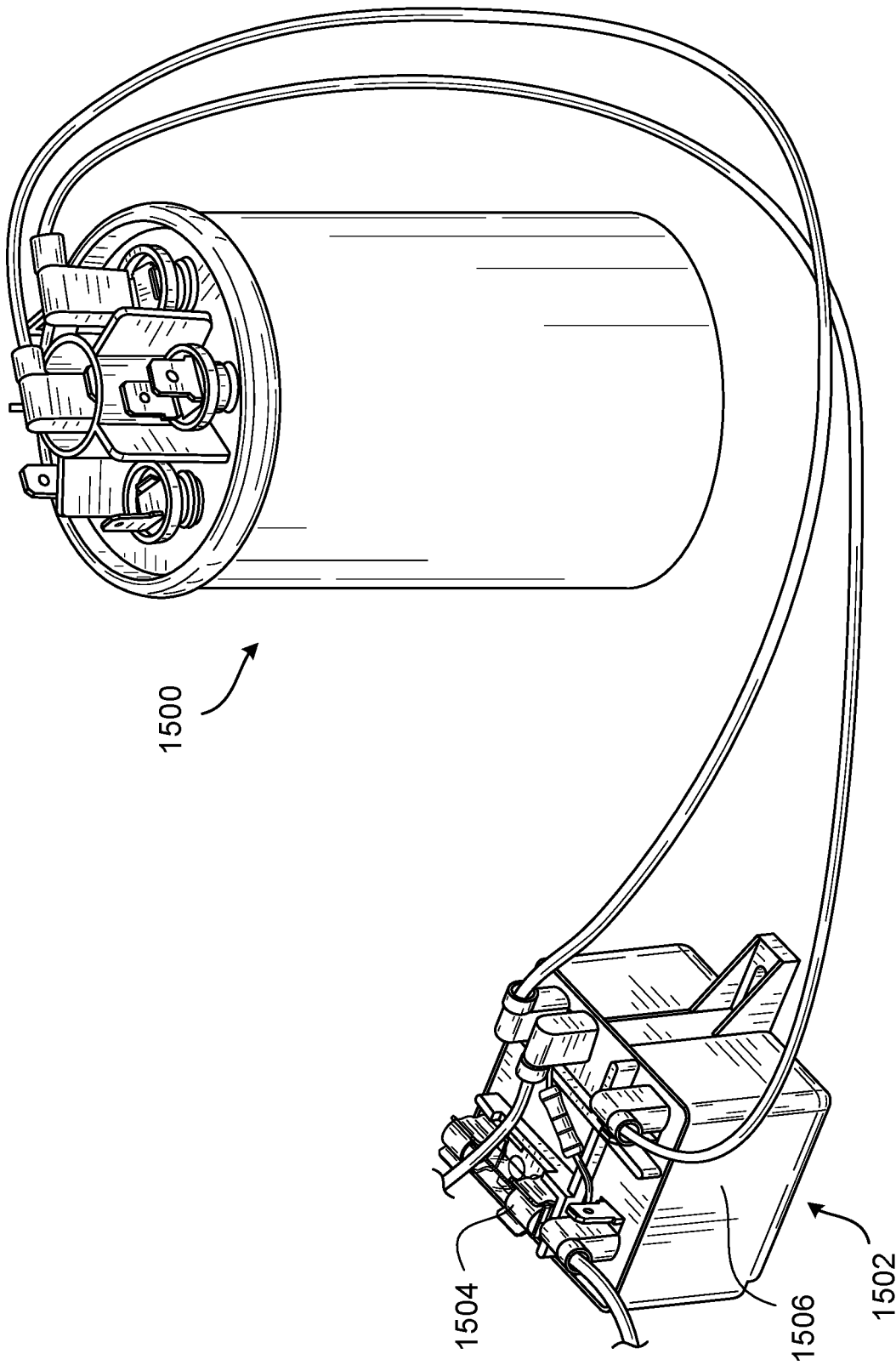
FIG. 15 is a perspective view of a hard start capacitor replacement unit that includes an externally connected relay with a fuse.

Regarding FIG. 15, a perspective view of a hard start capacitor 1500 is shown connected to a relay 1502 (e.g., similar to hard start capacitor 1300 and relay 1302 of FIG. 13). The relay can be, e.g., a potential relay, an electronic relay, etc. However, in the illustrated example, the relay 1502 includes a fuse 1504 (e.g., a slow blow fuse) mounted to the relay 1502 and connected to the circuitry of the relay 1502 (e.g., similar to the fuse 1402 of FIGS. 14A-E). For example, the fuse 1504 can be mounted to the enclosure 1506 of the relay 1502. Therefore, upon a failure (e.g., a capacitive failure, the relay malfunctions, the contacts mechanically stick, etc.), the fuse can open an electrical connection, preventing damage to other components of the system. Different fuses can be mounted to the relay 1502. For example, different ratings of fuses may be used depending on the wiring of the system and the amperage used by the start capacitor. For example, systems with greater capacitance require greater amperage. Wiring multiple capacitors in parallel requires a greater current than a single capacitor. For example, in systems with connections between multiple capacitor terminals on a hard start capacitor (e.g., wiring similar to FIG. 8), a fuse with a higher rating (e.g., 10 A fuse) may be used in the circuit. In this case, the fuse would be intended for use when a hard start capacitor will have multiple connections between capacitor terminals and require a higher amperage. In systems without connections between multiple capacitor terminals on a hard start capacitor (e.g., wiring similar to FIG. 5), a fuse with a lower rating (e.g., a 5 A fuse) may be used. In this case, the fuse would be intended for use when a hard start capacitor will not have multiple connections between capacitor terminals and will require a lower amperage.

Figure 16:
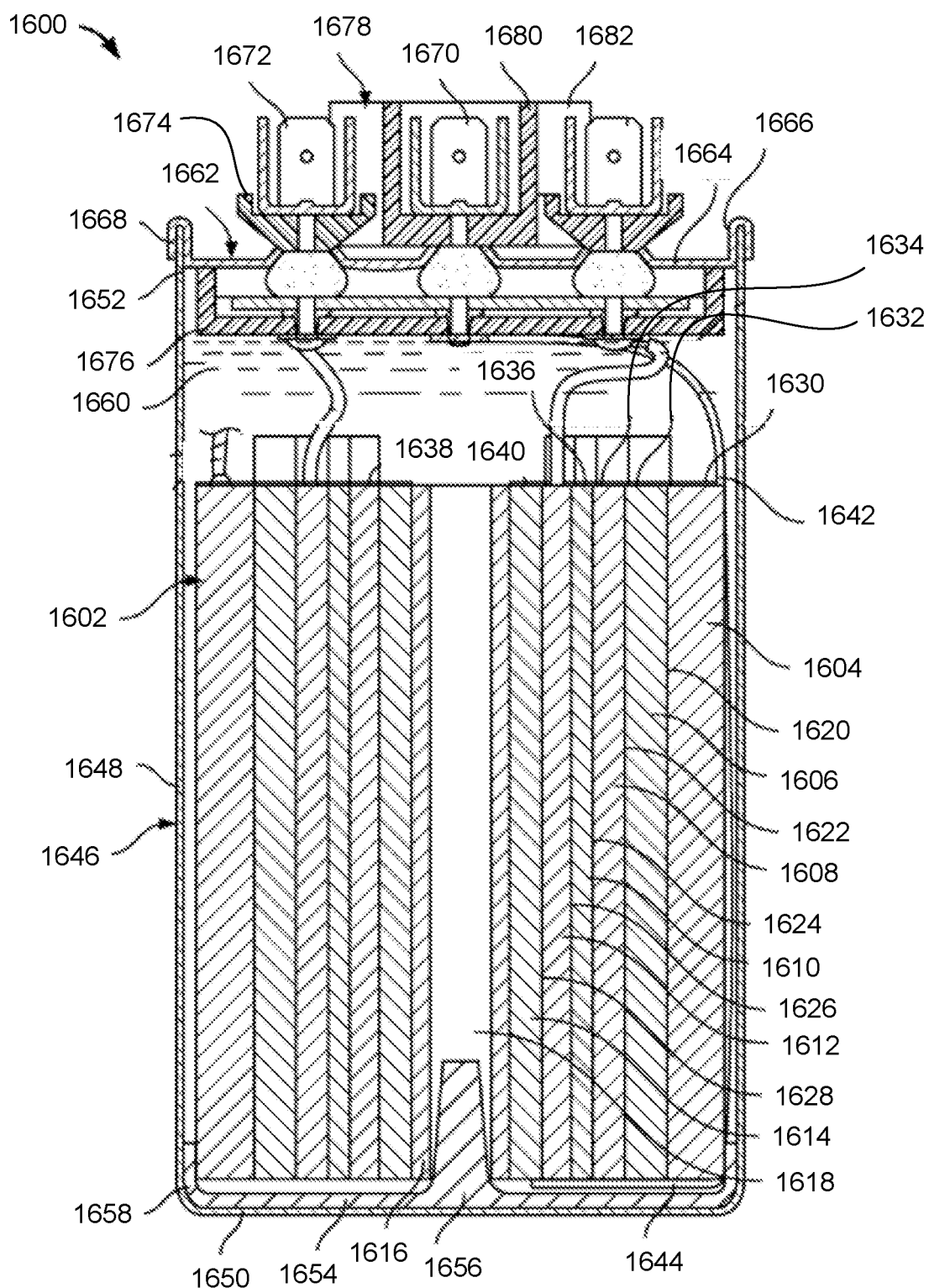
FIG. 16 is a sectional view of a run capacitor.

A hard start capacitor can be electrically connected to a compressor motor and a run capacitor in a variety of ways. For example, the hard start capacitor can be electrically connected to a terminal of the run capacitor. Suitable run capacitors are described in prior U.S. Pat. No. 7,203,053, which is incorporated herein by reference in its entirety. FIG. 16 illustrates an exemplary run capacitor 1600. The run capacitor 1600 has a capacitive element 1602 having a plurality of capacitor sections, each having a capacitance value. In the preferred embodiment described herein, the capacitive element 1602 has six capacitor sections 1604, 1606, 1608, 1610, 1612, 1614. The capacitive element 1602 is a wound cylindrical element manufactured by extension of the techniques described in U.S. Pat. Nos. 3,921,041, 4,028,595, 4,352,145 and 5,313,360, each of which is incorporated herein by reference in its entirety. Those patents relate to capacitive elements having two capacitor sections rather than a larger plurality of capacitor sections, such as the six capacitor sections 1604, 1606, 1608, 1610, 1612, 1614 of the capacitive element 1602. Accordingly, the capacitive element 1602 has a central spool, mandrel, etc. 1616, which has a central opening 1618. First and second dielectric films, each having a metalized layer on one side thereof, are wound in cylindrical form on the mandrel 1616 with the non-metalized side of one film being in contact with the metalized side of the other. Selected portions of one or both of the metalized layers are removed in order to provide a multiple section capacitive element. Element insulation barriers are inserted into the winding to separate the capacitor sections, the element insulation barriers also assuming a cylindrical configuration. Five element insulation barriers 1620, 1622, 1624, 1626, 1628 are provided to separate the six capacitor sections 1604, 1606, 1608, 1610, 1612, 1614, with element insulation barrier 1620 separating capacitor sections 1604 and 1606, element insulation barrier 1622 separating capacitor sections 1606 and 1608, element insulation barrier 1624 separating capacitor sections 1608 and 1610, element insulation barrier 1626 separating capacitor sections 1610 and 1612, and element insulation barrier 1628 separating capacitor sections 1612 and 1614.

The element insulation barriers are insulating polymer sheet material, which in the capacitive element 1602 is polypropylene having a thickness of 0.005 inches, wound into the capacitive element 1602. Thickness of 0.0025 to 0.007 may be used. Other materials may also be used. The barriers each have about 2¾-4 wraps of the polypropylene sheet material, wherein the element insulation barriers have a thickness of about 0.013 to 0.020 inches. The barriers 1620, 1622, 1624, 1626, 1628 are thicker than used before in capacitors with fewer capacitor sections. The important characteristic of the barriers 1620, 1622, 1624, 1626, 1628 is that they are able to withstand heat from adjacent soldering without losing integrity of electrical insulation, such that adjacent sections can become bridged.

The metalized films each have one unmetalized marginal edge, such that the metalized marginal edge of one film is exposed at one end of the wound capacitive element 1602 and the metalized marginal edge of the other film is exposed at the other end of the capacitive element 1602. At the lower end of the capacitance element 1602, the barriers 1620, 1622, 1624, 1626, 1628 do not extend from the film, and an element common terminal is established contacting the exposed metalized marginal edges of one metalized film of all the capacitor sections 1604, 1606, 1608, 1610, 1612, 1614. The element common terminal is preferably a zinc spray applied onto the end of the capacitive element 1602.

At the top end of the capacitive element 1602, the element insulation barriers 1620, 1622, 1624, 1626, 1628 extend above the wound metalized film. An individual capacitor element section terminal is provided for each of the capacitive sections 1604, 1606, 1608, 1610, 1612, 1614, also by applying a metallic spray (e.g., a zinc spray) onto the end of the capacitive element 1602 with the zinc being deployed on each of the capacitor sections 1604, 1606, 1608, 1610, 1612, 1614 between and adjacent the element insulation barriers 1620, 1622, 1624, 1626, 1628. The element section terminals are identified by numerals 1630, 1632, 1634, 1636, 1638, 1640. Element section terminal 1630 of capacitor section 1604 extends from the outer-most element insulation barrier 1620 to the outer surface of the capacitive element 1602, and the element section terminal 1640 of capacitor section 1614 extends from the inner-most element insulation barrier 1628 to the central mandrel 1616. Element section terminals 1632, 1634, 1636, 1638, 1640 are respectively deployed on the capacitor sections 1606, 1608, 1610, 1612, 1614. Conductors preferably in the form of six insulated wires each have one of their ends respectively soldered to the element section terminals 1630, 1632, 1634, 1636, 1638, 1640. The thickness of the polypropylene barriers 1620, 1622, 1624, 1626, 1628 resists any burn-through as a result of the soldering to connect wires to the terminals 1630, 1632, 1634, 1636, 1638, 1640.

The insulation of the wires may be color coded to facilitate identifying which wire is connected to which capacitor section. The wire connected to element section terminal 1640 of capacitor section 1604 has blue insulation, the wire connected to element section terminal 1632 of capacitor section 1606 has yellow insulation, the wire connected to element section terminal 1634 of capacitor section 1608 has red insulation, the wire connected to element section terminal 1636 of capacitor section 1610 has white insulation, the wire connection to element section terminal 1638 of capacitor section 1612 has white insulation, and the wire connected to element section terminal 1640 of capacitor section 1614 has green insulation.

The capacitive element 1602 is further provided with foil strip conductor 1642, having one end attached to the element common terminal at 1644. The foil strip conductor 1642 is coated with insulation, except for the point of attachment 1644 and the distal end thereof. The conductor connected to the outer capacitor element section 1604 and its terminal 1630 may also be a foil strip conductor. If desired, foil, wire conductors, etc. may be utilized for all connections.

In the capacitive element 1602 used in the run capacitor 1600, the capacitor section 1604 has a value of about 25.0 microfarads (e.g., about 20 microfarads to about 30 microfarads) and the capacitor section 1606 has a capacitance of about 20.0 microfarads (e.g., about 15 microfarads to about 25 microfarads). The capacitor section 1608 has a capacitance of about 10.0 microfarads (e.g., about 5 microfarads to about 15 microfarads). The capacitor section 1610 has a capacitance of about 5.5 microfarads (e.g., about 2.5 microfarads to about 10 microfarads), but can be identified as having a capacitance of 5.0 microfarads for purposes further discussed in U.S. Pat. No. 10,586,655, incorporated herein in its entirety by reference. The capacitor section 1612 has a capacitance of about 4.5 microfarads (e.g., about 2.5 microfarads to about 10 microfarads) but is labeled as having a capacitance of 5 microfarads, e.g., for purposes described in U.S. Pat. No. 10,586,655, incorporated herein in its entirety by reference. The capacitor section 1614 has a capacitance of 2.8 microfarads (e.g., about 1 microfarad to about 5 microfarads). The capacitor section 1604 with the largest capacitance value also has the most metallic film, and is therefore advantageously located as the outer section or at least one of the three outer sections of the capacitive element 1602.

The run capacitor 1600 also has a case 1646 having a cylindrical side wall 1648, a bottom wall 1650, and an open top 1652 of side wall 1648. The case 1646 is formed of aluminum and the cylindrical side wall 1648 has an outside diameter of 2.50 inches. This is a very common diameter for capacitors of this type, wherein the run capacitor 1600 will be readily received in the mounting space and with the mounting hardware provided for the capacitor being replaced. Other diameters may, however, be used, and the case may also be of a suitable material (e.g., plastic).

The capacitive element 1602 with the wires and the foil strip 1642 are received in the case 1646 with the element common terminal adjacent the bottom wall 1664 of the case. An insulating bottom cup 1654 is preferably provided for insulating the capacitive element 1602 from the bottom wall 1650, the bottom cup 1654 having a center post 1656 that is received in the center opening 1618 of the mandrel 1616, and an up-turned skirt 1658 that embraces the lower side wall of the cylindrical capacitive element 1602 and spaces it from the side wall 1648 of the case 1646.

An insulating fluid 1660 is provided within the case 1646, at least partly and preferably substantially surrounding the capacitive element 1602. The fluid 1660 may be the fluid described in U.S. Pat. No. 6,014,308, incorporated herein by reference in its entirety. In other embodiments, the fluid 1660 can be other fluids, such as polybutene, etc.

The run capacitor 1600 also has a pressure interrupter cover assembly 1662. The cover assembly 1662 includes a deformable circular cover 1664 having an upstanding cylindrical skirt 1666 and a peripheral rim 1668. The skirt 1666 fits into the open top 1652 of the cylindrical side wall 1648 of case 1646, and the peripheral rim 1668 is crimped to the open top 1652 of the case 1646 to seal the interior of the run capacitor 1600 and the fluid 1660 contained therein.

The pressure interrupter cover assembly 1662 includes seven cover terminals mounted on the deformable cover 1664. A common cover terminal 1670 is mounted generally centrally on the cover 1664, and section cover terminals, each respectively corresponding to one of the capacitor sections 1604, 1606, 1608, 1610, 1612, 1614, are mounted at spaced apart locations surrounding the common cover terminal 1670. The section cover terminal 1672 has three upstanding blades mounted on the upper end of a terminal post. The terminal post has a distal end, opposite the blades. The cover 1664 has an opening for accommodating the terminal post, and has a beveled lip surrounding the opening. A shaped silicone insulator fits snuggly under the cover in the beveled lip and the terminal post passes through the insulator. On the upper side of the cover, an insulator cup 1674 also surrounds the post, and the insulator cup sits atop the silicone insulator; thus, the terminal 1672 and its terminal post are well insulated from the cover 1664. The other cover section terminals are similarly mounted with an insulator cup and a silicone insulator. The pressure interrupter cover assembly 1662 provides such protection for the run capacitor 1600 and its capacitive element 1602. Outgassing can cause the circular cover 1664 to deform upwardly into a generally domed shape. When the cover 1664 deforms, the terminal posts are also displaced upwardly from the disconnect plate 1676, and the weld connection of the distal end of common cover terminal post to the distal end foil lead from the element common terminal 1636 of the capacitive element 1602 is broken, and the welds between the foil tabs and the terminal posts of the section cover terminals are also broken. Locating the common cover terminal 1670 in the center of the cover 1664, where the deformation of the cover 1664 is the greatest, ensures that the common cover terminal connection is broken both first and with certainty in the event of a failure of the capacitive element 1602.

The common cover terminal 1670 has four blades in this example, and a terminal post that passes through a silicone insulator. The common cover terminal 1670 mounts cover insulator barrier 1678 that includes an elongated cylindrical center barrier cup 1680 surrounding and extending above the blades of the common cover terminal 1670, and six barrier fins 1682 that extend respectively radially outwardly from the elongated center barrier cup 1680 such that they are deployed between adjacent section cover terminals. This provides additional protection against any arcing contact between adjacent section cover terminals, with the common cover terminal 1670, etc. Alternatively, the common cover terminal 1670 may be provided with an insulator cup 1680, preferably extending above the blades but with no separating barrier fins, although the barrier fins 1682 are preferred. The terminal post extends through an opening in the bottom of the base of the insulating barrier cup 1680, and through the silicone insulator, to a distal end.

The pressure interrupter cover assembly 1662 has a fiberboard disc through which the terminal posts of the section cover terminals extend. The disc may be also fabricated of other suitable material, such as polymers. The terminal posts are configured as rivets with rivet flanges for assembly purposes. The terminal posts are inserted through the disc, insulators, insulator cups and barrier cup 1680, and the cover terminals are spot welded to the ends of the rivets opposite the rivet flanges. Thus, the rivet flanges secure the cover terminals in the cover 1664, together with the insulator barrier 1678, insulator cups 1674, and silicone insulators. The fiberboard disc facilitates this assembly, but may be omitted, if desired. The distal ends of the terminal posts are preferably exposed below the rivet flanges.

The cover assembly 1662 has a disconnect plate 1676. The disconnect plate 1676 is made of a rigid insulating material, such as a phenolic, is spaced below the cover 1664 by a spacer in the form of a skirt. The disconnect plate 1676 is provided with openings accommodating the distal ends of the terminal posts. The disconnect plate 1676 is further described in prior U.S. Pat. No. 10,586,655, incorporated herein by reference in its entirety.

In prior capacitors having three or fewer capacitor sections, the conductors between the capacitor sections and the terminal posts were generally foil strips, such as the one used for the common element terminal 1636 of the capacitive element 1602 herein. The foil strips were positioned on a breaker plate over the distal ends of terminal posts, and were welded to the distal ends of the terminal posts. In run capacitor 1600, the distal end 1644 of the foil strip 1642 is connected to the distal end of terminal post by welding, as in prior capacitors.

The wires may not be well-configured for welding to the distal ends of the terminal posts of the cover section terminals. However, the wires are desirable in place of foil strips because they are better accommodated in the case 1646 and have good insulating properties, resist nicking and are readily available with colored insulations. In order to make the necessary connection of the wires to their respective terminal posts, foil tabs are welded to each of the distal ends of the terminal posts of the section cover terminals and the guides are helpful in positioning the foil tabs for the welding procedure. The attachment may be accomplished by welding the distal end of a foil strip to the terminal post, and then cutting the foil strip to leave the foil tab. Thereafter, the conductor of the wire is soldered to the tab, by solder. The insulation of the wire has been stripped to expose the conductor. The other wires are similarly connected to their respective cover section terminals. Alternatively, the foil tabs may be soldered to the wires and the tabs may then be welded to the terminal posts, if desired, other conductive attachment may be employed, etc.

Accordingly, each of the capacitor sections 1604, 1606, 1608, 1610, 1612, 1614 is connected to a corresponding section cover terminal by a respective one of color coded wires. The insulator cups 1674 associated with each of the section cover terminals are also color coded, using the same color scheme as used in the wires. This facilitates assembly, in that each capacitor section and its wire conductor are readily associated with the correct corresponding section cover terminal, so that the correct capacitor sections can be identified on the cover to make the desired connections for establishing a selected capacitance value.

The connections of the wires and the foil to the terminal posts are made prior to placing the capacitive element 1602 in the case 1646, adding the insulating fluid 1660, and sealing the cover 1664 of cover assembly 1662 to the case 1646. The case 1646 may be labeled with the capacitance values of the capacitance sections 1604, 1606, 1608, 1610, 1612, 1614 adjacent the cover terminals, such as on the side of case 1646 near the cover 1664, on the cover 1664, etc.

The run capacitor 1600 may be used to replace a failed capacitor of any one of over two hundred different capacitance values, including both single and dual applications. Therefore, a serviceman is able to replace virtually any failed capacitor he may encounter as he makes service calls on equipment of various manufacturers, models, ages and the like.

As noted above, the run capacitor 1600 is expected to be used most widely in servicing air conditioning units. Air conditioning units typically have two capacitors; a capacitor for the compressor motor which may or may not be of relatively high capacitance value and a capacitor of relatively low capacitance value for a fan motor. The compressor motor capacitors typically have capacitances of from 20 to about 60 microfarads. The fan motor capacitors typically have capacitance values from about 2.5 to 12.5 microfarads, and sometimes as high as 15 microfarads, although values at the lower end of the range are most common.

Figure 17A:
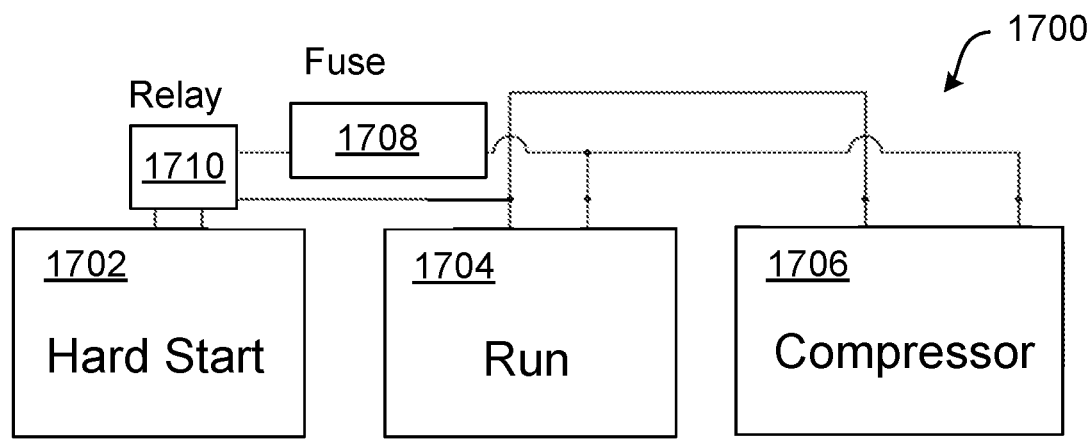
FIGS. 17A and 17B are schematic circuit diagrams of connections among a run capacitor, a start capacitor, and a compressor.

FIG. 17A illustrates a schematic circuit diagram illustrating connections of a circuit 1700. The circuit 1700 includes connections between a hard start capacitor 1702, a run capacitor 1704, and a compressor motor 1706 (e.g., of an air conditioning system). In the illustrated example, the hard start capacitor 1702 and the run capacitor 1704 are electrically connected in parallel to the compressor motor 1706. The circuit 1700 also includes a fuse 1708 (e.g., a slow blow fuse as described above) that is electrically connecting the hard start capacitor 1702 and the compressor motor 1706. The circuit 1700 also includes a relay 1710 (e.g., a relay as described in FIGS. 4 and 9) If the fuse 1708 opens an electrical connection due to a failure (e.g., a compressor motor failure, a start capacitor failure, a run capacitor failure, a relay malfunction, etc.), the hard start capacitor 1702 is electrically disconnected from the circuit, preventing damage to the compressor motor, other system components, etc. For example, the fuse 1708 can open the electrical connection between the hard start capacitor 1702 and the compressor motor 1706, which will remove the hard start capacitor 1702 from the circuit. This can prevent the start capacitor from keeping the compressor running despite failure of the run capacitor, for example.

Figure 17B:
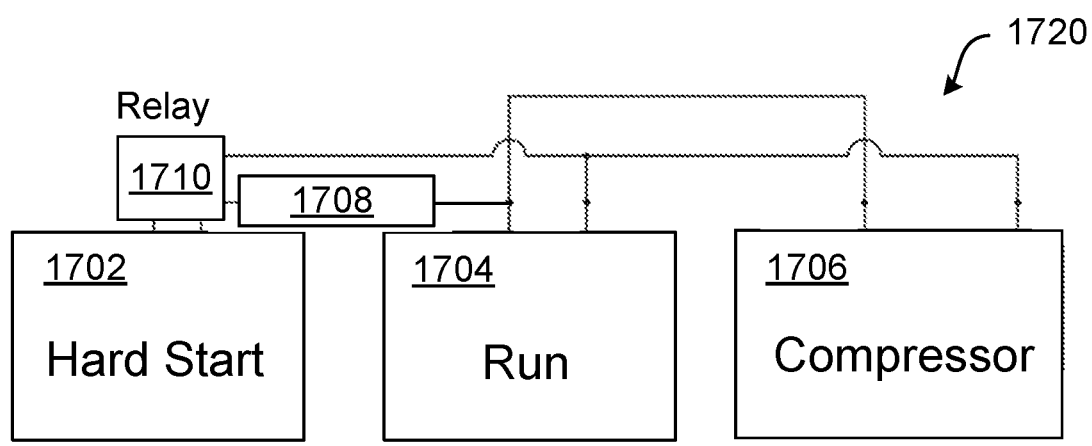

FIG. 17B illustrates a similar schematic circuit diagram of connections of a circuit 1720, which includes the hard start capacitor 1702, the run capacitor 1704, and the compressor motor 1706. The circuit 1720 includes the fuse 1708 electrically connecting the hard start capacitor 1702 and the run capacitor 1704. The circuit 1720 also includes a relay 1710. If the fuse 1708 opens an electrical connection due to a failure (e.g., a compressor motor failure, a start capacitor failure, a run capacitor failure, etc.), the hard start capacitor 1702 is electrically disconnected from the circuit (e.g., electrically disconnected from the run capacitor), preventing damage to the compressor motor and other system components. For example, the fuse 1708 will open the electrical connection between the hard start capacitor 1702 and the run capacitor 1704, which will remove the hard start capacitor 1702 from the circuit. In some implementations, the capacitors 1702, 1704 can have more terminals. The reduced number of terminals used in the drawings is simply for illustration. The circuits 1700, 1720 demonstrate that a fuse can be electrically connected to either electrical connection between the relay 1710 and the run capacitor 1704. For example, the fuse 1708 can be connected to the common terminal of the run capacitor 1704, or, the fuse 1708 can be connected to one or more of the cover terminals of the run capacitor 1704. Similar electrical connections may be implemented to the terminals of the compressor 1706; for example the fuse 1708 may be connected to a common terminal of the compressor 1706 or the fuse may connected to another terminal of the compressor (e.g., a high side terminal). While a single fuse is used in these implementations, multiple fuses can be employed. For example, one fuse could electrically connect the relay 1708 to the common terminal of the run capacitor 1704, and, a second fuse 1708 could electrically connect the relay to one or more cover terminals of the run capacitor 1704.

Some motor run capacitors have a booster terminal (e.g., a second common terminal that is electrically connected to the first common terminal), which can electrically connect and electrically disconnect equipment that is external to the run capacitor from a circuit. Examples of run capacitors with booster terminals are further described in U.S. Pat. No. 10,586,655, incorporated herein by reference in its entirety.

Figure 18:
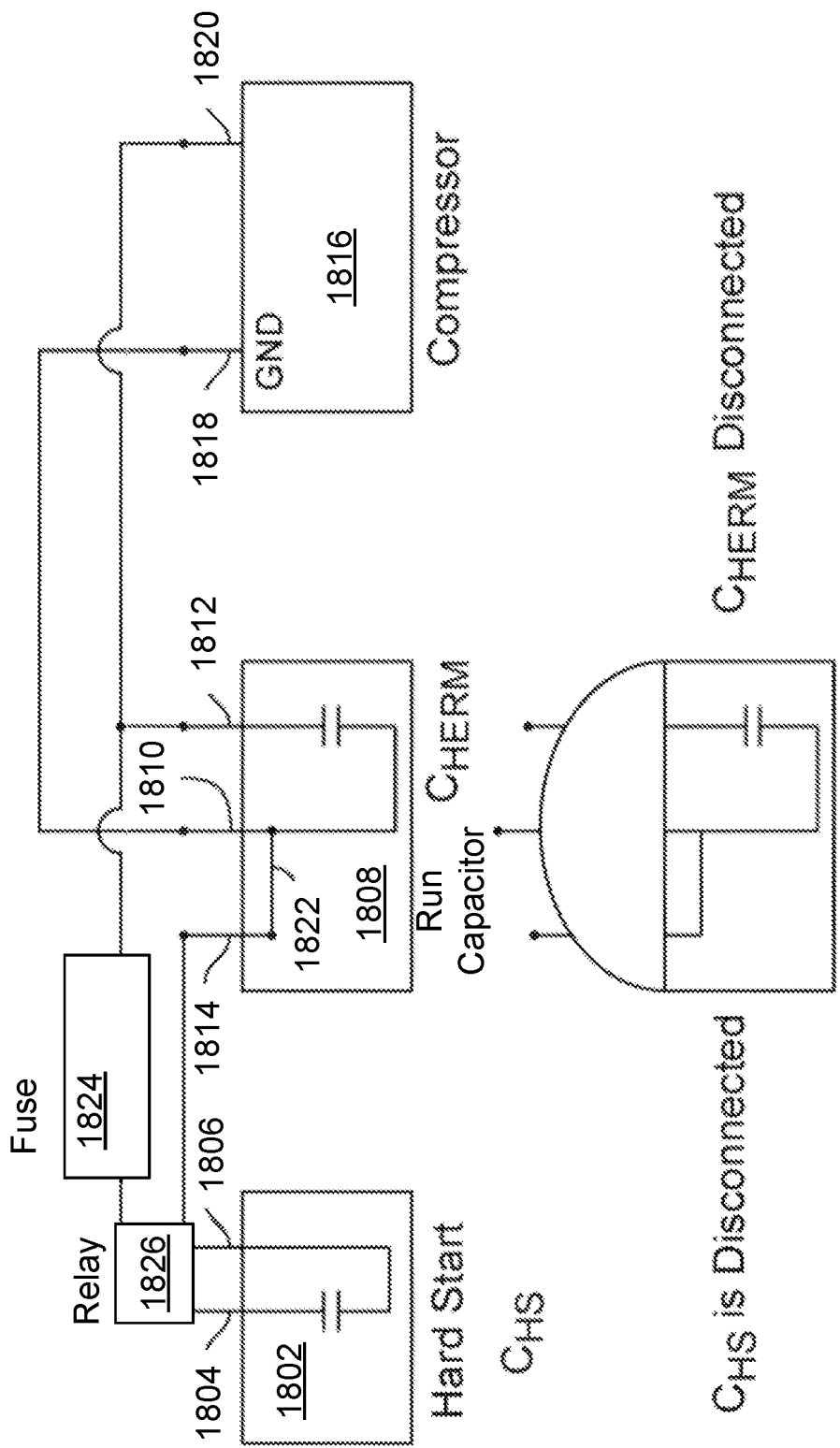
FIG. 18 is a schematic circuit diagram of connections among a run capacitor, a start capacitor, and a compressor.

For example, FIG. 18 shows a schematic circuit diagram illustrating connections among a start capacitor 1802 with terminals 1804, 1806, a run capacitor 1808 with a common cover terminal 1810 and a cover terminal 1812, the run capacitor 1808 including a booster terminal 1814, and a compressor motor 1816 (e.g., of an air conditioning system) having terminals 1818, 1820. In some implementations, the capacitors 1802, 1808 can have more terminals. The reduced number of terminals is simply for illustration. In the illustrated example, the booster terminal 1814 is connected to a common cover terminal 1810 of the run capacitor. A connection 1822 (e.g., provided by one or more conductors) is located beneath a cover of the run capacitor 1808. When the system is operational, the capacitor of the hard start capacitor 1802 and the capacitor (e.g., the herm capacitor) of the run capacitor 1808 are connected in parallel. When the run capacitor 1808 fails, as shown in the illustration, connections are broken, and the start capacitor 1802 is not electrically connected to the compressor 1816, as shown. In particular, the common terminal's connection (of the run capacitor 1808) to ground is broken, thereby resulting in the start capacitor 1802 being electrically disconnected from the compressor 1806.

In some embodiments, the booster terminal 1814 includes indicia to signify that it is related to safety and is a safety feature. In some embodiments, the booster terminal 1824 is colored a designated color (e.g., orange) to signify that it is a safety feature. For example, the designated color can signify that the booster terminal 1814 removes equipment from the circuit in response to a failure (e.g., a failure of the run capacitor 1808). In other embodiments, the booster terminal 1814 includes a label to signify that it is a safety feature.

To prevent damage to components of the circuit (e.g., the motor) due to a failure (e.g., a failure of the motor, a failure of the run capacitor, a failure of the start capacitor, a relay malfunction, etc.), a fuse can be included in the circuit of FIG. 18 in a variety of ways. For example, in the illustrated embodiment, a fuse 1824 is electrically connected to a relay 1826 (e.g., similar to relays described above in FIGS. 4 and 9). The fuse 1824 can be electrically connecting a terminal (e.g., the terminal 1804) of the start capacitor and the terminal 1820 of the motor 1816. If the fuse 1824 opens an electrical connection due to a failure (e.g., a compressor motor failure, a relay failure, a start capacitor failure, a run capacitor failure, etc.), the hard start capacitor 1802 is electrically disconnected from the circuit, preventing damage to the compressor motor and other system components. For example, the fuse 1824 opens the electrical connection between the hard start capacitor 1802 and the compressor motor 1816, which will remove the hard start capacitor 1802 from the circuit.

Figure 18A:
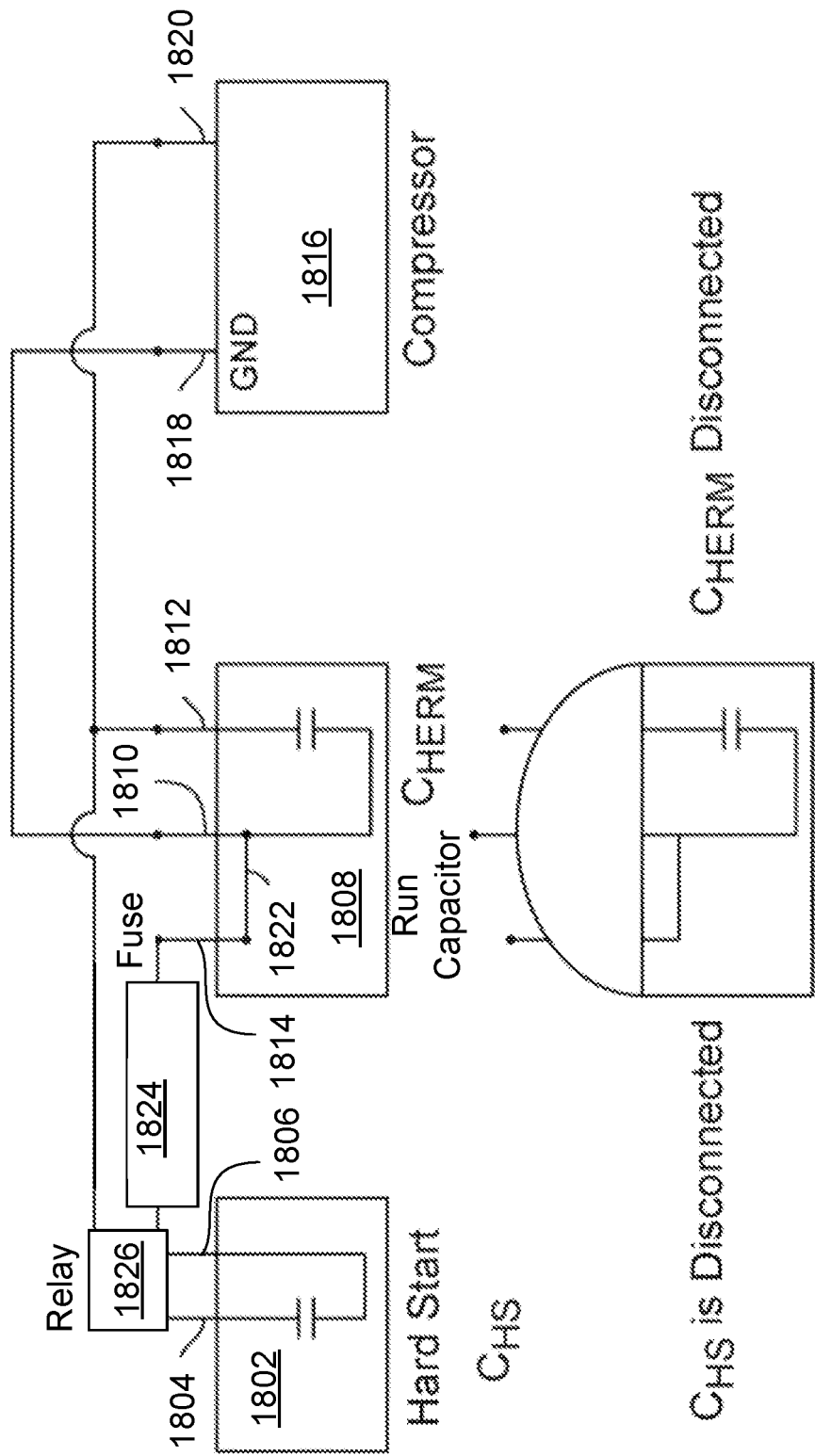
FIG. 18A is a schematic circuit diagram of other connections among a run capacitor, a start capacitor, and a compressor.

In some implementations, the fuse 1824 can be electrically connecting another terminal (e.g., the terminal 1806) of the start capacitor 1802 and the booster terminal 1814 of the run capacitor 1808. For example, as shown in FIG. 18A, the fuse 1824 is electrically connecting the relay 1826 (e.g., and terminal 1806 of the start capacitor 1802) and the booster terminal 1814 of the run capacitor 1808. In this implementation, the fuse is electrically connected to the ground terminal 1818 of the compressor motor. In some implementations, it is advantageous to electrically connect to the ground terminal 1818. In other implementations, it is advantageous to electrically connect to another terminal (e.g., the terminal 1820).

The fuse 1824 can also be electrically connected in other parts of the circuit. In another example, a fuse can be electrically connecting the terminal 1810 of the run capacitor 1808 and the terminal 1818 of the motor. Additionally or alternatively, a fuse can be electrically connecting the terminal 1812 of the run capacitor and the terminal 1820 of the motor.

Figure 19:
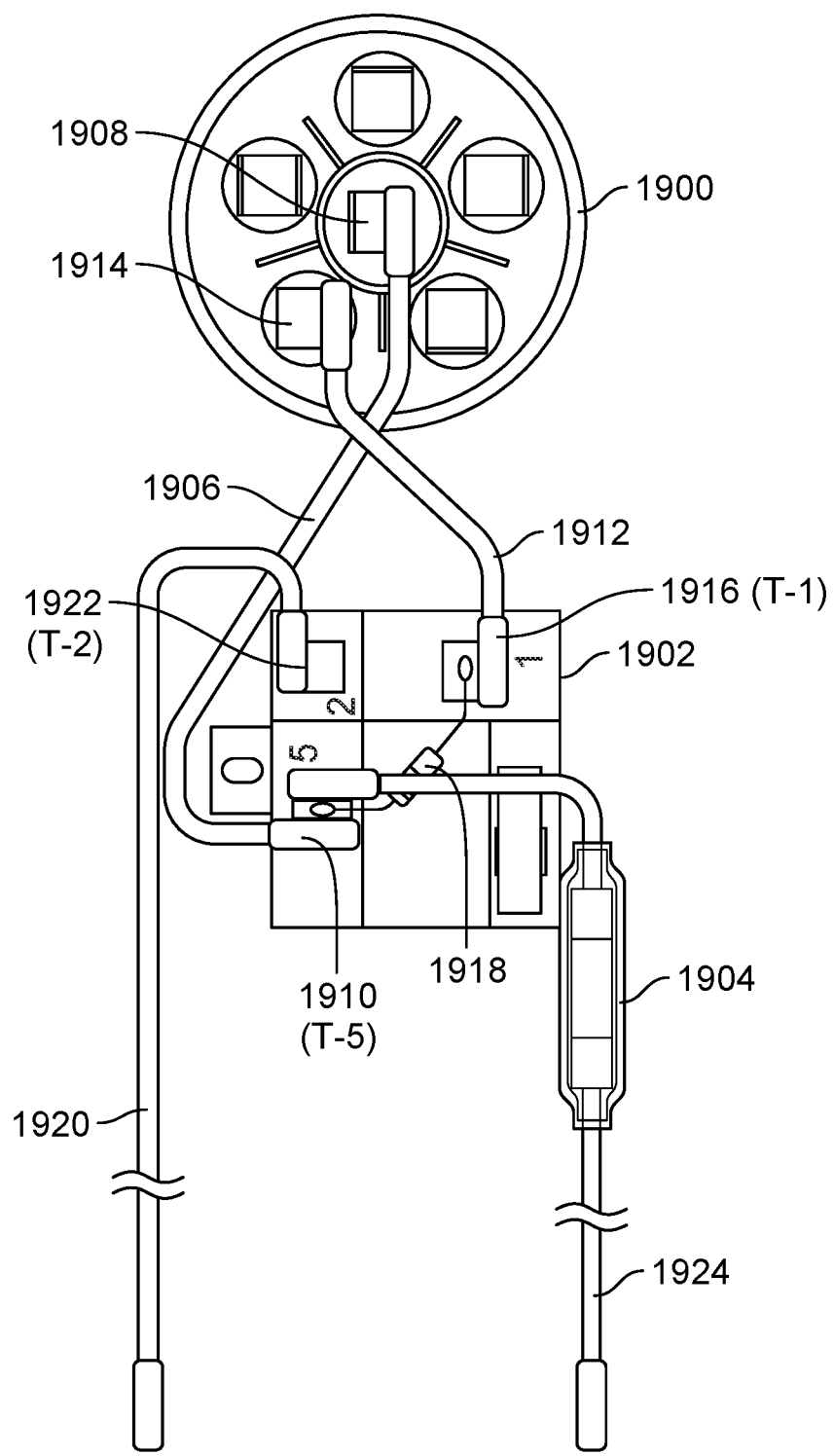
FIG. 19 is a top view of a hard start capacitor replacement unit including an externally connected relay and a fuse.

Fuses can be connected to a hard start capacitor replacement unit to provide protection and prevent damage to other electrical components (e.g., a motor, a run capacitor, etc.) that may be connected to the hard start capacitor replacement unit in the event of a failure (e.g., a failure of the motor, a relay malfunction, etc.). Regarding FIG. 19, a top view of a hard start capacitor replacement unit 1900 is shown connected to an external relay 1902 and a fuse 1904 and in use with a motor run capacitor and a compressor motor. The wiring in FIG. 19 is one technique of connecting a fuse (e.g., a slow blow fuse) to disconnect the hard start capacitor and a compressor upon a failure (e.g., a capacitive failure, the relay malfunctions, internal connections of the relay mechanically stick). In this illustrated example, a conductor 1906 connects a common cover terminal 1908 to an external terminal 1910 (T-5) of a relay 1902 (e.g., a potential relay). Another conductor 1912 connects a capacitor cover terminal 1914 to an external terminal 1916 (T-1) of the potential relay 1902. A bleeder resistor 1918 connects the external terminal 1910 of the potential relay to the external terminal 1916 of the potential relay. A conductor 1920 connects the external terminal 1922 (T-2) of the relay to the compressor motor, the motor run capacitor, etc. A conductor 1924 connects the fuse 1094 (that is connected to external terminal 1910) to the compressor motor, the motor run capacitor, etc.

Referring back briefly to FIG. 4 and FIG. 9, the external terminals 1916, 1922, and 1910 of relay 1902 are internally connected with contacts and that may be closed by a contact bar, e.g., in a similar manner as relay 18. When the contact bar is closed, hard start capacitor 1900 is connected in parallel to the compressor motor and the run capacitor. When the contact bar is open, hard start capacitor 1900 is disconnected from the circuit. The conductor 1924 includes the fuse 1904 so that while the fuse 1904 is intact, the hard start capacitor 1900 and the relay 1902 are connected to the compressor motor and the run capacitor. When the fuse 1904 blows (e.g., is no longer intact), the fuse 1904 halts current flow and removes the relay and hard start capacitor from the circuit.

In another implementation, the fuse 1904 is placed in another position within the circuit formed by the hard start capacitor, relay, and compressor; for example, a fuse (e.g., the fuse 1904) can be located in the conductor 1920. Thereby the fuse 1904 can be connected to external terminal 1922 (T-2) and the conductor 1920 can be connected to the run capacitor and/or compressor. Different ratings of fuses may be implemented in the system depending on the wiring of the system and the amperage used by the start capacitor. For example, systems with greater capacitance may require greater amperage. For example, in systems with connections between multiple capacitor terminals on a hard start capacitor (e.g., wiring similar to FIG. 8), a fuse with a higher rating (e.g., 10 A fuse) may be used due to the greater capacitance. In systems without connections between multiple capacitor terminals (such as a single unit capacitor) on a hard start capacitor (e.g., wiring similar to FIG. 5), a fuse with a lower rating (e.g., a 5 A fuse) may be used.

In some implementations, it is beneficial to use an internal relay (e.g., a relay internal to the container of the hard start capacitor replacement unit), as the relay is more protected from environmental factors and related damage when compared to an external relay. Regarding FIG. 20, a top view of a hard start capacitor replacement unit 2000 is presented having an internally positioned potential relay (not viewable) and an externally positioned fuse 2002. A conductor 2004 includes the fuse 2002 and electrically connects the common cover terminal of the hard start capacitor replacement unit to a compressor motor, the motor run capacitor, etc. Therefore, if the fuse 2002 opens an electrical connection due to a failure (e.g., a stuck relay, a capacitor failure), the hard start capacitor replacement unit is no longer connected to the circuit, preventing damage to the hard start capacitor, the compressor motor, the run capacitor, etc. A conductor 2006 electrically connects a capacitor cover terminal 2008 to the compressor motor, the run capacitor, etc. In another implementation, the fuse could be included with other conductors, e.g., the conductor 2006, to disconnect the hard start capacitor from the circuit upon a failure (e.g., if the potential relay malfunctions such as if the contacts mechanically stick) to prevent damage to, e.g., the compressor motor, if the hard start capacitor is not removed from the circuit.

Figure 20:
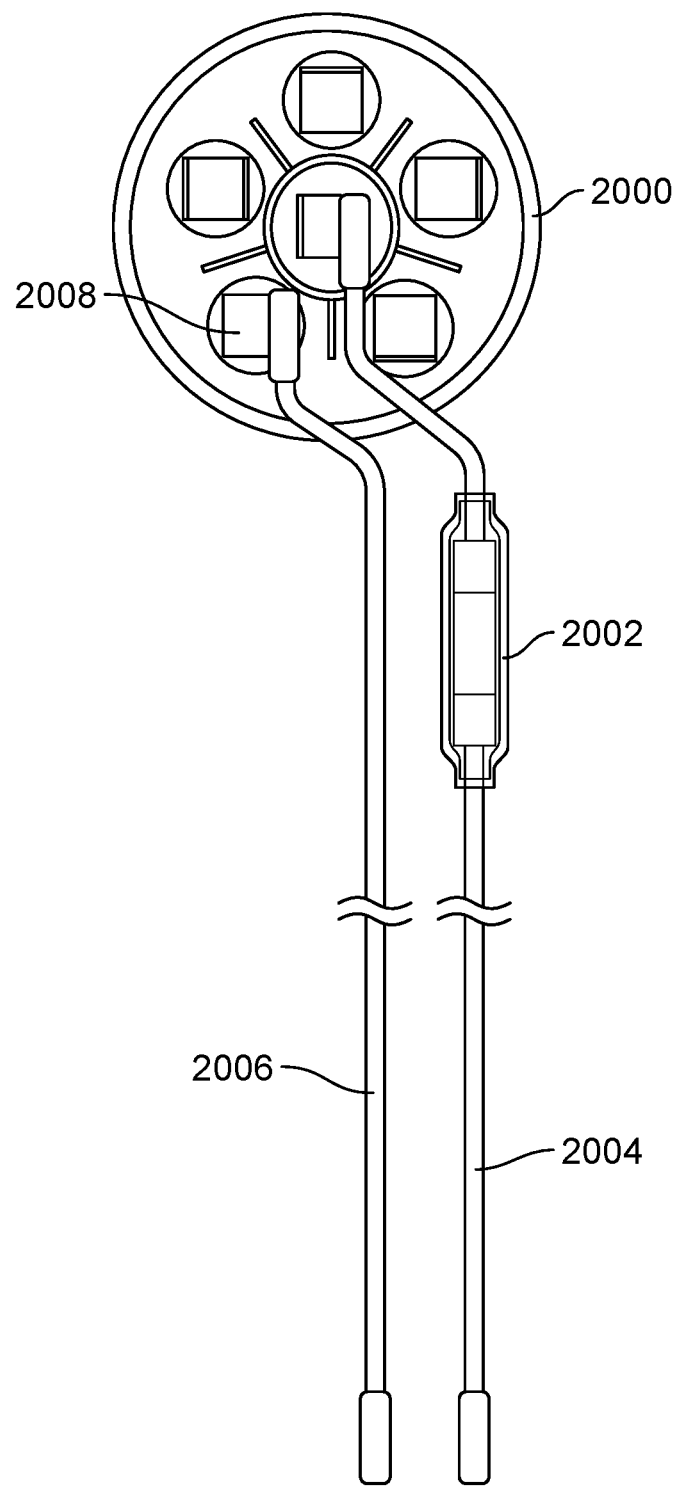
FIG. 20 is a top view of a hard start capacitor replacement unit including an internal relay, the hard start capacitor replacement unit connected to a fuse.
Figure 21:
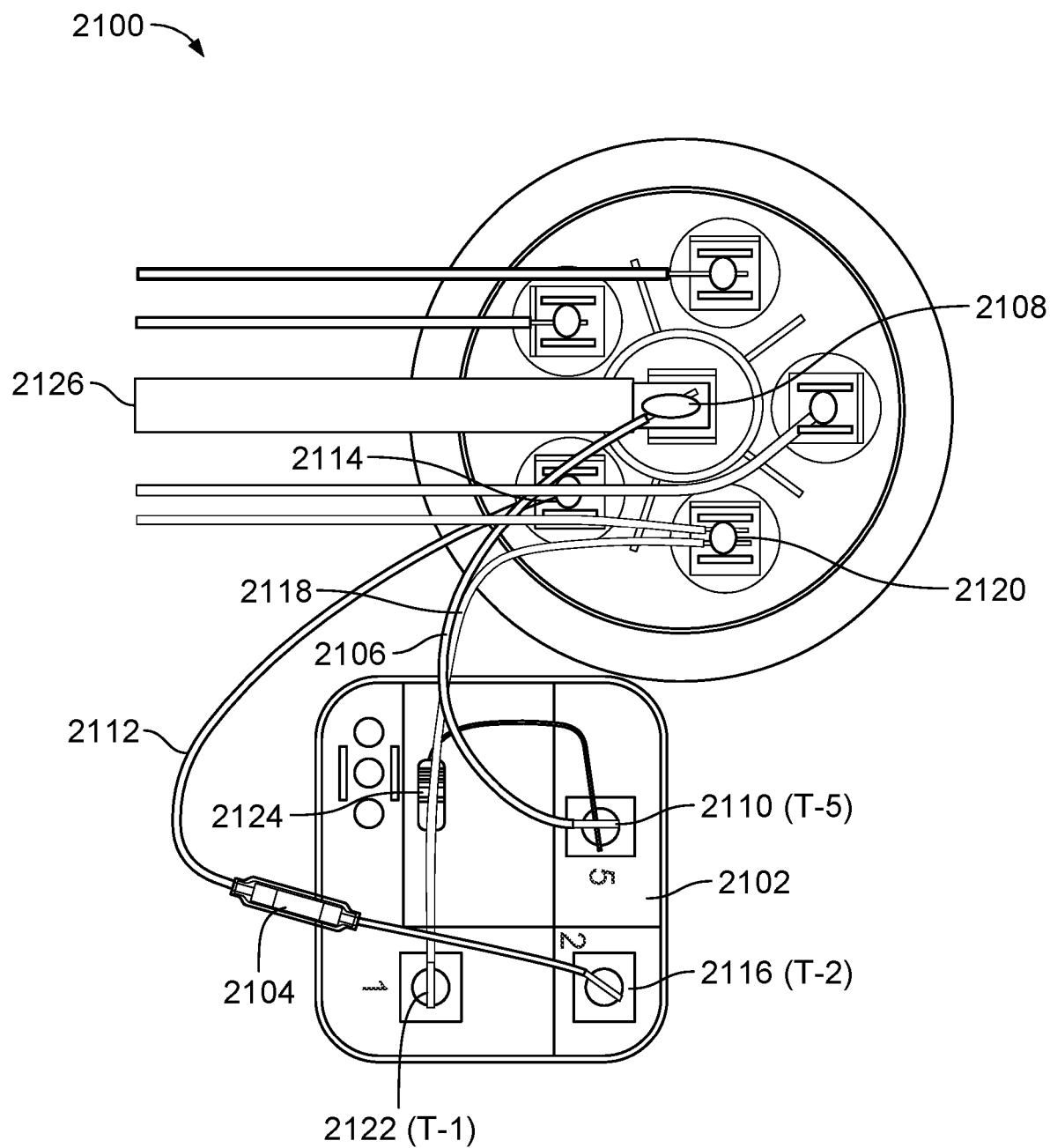
FIG. 21 is a view of the inside of a cover assembly of a hard start capacitor replacement unit including an internally connected relay and a fuse.

A fuse can also be positioned inside the container of the hard start capacitor replacement unit to reduce the amount of wiring outside the container of the hard start capacitor. Regarding FIG. 21, a bottom view of a cover assembly 2100 is shown including an internally connected relay 2102 (e.g., a potential relay, an electronic relay, etc.) and a fuse 2104 that are both internally positioned within the container of a hard start capacitor replacement unit. Referring briefly to FIG. 20, the relay may be positioned with a hard start and the fuse may be located externally. Returning to FIG. 21, a conductor 2106 connects the common cover terminal 2108 to the external terminal 2110 (T-5) of the relay 2102. A conductor 2112 includes the fuse 2104 (e.g., a slow blow fuse) and connects a capacitor cover terminal 2114 to the external terminal 2116 (T-2) of the relay. Therefore, if the fuse 2104 opens an electrical connection due to a failure, e.g., due to a stuck relay, the circuit within the hard start capacitor replacement unit is broken. Therefore, current flow through the hard start capacitor replacement unit is halted, preventing damage to other system components, e.g., the motor. A conductor 2118 connects a second capacitor cover terminal 2120 to the external terminal 2122 (T-1) of the relay 2102. A bleeder resistor 2124 connects the external terminal 2110 of the relay to the external terminal 2122 (T-1) of the relay 2102. Referring back briefly to FIG. 1, FIG. 4, and FIG. 9, the relay 2102 may operate in a manner similar to the electronic relay 18. For example, the external terminals 2120, 2116, and 2110 of relay 2102 are internally connected with contacts that may be connected by a contact bar in a similar manner as relay 18. When the contact bar is closed, hard start capacitor replacement unit 2100 is connected to the circuit. When the contact bar is open, hard start capacitor replacement unit 2100 is disconnected from the circuit. A ribbon conductor 2126 connects the common cover terminal 2108 to, e.g., the common element terminal. Conductors connect each of the capacitor cover terminals to their respective capacitive element terminals. In another implementation, the fuse 2104 could be elsewhere in the circuit. For example, the fuse 2104 could be electrically connecting the conductor 2106. In another implementation, the fuse could be included in the conductor 2118 or associated with another conductor (e.g., the ribbon conductor 2126).

Figure 22:
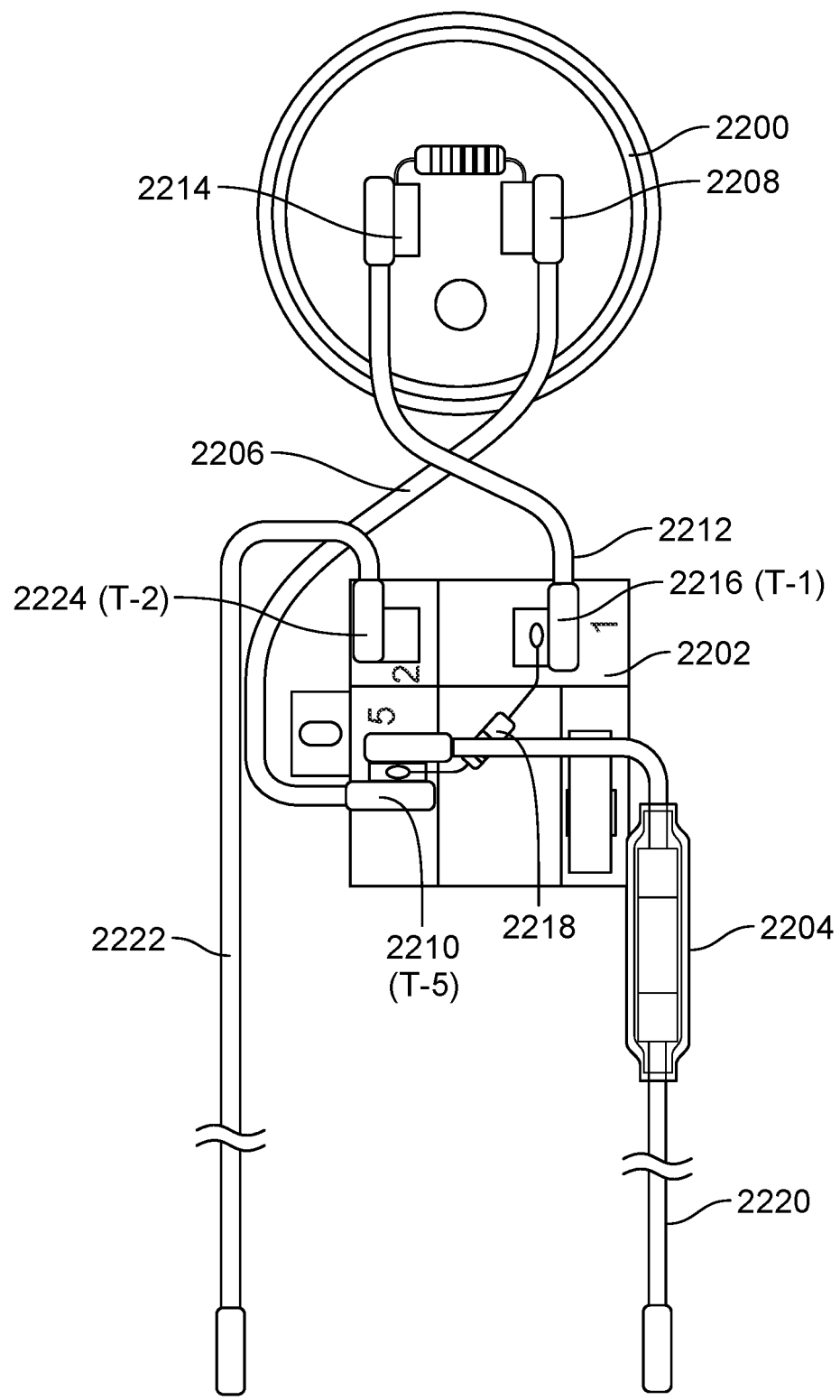
FIG. 22 is a top view of a hard start capacitor replacement with two cover terminals unit including an externally connected relay and a fuse.

In some arrangements, a fuse can also be used with a single value hard start capacitor replacement unit rather than a hard start capacitor replacement unit with multiple selectable values. For example, regarding FIG. 22, a single value hard start capacitor replacement unit 2200 is illustrated including an externally connected relay 2202 and a fuse 2204 and is in use with a compressor motor and a motor run capacitor. A conductor 2206 connects one cover terminal 2208 of the capacitor 2200 to the external terminal 2210 (T-5) of the relay 2202. A conductor 2212 connects a second cover terminal 2214 of the capacitor to an external terminal 2216 (T-1) of the relay 2202. A bleeder resistor 2218 connects the external terminal 2216 of the potential relay 2202 to a second external terminal 2210 of the relay 2202. A conductor 2220 includes the fuse 2204 and connects the external terminal 2210 to the compressor motor, the motor run capacitor, etc. Therefore, if the fuse 2204 opens an electrical connection due to a failure (e.g., a stuck relay, a compressor motor failure, a run capacitor failure, etc.), the hard start capacitor replacement unit, the relay 2202, and the circuit are disconnected, preventing damage to the compressor motor, other system components, etc. A conductor 2222 connects the external terminal 2224 (T-2) of the relay 2202 to the compressor motor, the motor run capacitor, etc. Referring back briefly to FIG. 4 and FIG. 9, the external terminals 2216, 2224, and 2210 of electronic relay 2202 are internally connected with contacts and that may be closed by a contact bar in a similar manner as relay 18. When the contact bar is closed, hard start capacitor replacement unit 2200 is connected in parallel to the compressor motor and the run capacitor. When the contact bar is open, hard start capacitor 2200 and the circuit are disconnected. In other implementations, the fuse could be connected elsewhere in the circuit. For example, in another implementation, the fuse 2204 could be included in the conductor 2206. In another implementation, the fuse 2204 can be included in the conductor 2210. In yet another implementation, the fuse 2204 can be included in the conductor 2220. In some implementations, the fuse could be internal to the relay and integrated in the circuit of the relay (e.g., between an external terminal and the relay contacts). For example, the fuse can be included so that when the fuse opens an electrical connection, the contacts of the relay are no longer electrically connected to the external terminals of the relay. In another implementation, the relay can be internal to the single value hard start capacitor 2210.

Figure 23A:
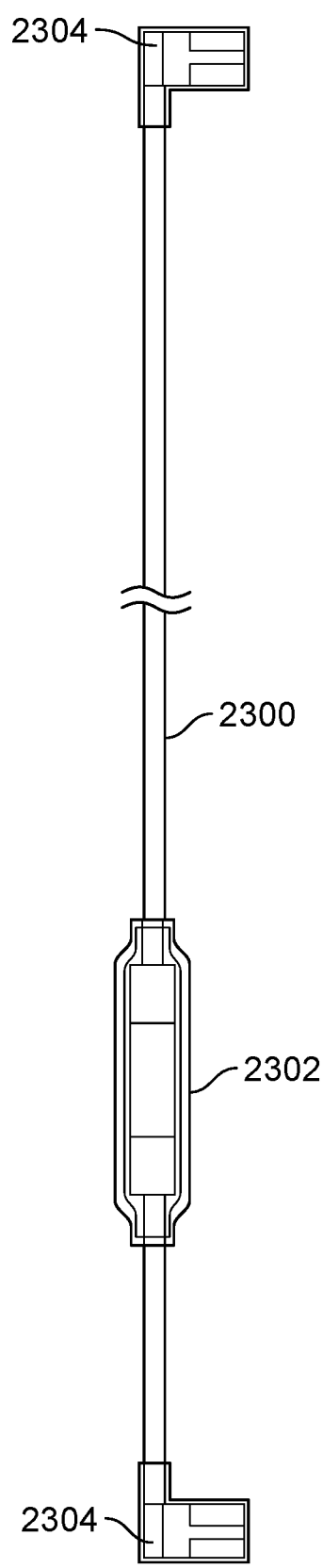
FIGS. 23A and 23B are side views of wires, each wire including a fuse and connectors.
Figure 23B:
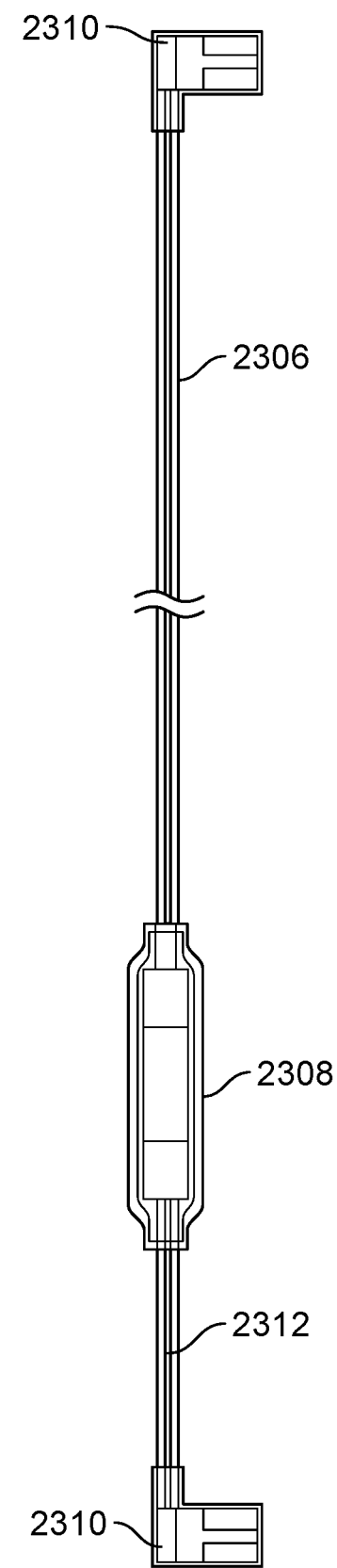

In the implementations described above, the fuse is included in a conductor, so that when the fuse is intact, the conductor connects two components of the system, but after the fuse opens an electrical connection, the conductor no longer conducts electricity. Some examples of a fuse included in a conductor are illustrated in FIGS. 23A and 23B. Referring to FIG. 23A, a conductor 2300 includes a fuse 2302 and connections 2304. The fuse 2302 is included in the conductor 2300 so that when the fuse 2302 is intact, the conductor 2300 conducts electricity, but after the fuse 2302 opens an electrical connection, the conductor 2300 does not conduct electricity. The connections 2304 are on either end of the conductor 2300, and can connect the conductor 2300 to different electrical components (e.g., a relay, a start capacitor, a compressor motor, a run capacitor, etc.). The connections 2304 can also connect to terminals of electrical components in different ways (e.g., clamping, twisting around the terminals, etc.). In the illustrated example, the sample type of connector is present on both ends of the conductor 2300; however, in other arrangements different types of connectors may be present at each end of the conductor. Referring to FIG. 23B, a conductor 2306 can include a fuse 2308 and connections 2310. The conductor 2306 can also include different indicia to indicate information about the fuse 2308, for example, a rating of the fuse. For example, the conductor 2306 may include, e.g., a black stripe 2312 to indicate that the fuse 2308 has a particular current rating (e.g., 10 A), a particular type of fuse (e.g., a GSA(P) 10-R), etc. Similarly, the absence of indicia can indicate information about the fuse (e.g., absence of the black stripe indicates a lower current rating such as 4 A). Different ratings of fuses may be used depending on the wiring of the system and the amperage used by the start capacitor. For example, systems with greater capacitance require greater amperage. For example, in systems with jumper connections between capacitor terminals on a hard start capacitor (e.g., wiring similar to FIG. 8), a fuse with a higher rating (e.g., 10 A fuse) may be used. In systems without jumper connections between terminals on a hard start capacitor (e.g., wiring similar to FIG. 5), a fuse with a lower rating (e.g., a 4 A fuse) may be used.

In some embodiments, the conductor 2300 with the fuse 2302 includes indicia to signify that it is related to safety and is a safety feature. In some embodiments, the conductor 2300 with the fuse 2302 can be colored a designated color (e.g., orange) to signify that it is a safety feature. For example, the designated color can signify that the fuse 2302 removes equipment from the circuit in response to a failure (e.g., a stuck relay, a capacitive failure, a motor failure, etc.). In some embodiments, the conductor 2300 can be colored the same designated color as the booster terminal 1814, which also removes equipment from the circuit in response to a failure, as described above. A common color for the conductor 2300 and the booster terminal 1814 can designate to a user that the conductor 2300 and the booster terminal 1814 have a common purpose of safety features. For example, the common color can help a user realize that multiple safety features (e.g., the conductor 2300, the booster terminal 1814, etc.) are being utilized in the circuit. In other embodiments, the conductor 2300 and the booster terminal 1814 can be different colors.

Although the hard start capacitors have been described as being connected to relays, multiple types of relays can be implemented (e.g., potential relays, electronic relays, static relays, time delay relays, etc.). For example, although the figures may be described as using a particular type of relay, other specific types of relay may alternatively or additionally be used.

Although the external relays and fuses have been described as being used with dielectric hard start capacitors, the external relays and fuses can be used with other types of hard start capacitors (e.g., electrolytic capacitors).

Accordingly, a hard start capacitor replacement unit has been described. It will be appreciated that various changes may be made by those skilled in the art without departing from the spirit and scope of the invention, which is limited only by the following claims.

What is claimed is:

1. A hard start capacitor replacement unit, comprising:
a capacitor container having a cover;
a plurality of capacitors received within the container, each of said capacitors having a capacitance value;
a common terminal mounted on the cover and electrically connected to a common terminal of each of said plurality of capacitors;
a plurality of cover terminals mounted on the cover spaced apart from the common terminal and from each other, each cover terminal respectively electrically connected to one of the plurality of capacitors;
a relay having contacts and being capable of opening and closing said contacts in response to a monitored condition of a motor, the relay having relay terminals;
a fuse electrically connected to one of the relay terminals by a first wire wherein the fuse electrically disconnects the hard start capacitor replacement unit and the motor upon a failure, wherein the fuse electrically disconnects the hard start capacitor replacement unit and the motor upon a current exceeding a threshold for a predetermined period of time, wherein the threshold is at least 4 amperes;
a second wire electrically connecting one of the relay terminals and the motor;
a third wire electrically connecting the common terminal mounted on the cover and one of the relay terminals; and
a fourth wire electrically connecting one or more cover terminals to one of the relay terminals;

wherein the contacts of the relay close to electrically connect one or more capacitors of the plurality of capacitors to the motor, and the contacts of the relay open to electrically disconnect the one or more capacitors of the plurality of capacitors from the motor.

2. The hard start capacitor replacement unit of claim 1, wherein the relay is positioned external to the capacitor container.

3. The hard start capacitor replacement unit of claim 1, wherein the threshold is at least 10 amperes.

4. The hard start capacitor replacement unit of claim 1, wherein the predetermined period of time is five seconds.

5. The hard start capacitor replacement unit of claim 1, wherein the fuse electrically disconnects the hard start capacitor replacement unit from the motor upon a failure of the relay.

6. The hard start capacitor replacement unit of claim 1, wherein the fuse electrically disconnects the hard start capacitor from the motor upon a current exceeding 10 amperes for 5 seconds.

7. The hard start capacitor replacement unit of claim 1, wherein the fuse is electrically connected to a run capacitor of the motor.

8. The hard start capacitor replacement unit of claim 7, wherein the run capacitor includes a booster terminal.

9. The hard start capacitor replacement unit of claim 8, wherein the fuse electrically disconnects the hard start capacitor replacement unit and the booster terminal of the run capacitor upon a failure.

10. A hard start capacitor replacement unit, comprising:
a capacitor container having a cover;
a plurality of capacitors received within the container, each of said capacitors having a capacitance value;
a common terminal mounted on the cover and electrically connected to a common terminal of each of said plurality of capacitors;
a plurality of cover terminals mounted on the cover spaced apart from the common terminal and from each other, each cover terminal respectively electrically connected to one of the plurality of capacitors;
a relay having contacts and being capable of opening and closing said contacts in response to a monitored condition of a motor, the relay having relay terminals;
a fuse mounted to the relay and electrically connected to the relay, wherein the fuse electrically disconnects the hard start capacitor replacement unit and the motor upon a failure, wherein the fuse electrically disconnects the hard start capacitor replacement unit and the motor upon a current exceeding a threshold for a predetermined period of time, wherein the threshold is at least 4 amperes;
a first wire electrically connecting one of the relay terminals and the motor;
a second wire electrically connecting the common terminal mounted on the cover and one of the relay terminals; and
a third wire electrically connecting one or more capacitor cover terminals to one of the relay terminals;
wherein the contacts of the relay close to electrically connect one or more capacitors of the plurality of capacitors to the motor, and the contacts of the relay open to electrically disconnect the one or more capacitors of the plurality of capacitors from the motor.

11. The hard start capacitor replacement unit of claim 10, wherein the threshold is at least 10 amperes.

12. The hard start capacitor replacement unit of claim 10, wherein the predetermined period of time is five seconds.

13. The hard start capacitor replacement unit of claim 10, wherein the fuse is mounted on an external surface of the relay.

14. The hard start capacitor replacement unit of claim 13, wherein the fuse is electrically connected to a relay terminal external to the relay.

\* \* \* \* \*